United States Patent
Mohammed et al.

(10) Patent No.: US 12,460,513 B1
(45) Date of Patent: Nov. 4, 2025

(54) METHOD FOR CARBON DIOXIDE STORAGE UTILIZING CARBON DIOXIDE SEQUESTRATION IN AN ANHYDRITE-RICH FORMATION

(71) Applicant: KING FAHD UNIVERSITY OF PETROLEUM AND MINERALS, Dhahran (SA)

(72) Inventors: Isah Mohammed, Dhahran (SA); Dhafer Abdullah Al Shehri, Dhahran (SA); Abubakar Isah, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/961,260

(22) Filed: Nov. 26, 2024

(51) Int. Cl.
  *E21B 41/00* (2006.01)
  *C01F 11/18* (2006.01)
  *C01F 11/46* (2006.01)

(52) U.S. Cl.
  CPC ........ *E21B 41/0064* (2013.01); *C01F 11/188* (2013.01); *C01F 11/462* (2013.01); *C01P 2002/70* (2013.01); *C01P 2002/82* (2013.01); *C01P 2002/85* (2013.01); *C01P 2004/03* (2013.01)

(58) Field of Classification Search
  CPC .. E21B 41/0064; C01F 11/188; C01F 11/462; C01P 2002/70; C01P 2002/82; C01P 2002/85; C01P 2004/03
  See application file for complete search history.

(56) References Cited

U.S. PATENT DOCUMENTS

| | | | |
|---|---|---|---|
| 2011/0035154 A1* | 2/2011 | Kendall | C04B 28/10 422/111 |
| 2016/0160115 A1* | 6/2016 | Gamage | C09K 8/594 166/305.1 |
| 2017/0190955 A1* | 7/2017 | Mahmoud | C09K 8/05 |
| 2022/0364441 A1 | 11/2022 | Nagra et al. | |
| 2023/0076912 A1 | 3/2023 | Mahmoud et al. | |
| 2023/0313545 A1* | 10/2023 | Leclerc | E04H 1/12 52/750 |
| 2024/0240538 A1 | 7/2024 | Okuno et al. | |

FOREIGN PATENT DOCUMENTS

| | | | |
|---|---|---|---|
| EP | 1 571 105 B1 | 12/2007 | |
| WO | WO-2010075503 A1 * | 7/2010 | C12P 3/00 |

OTHER PUBLICATIONS

Suzanne Hangx, et al., "The mechanical behavior of anhydrite and the effect of CO2 injection", Energy Procedia, vol. 1, Feb. 2009, pp. 3485-3492.

Anne M.H. Pluymakers, et al., "Effects of temperature and CO2 on the frictional behavior of simulated anhydrite fault rock", Journal of Geophysical Research: Solid Earth, vol. 119, Dec. 9, 2014, pp. 8728-8747.

D. Brant Bennion, et al., "Drainage and Imbibition Relative Permeability Relationships for Supercritical CO2/Brine and H2S/Brine Systems in Intergranular Sandstone, Carbonate, Shale, and Anhydrite Rocks", SPE Res Eval & Eng, vol. 11, No. 3, Jun. 19. 2008, pp. 487-496, 2 pages.

* cited by examiner

Primary Examiner — Silvana C Runyan
(74) Attorney, Agent, or Firm — Oblon, McClelland, Maier & Neustadt, L.L.P.

(57) ABSTRACT

A method for carbon dioxide ($CO_2$) storage includes injecting a brine solution into a subterranean anhydrite-rich formation, then injecting carbon dioxide into the subterranean anhydrite-rich formation and reacting the carbon dioxide with the subterranean anhydrite-rich formation to form one or more minerals thereby sequestering the carbon dioxide in the subterranean anhydrite-rich formation. The temperature in the subterranean anhydrite-rich formation is from 300 Kelvin (K) to 365 K and the pressure in the subterranean anhydrite-rich formation is from 90 bar to 120 bar.

20 Claims, 49 Drawing Sheets

| Element/treatment | Untreated | CO₂-brine | CO₂-brine+BaCl₂ |
|---|---|---|---|
| Calcium (Ca) | | | |

FIG. 3A

| Element/treatment | Untreated | CO₂-brine | CO₂-brine+BaCl₂ |
|---|---|---|---|
| Sulphur (S) | | | |

FIG. 3B

| Element/treatment | Untreated | CO₂-brine | CO₂-brine+BaCl₂ |
|---|---|---|---|
| Barium (Ba) | | | |

FIG. 3C

| Element/treatment | Untreated | CO₂-brine | CO₂-brine+BaCl₂ |
|---|---|---|---|
| Silicon (Si) | | | |

FIG. 3D

| Element/treatment | Untreated | CO$_2$-brine | CO$_2$-brine+BaCl$_2$ |
|---|---|---|---|
| Iron (Fe) |  |  |  |

| Element/treatment | Untreated | CO$_2$-brine | CO$_2$-brine+BaCl$_2$ |
|---|---|---|---|
| Magnesium (Mg) |  |  |  |

| Element/treatment | Untreated | CO$_2$-brine | CO$_2$-brine+BaCl$_2$ |
|---|---|---|---|
| Chlorine (Cl) |  |  |  |

METHOD FOR CARBON DIOXIDE STORAGE UTILIZING CARBON DIOXIDE SEQUESTRATION IN AN ANHYDRITE-RICH FORMATION

STATEMENT REGARDING PRIOR DISCLOSURE BY THE INVENTORS

Aspects of the present disclosure are described in Isah, A., et. al, "Enforced $CO_2$ Mineralization in Anhydrite-Rich Rocks" Energy, Vol 305, 2024, which is incorporated herein by reference in its entirety.

STATEMENT OF ACKNOWLEDGEMENT

Support provided by the King Fahd University of Petroleum and Minerals, Saudi Arabia and Khalifa University, United Arab Emirate under a KFUPM-KU Joint Research Program grant nos. KU-650 201-004, KU651 and KFUPM-2020-28 is gratefully acknowledged.

BACKGROUND

Technical Field

The present disclosure is directed towards carbon dioxide ($CO_2$) storage methods, and more particularly, towards a method for $CO_2$ sequestration in an anhydrite-rich formation.

Description of Related Art

Carbon dioxide ($CO_2$) is a heat-trapping gas, also known as a greenhouse gas, that comes from the extraction and burning of fossil fuels (such as coal, oil, and natural gas), from wildfires, and natural processes like volcanic eruptions. Since the onset of industrial times in the $18^{th}$ century, human activities have raised atmospheric $CO_2$ by 50%. If global energy demand continues to grow rapidly and the demand is met mostly with fossil fuels, human emissions of $CO_2$ may reach 75 billion tons per year or more by the end of the century. $CO_2$ emissions and increase in atmospheric $CO_2$ concentrations have periodically warmed the temperature of the Earth further contributing to global warming and climate change. The gradual warming of the climate may result in multi-fold destruction of climate and human civilization over time. As a result, there is a need to reduce the concentration of $CO_2$ in the atmosphere and find secure methods for its storage. In order to address challenges in storage of $CO_2$, several techniques have been developed such as, subsurface $CO_2$ storage, which has become popular recently. The subsurface storage method involves storing $CO_2$ underground, either in its supercritical form or by transforming it into solid minerals through carbon, with the aim of preventing its release into the atmosphere. Carbon mineralization entails injecting $CO_2$ into underground rock formations along with other fluids and chemicals. Through a series of geochemical reactions, the injected $CO_2$ interacts with minerals present in the rock, leading to its transformation into various solid rock minerals. The above mentioned process effectively immobilizes the $CO_2$ within the geological formation. One of the advantages of carbon mineralization is the long-term and safe storage. Once the $CO_2$ has been solidified into minerals within the rock formation, it can remain stored permanently. Unlike some other $CO_2$ storage methods, such as traditional reservoirs or geological traps, carbon mineralization reduces concerns about potential leakages and mitigates the need for extensive and ongoing monitoring efforts. Utilizing subsurface geological formations such as basalts for $CO_2$ storage via mineralization may be sustainable. However, fewer efforts have been made for carbon mineralization in anhydrite-rich rocks and evaluate their potential or subsurface $CO_2$ storage. In general, anhydrite is chemically reactive and undergoes dissolution and precipitation, thus, anhydrite may have potential for $CO_2$ storage via mineralization.

Previously, Forjanes and coworkers investigated brine-gypsum and anhydrite-gypsum mineralization under various conditions and reaction duration. Gypsum was exposed to 1.5 ml of 0.5 M $SrCl_2 \cdot 6H_2O$ and $BaCl_2 \cdot 2H_2O$ solutions in a batch reactor at a temperature of 298 Kelvin (K) and 1.0 bar pressure over a duration ranging from 5 minutes to 168 hours [See: P. Forjanes, J. M. Astilleros, and L. Fernández-Díaz, "*The Formation of Barite and Celestite through the Replacement of Gypsum,*" *Miner.* 2020, Vol. 10, Page 189, vol. 10, no. 2, p. 189, February 2020]. The results indicated the mineral transformation of gypsum to celestite and barite. Further, Ruiz-Agudo and coworkers conducted similar experiments in a static reactor at ambient conditions for 30 minutes to 168 hours reaction time and reported the mineral conversion of gypsum to barite [See: C. Ruiz-Agudo, P. Álvarez-Lloret, F. Di Lorenzo, D. Gebauer, and C. V. Putnis, "*Baryte cohesive layers formed on a* (010) *gypsum surface by a pseudomorphic replacement,*" *Eur. J. Mineral.*, vol. 31, no. 2, pp. 289-299, March 2019]. Recently, several innovative approaches to accelerate $CO_2$ mineralization have also been reported. For instance, an in-situ pH swing has been used to promote divalent ions extraction from the precursor rock surface and enhanced carbonate precipitation. Chen and coworkers experimentally studied the carbonation of phosphor-gypsum as a way of $CO_2$ storage [See: Q. Chen, W. Ding, H. Sun, T. Peng, and G. Ma, "*Indirect mineral carbonation of phosphogypsum for $CO_2$ sequestration,*" *Energy*, vol. 206, p. 118148, September 2020]. The experiment was carried out in the presence of sodium chloride and ammonium hydroxide solutions as pH swing agents, and subsequently 150 micrometers (μm) rock powder was exposed to $CO_2$ in a glass beaker at 303 K and ambient pressure for about 60 minutes to 150 minutes. The results indicated a transformation of gypsum to calcite. González-Illanes and coworkers investigated the mineral transformation of anhydrite via batch reactor experiments in the presence of aqueous sodium carbonate and magnesium chloride at ambient temperature and pressure [See: T. González-Illanes, M. T. Borrero, M. M. Herráez, C. Pimentel, and C. M. Pina, *Pseudomorphic Replacement of Mg—Ca Carbonates after Gypsum and Anhydrite,*" *ACS Earth Sp. Chem.*, vol. 1, no. 3, pp. 168-178, May 2017]. The results revealed a notable transformation of anhydrite and gypsum to calcite and aragonite over a 30 minute to two months period. Additionally, the study found that mineral transformation occurs even during a short experimental duration. Thus, it should be understood that carbon mineralization may be a promising and environmentally responsible approach to $CO_2$ storage in subsurface formations, because it leverages natural geochemical processes to lock away $CO_2$ in solid mineral form, allowing for its long-term storage and contributing to efforts to combat global climate change. Although several experimental studies on carbon mineralization as a means of $CO_2$ conversion have been conducted on anhydrite and gypsum, as well as in basaltic rocks. However, there is still a need for underground $CO_2$ storage applications utilizing carbon mineralization and storing the $CO_2$ in anhydrite-rich reservoirs. This specific research gap exists in assessing the potential of these reservoirs for underground $CO_2$ storage applications under subsurface conditions of high temperature and pressure.

Each of the existing publications suffer from one or more drawbacks hindering their adoption. Accordingly, it is one object of the present disclosure to provide a method for subsurface storage of $CO_2$ that may circumvent the above stated limitations, such as low efficiency and poor sustainability.

SUMMARY

In an exemplary embodiment, a method for carbon dioxide ($CO_2$) storage is described. The method includes injecting a brine solution into a subterranean anhydrite-rich formation, then injecting carbon dioxide into the subterranean anhydrite-rich formation. The method further includes sequestering the carbon dioxide in the subterranean anhydrite-rich formation in the form of one or more minerals. The temperature in the subterranean anhydrite-rich formation is from 300 Kelvin (K) to 365 K and the pressure in the subterranean anhydrite-rich formation is from 90 bar to 120 bar.

In some embodiments, after the reacting the subterranean anhydrite-rich formation has a greater than 150% increase in total carbon compared to an initial amount of total carbon in the subterranean anhydrite-rich formation before the reacting where the reaction time is 15 days. The subterranean anhydrite-rich formation has a gas porosity of 0.5% to 5% and a permeability of 0.05 millidarcy (mD) to 0.1 mD. The carbon dioxide is injected into the subterranean anhydrite-rich formation as a supercritical fluid.

In some embodiments, after the reacting the subterranean anhydrite-rich formation has a greater than 160% increase in total carbon compared to an initial amount of total carbon in the subterranean anhydrite-rich formation before the reacting where the reaction time is 15 days.

In some embodiments, after the reacting the subterranean anhydrite-rich formation has a greater than 170% increase in total carbon compared to an initial amount of total carbon in the subterranean anhydrite-rich formation before the reacting where the reaction time is 15 days.

In some embodiments, the temperature is from 315 K to 350 K.

In some embodiments, the temperature is from 325 K to 340 K.

In some embodiments, the pressure is from 95 bar to 115 bar.

In some embodiments, the pressure is from 100 bar to 110 bar.

In some embodiments, the one or more minerals includes calcite, siderite, and feldspar and are formed by reacting the carbon dioxide with the anhydrite-rich formation.

In some embodiments, a final calcite concentration of the anhydrite-rich formation increases by at least 1 wt. % compared to an initial calcite concentration of the anhydrite-rich formation before the reacting.

In some embodiments, a final dolomite concentration of the anhydrite-rich formation decreases by at least 1 wt. % compared to an initial dolomite concentration of the anhydrite-rich formation before the reacting.

In some embodiments, a final feldspar concentration of the anhydrite-rich formation increases by at least 0.1 wt. % compared to an initial feldspar concentration of the anhydrite-rich formation before the reacting.

In some embodiments, the method further includes injecting a barium chloride solution into the subterranean anhydrite-rich formation after the injecting the brine solution, where the barium chloride reacts with the subterranean anhydrite-rich formation to precipitate barium sulfate and barium carbonate.

In some embodiments, after the reacting the subterranean anhydrite-rich formation has a greater than 240% increase in total carbon compared to an initial amount of total carbon in the subterranean anhydrite-rich formation before the reacting where the reaction time is 15 days.

In some embodiments, after the reacting the subterranean anhydrite-rich formation has a greater than 250% increase in total carbon compared to an initial amount of total carbon in the subterranean anhydrite-rich formation before the reacting where the reaction time is 15 days.

In some embodiments, after the reacting the subterranean anhydrite-rich formation has a greater than 260% increase in total carbon compared to an initial amount of total carbon in the subterranean anhydrite-rich formation before the reacting where the reaction time is 15 days.

In some embodiments, the one or more minerals includes calcite, siderite, feldspar, and barite and are formed by reacting the carbon dioxide with the anhydrite-rich formation.

In some embodiments, a final calcite concentration of the anhydrite-rich formation increases by at least 1.5 wt. % compared to an initial calcite concentration of the anhydrite-rich formation before the reacting.

In some embodiments, a final dolomite concentration of the anhydrite-rich formation decreases by at least 2 wt. % compared to an initial dolomite concentration of the anhydrite-rich formation before the reacting.

In some embodiments, a final barite concentration of the anhydrite-rich formation increases by at least 0.5 wt. % compared to an initial barite concentration of the anhydrite-rich formation before the reacting.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A shows a map of calcium (Ca) from X-ray fluorescence (XRF) spectrograph for the untreated rock, $CO_2$-brine treated rock and $CO_2$-brine plus barium chloride treated rock, according to certain embodiments.

FIG. 3B shows a map of sulfur(S) from XRF spectrograph for the untreated rock, $CO_2$-brine treated rock and $CO_2$-brine plus barium chloride treated rock, according to certain embodiments.

FIG. 3C shows a map of barium (Ba) from XRF spectrograph for the untreated rock, $CO_2$-brine treated rock and $CO_2$-brine plus barium chloride treated rock, according to certain embodiments.

FIG. 3D shows a map of silicon (Si) from XRF spectrograph for the untreated rock, $CO_2$-brine treated rock and $CO_2$-brine plus barium chloride treated rock, according to certain embodiments.

DETAILED DESCRIPTION

Figure 1A:
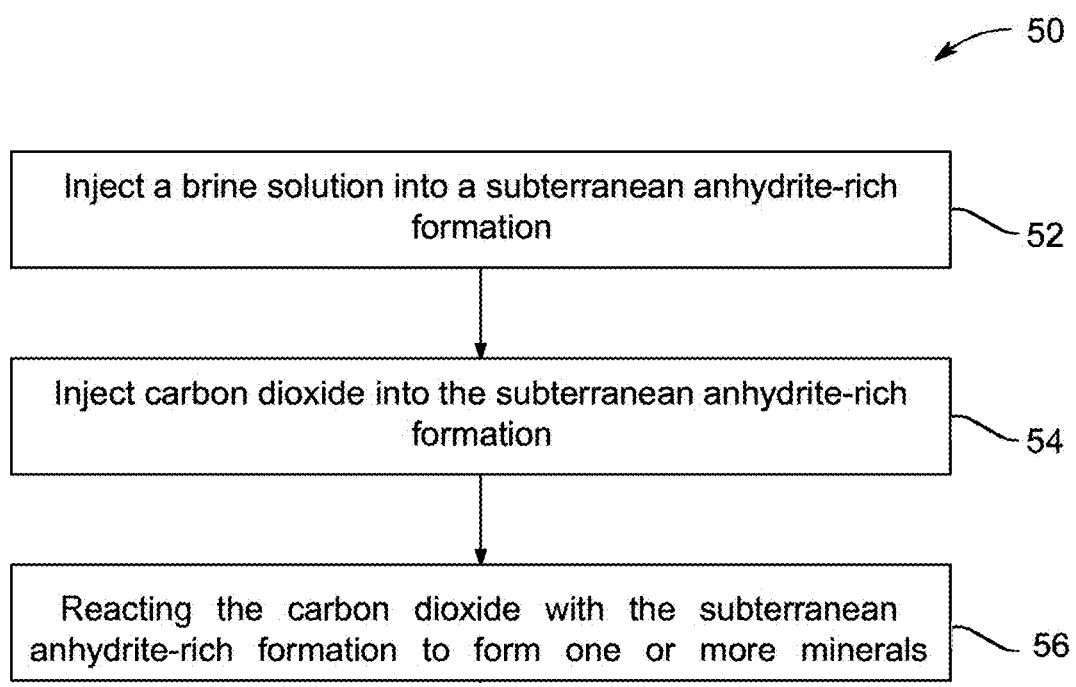
FIG. 1A is a schematic flow diagram of a method for carbon dioxide storage, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "brine solution" or "brine" refers to a concentrated aqueous solution of salts, primarily sodium chloride (NaCl), but may also include other salts such as calcium chloride ($CaCl_2$)), magnesium chloride ($MgCl_2$), sodium bicarbonate ($NaHCO_3$), and sodium sulfate (Na2SO4). This may be a man-made solution which mimics the ionic composition of seawater or a naturally sourced seawater or brackish water. Brine is utilized in various applications, including subsurface carbon mineralization processes, where it interacts with geological formations to facilitate carbon dioxide ($CO_2$) storage.

As used herein, the term "subterranean anhydrite" refers to a naturally occurring mineral form of calcium sulfate ($CaSO_4$) that is found in underground geological formations. Anhydrite is typically characterized by its lack of water in its crystal structure, distinguishing it from gypsum, which contains water. Subterranean anhydrite is often formed in arid environments through evaporation and is commonly associated with sedimentary rock formations. In the context of carbon dioxide ($CO_2$) storage, subterranean anhydrite can play a role in mineralization processes, as it has the potential to react with injected $CO_2$ and brine solutions to facilitate the transformation of $CO_2$ into stable carbonate minerals, thus contributing to long-term $CO_2$ sequestration.

As used herein, the term "subterranean anhydrite-rich formation" refers to a geological structure characterized by a presence of anhydrite ($CaSO_4$) within its composition. This formation typically consists of layers of anhydrite interspersed with other minerals and rock types, often found in sedimentary basins or evaporite sequences. Subterranean anhydrite-rich formations are of particular interest in geological studies related to carbon dioxide ($CO_2$) storage, as they provide a reactive medium for carbon mineralization. When $CO_2$ is injected into these formations, it can interact with the anhydrite and brine solutions present, facilitating the transformation of $CO_2$ into stable carbonate minerals. The unique properties of anhydrite, including its chemical reactivity and ability to undergo dissolution and precipitation processes, make these formations valuable for effective long-term $CO_2$ sequestration strategies.

As used herein, the term "gas permeability" refers to the ability of a porous material, such as rock or sediment, to allow the passage of gases through its interconnected pore spaces. It is a property that influences the movement and flow of gases, including carbon dioxide ($CO_2$), within geological formations. Gas permeability is typically measured in units of Darcy or millidarcy (mD) and is influenced by factors such as pore size, pore shape, rock texture, and the degree of saturation of the material.

As used herein, the term "gas porosity" refers to the volume percentage of a rock or sediment that is filled with gas. Gas porosity is measured as a percentage (%) and is equal to the percentage of the volume contained within the rock or sediment that is currently occupied by gas.

As used herein, the term "calcite" refers to a naturally occurring mineral form of calcium carbonate ($CaCO_3$), characterized by its crystalline structure and typically appearing in a range of colors, including white, colorless, or shades of yellow, brown, or gray. Calcite is one of the most abundant minerals in the Earth's crust and is commonly found in sedimentary rocks, such as limestone and marble. It plays a role in various geological and biological processes, including carbon cycling and the formation of carbonate rocks. In the context of carbon dioxide ($CO_2$) storage and mineralization, calcite is of particular interest as it can form through the reaction of $CO_2$ with calcium-bearing minerals, facilitating the long-term sequestration of $CO_2$ in solid mineral form.

As used herein, the term "siderite" refers to a naturally occurring mineral composed of iron carbonate ($FeCO_3$). It typically appears as a brownish or yellowish mineral, often forming in sedimentary environments or as a result of hydrothermal processes. Siderite is prevalent in various geological contexts, particularly in iron ore deposits and as a secondary mineral in some sedimentary rocks. In the context of carbon mineralization and carbon dioxide ($CO_2$) storage, siderite can form through the reaction of $CO_2$ with iron-bearing minerals, thereby facilitating the conversion of gaseous $CO_2$ into stable carbonate minerals. This transformation is important for long-term carbon sequestration strategies, as siderite is relatively stable and can help immobilize $CO_2$ within geological formations.

As used herein, the term "feldspar" refers to a group of abundant rock-forming minerals that are primarily composed of aluminosilicates of potassium, sodium, and calcium. Feldspar minerals are classified into three main types: orthoclase (potassium feldspar), plagioclase (sodium and calcium feldspar), and microcline. They typically appear in a range of colors, including white, pink, gray, or green, and are characterized by their crystalline structure and two-dimensional cleavage. Feldspar is a major component of many igneous, metamorphic, and sedimentary rocks, and it plays a role in the geological processes that lead to the formation of soil and other minerals. In the context of carbon dioxide ($CO_2$) storage and mineralization, feldspar can react with $CO_2$ and other fluids, contributing to the long-term sequestration of carbon by facilitating the formation of stable carbonate minerals.

Aspects of this disclosure are directed to a method for carbon dioxide sequestration in an anhydrite rich formation. Anhydrite, with its chemically reactive properties, facilitates efficient mineralization of $CO_2$ into stable carbonate minerals, thereby immobilizing carbon in a solid form and preventing its release back into the atmosphere. This process not only enhances the long-term storage capacity of the geological formation but also reduces the risks of leakage associated with traditional $CO_2$ storage methods. Overall, the method of present disclosure represents a promising approach to addressing the pressing challenge of global warming while simultaneously leveraging existing geological resources.

FIG. 1A illustrates a schematic flow chart of a method 50 of carbon dioxide storage. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes injecting a brine solution into a subterranean anhydrite-rich formation. Subterranean anhydrite-rich formations are geological structures characterized by the presence of anhydrite, a calcium sulfate mineral that typically forms in arid environments through the evaporation of seawater or saline water bodies. Anhydrite-rich layers have unique physical and chemical properties, which include low permeability and high mechanical strength. This makes them effective seals for hydrocarbons and other fluids, allowing for the formation of reservoirs beneath them. Anhydrite formations often form a caprock on other rock formations and can be near hydrocarbon basins, however, these anhydrite formations are typically substantially free of hydrocarbons. Anhydrite is typically found in extensive layered deposits and sedimentary basins that are formed when large volumes of sea water have been evaporated, often interbedded other minerals including gypsum, halite, and limestone. These sedimentary accumulations can be hundreds of feet thick and cover large areas. Also, anhydrite can form in tidal flat sediments and shorelines from sea water evaporation. Anhydrite formations are also typically substantially free from water before the introduction of brine, although they can be found near formations that contain water and is often found near water-containing gypsum. In one or more embodiments, the anhydrite formations used herein will be free from hydrocarbons. Additionally, these formations can serve as ideal candidates for carbon dioxide storage because their impermeability minimizes the risk of leakage, making them suitable for carbon capture and storage (CCS) initiatives. Furthermore, the geological stability and structural integrity of anhydrite-rich formations can also facilitate enhanced oil recovery techniques, making them valuable in both environmental and economic contexts. Overall, these formations play a role in energy resource management and environmental sustainability.

Suitable examples of subterranean rocks rich in anhydrite include, but are not limited to, sandstone, basalt, limestone, dolomite, shale, gabbro, peridotite, granite, serpentinite, marl, quartzite, chalk, carbonates, mudstone, siltstone, rhyolite, diorite, tuff, conglomerate, breccia, phyllite, schist, gneiss, amphibolite, and slate.

In some embodiments, the primary mineral content of the subterranean anhydrite-rich formation includes 80-90 wt. %, preferably 82-88 wt. %, preferably 84-86 wt. %, preferably 85.4 wt. % anhydrite; 1-5 wt. %, preferably 2-4 wt. %, preferably 2.2 wt. % calcite; 5-10 wt. %, preferably 6-9 wt. %, preferably 7-8 wt. %, preferably 7.8 wt. % dolomite; 1-5 wt. %, preferably 2-4 wt. %, preferably 3-4 wt. %, preferably 3.7 wt. % scapolite; 0.1-1 wt. %, preferably 0.1-0.5 wt. %, preferably 0.2 wt % quartz; 0.1-1 wt. %, preferably 0.1-0.5 wt. %, preferably 0.3 wt. % aragonite, 0.1-1 wt. %, preferably 0.1-0.5 wt. %, preferably 0.2 wt % feldspar, and 0.1-1 wt. %, preferably 0.1-0.5 wt. %, preferably 0.1 wt % siderite.

Injecting brine solution into an anhydrite-rich subterranean formation serves a role in investigating the interactions between $CO_2$ and brine, particularly in the context of carbon storage. In some embodiments, the brine solution may have different salts including, but not limited to, potassium chloride (KCl), calcium sulphate ($CaSO_4$), magnesium sulphate ($MgSO_4$), lithium chloride (LiCl), strontium chloride ($SrCl_2$), and sodium thiosulfate ($Na_2S_2O_3$). In some embodiments, the brine solution may be a naturally sourced sea water or brackish water. In some embodiments, the brine solution may be formulated. In a preferred embodiment, the brine solution comprises five salts: sodium chloride (NaCl), calcium chloride ($CaCl_2$), magnesium chloride ($MgCl_2$), sodium bicarbonate ($NaHCO_3$), and sodium sulfate ($Na_2SO_4$). In some embodiments, the brine water includes, by mass, ions of, $Na^+$: 5,000-50,000 parts per million (ppm), more preferably 15,000-20,000 ppm, more preferably 16,000-19,500 ppm, more preferably 17,000-19,000 ppm, and yet more preferably 18,300; $Ca^{2+}$: 100-1,500 ppm, more preferably 500-1,000 ppm more preferably 600-700 ppm, more preferably 625-675 ppm and yet more preferably 650 ppm; $Mg^{2+}$: 500-5,000 ppm, more preferably 1,000-4000 ppm, more preferably 1,500-3,000 ppm more preferably 1,800-2,500 ppm, and yet more preferably 2,110 ppm; $SO_4^{2-}$: 1,000-9,000 ppm, more preferably 3,000-7,000 ppm, more preferably 4,000-6,000 ppm, more preferably 3,800-4,600 ppm, and yet more preferably 4,290 ppm; $Cl^-$: 10,000-70,000 ppm, more preferably 20,000-50,000 ppm, more preferably 25,000-40,000 ppm more preferably 25,000-37,000 ppm, and yet more preferably 32,200 ppm; and $HCO_3^-$: 10-500 ppm, more preferably 50-400 ppm, more preferably 75-300 ppm, more preferably 100-150 ppm, and yet more preferably 120 ppm.

In some embodiments, the primary mineral content of the subterranean anhydrite-rich formation treated with $CO_2$-saturated brine includes 80-90 wt. %, preferably 82-88 wt. %, preferably 84-86 wt. %, preferably 85.1 wt. % anhydrite; 1-5 wt. %, preferably 2-4.5 wt. %, preferably 4.1 wt. % calcite; 5-10 wt. %, preferably 6-9 wt. %, preferably 6-8 wt. %, preferably 6.4 wt. % dolomite; 1-5 wt. %, preferably 1-4 wt. %, preferably 1.4 wt. % scapolite; 0.1-1 wt. %, preferably 0.1-0.5 wt. %, preferably 0.2 wt % quartz; 0.1-1 wt. %, preferably 0.1-0.5 wt. %, preferably 0.1 wt. % aragonite, 0.1-1 wt. %, preferably 0.1-0.5 wt. % feldspar, and 0.1-1 wt. %, preferably 0.1-0.5 wt. %, preferably 0.3 wt. % siderite.

In some embodiments, after injecting the brine solution, a barium chloride solution is injected into the subterranean anhydrite-rich formation. The barium chloride reacts with the subterranean anhydrite-rich formation to precipitate barium sulfate and barium carbonate. The addition of $BaCl_2$ is to enforce the concurrent precipitation of barium sulfate and carbonate while maintaining a balanced reaction that involves the dissolution of rock and the precipitation of carbonate minerals. This addition of $BaCl_2$ is a controlled step designed to influence the $CO_2$ mineralization processes during the rock-$CO_2$-brine interaction, thus enhancing the dissolution/precipitation and overall dynamics of the reactions.

In some embodiments, the concentration of $BaCl_2$ salt in the brine used for the initial $CO_2$-brine interaction may range from 0.01-0.1 M, 0.05-0.1 M, 0.1-0.4 M, 0.08-0.2 M, 0.1-0.2 M, or 0.1-0.15 M. In a preferred embodiment, the concentration of $BaCl_2$ salt in the brine for the initial $CO_2$-brine interaction is 0.1 molar (M).

It should be noted that the brine and $CO_2$ are injected directly into the anhydrite formation or into a wellbore that terminates in or above an anhydrite formation. The brine solution and carbon dioxide are injected into the subterranean anhydrite-rich formation through tubing present in one or more boreholes that extend from the surface into the subterranean anhydrite-rich formation, and the brine and carbon dioxide are injected only into the subterranean anhydrite-rich formation. While the brine may include other components such as surfactants, in one or more embodiments, the injected brine, $CO_2$, and the formation before injection are substantially free from hydrocarbons. Typically, this method will take advantage of anhydrite formations not involved with hydrocarbon production, using anhydrite formations substantially free from hydrocarbons to sequester $CO_2$.

In some embodiments, the primary mineral content of the subterranean anhydrite-rich formation treated with $CO_2$-saturated brine and $BaCl_2$ includes 80-90 wt. %, preferably 82-88 wt. %, preferably 84-86 wt. %, preferably 84.9 wt. % anhydrite; 1-5 wt. %, preferably 2-4.5 wt. %, preferably 4.5 wt. % calcite; 1-10 wt. %, preferably 2-9 wt. %, preferably 3-8 wt. %, preferably 4.5 wt. % dolomite; 1-5 wt. %, preferably 1-4 wt. %, preferably 1 wt. % scapolite; 0.1-1 wt. %, preferably 0.1-0.5 wt. %, preferably 0.2 wt % quartz; and 0.1-1 wt. %, preferably 0.1-0.4 wt. % feldspar.

At step 54, the method 50 includes injecting carbon dioxide into the subterranean anhydrite-rich formation. The carbon dioxide is injected into the subterranean anhydrite-rich formation as a supercritical fluid. Carbon dioxide behaves as a supercritical fluid above its critical temperature (304.25 kelvin (K), 31.10 centigrade (° C.), 87.98 Fahrenheit (° F.)) and critical pressure (72.9 atmospheric pressure (atm), 7.39 Megapascal (MPa), 1,071 pounds per square inch (psi), 73.9 bar), expanding to fill its container like a gas but with a density like that of a liquid.

In some embodiments, the temperature in the subterranean anhydrite-rich formation may range from 300 to 370 K, 315 to 355 K, 325 to 345 K, and 330 to 340 K. In a preferred embodiment, the temperature in the subterranean anhydrite-rich formation is 333 K.

In some embodiments, the pressure in the subterranean anhydrite-rich formation may range from 90 to 120 bar, 95 to 115 bar, 100 to 110 bar, 100 to 115 bar, and 95 to 105 bar. In a preferred embodiment, the pressure in the subterranean anhydrite-rich formation is 104 bar.

In some embodiments, supercritical fluid may include methane ($CH_4$), nitrogen ($N_2$), water ($H_2O$), hydrogen ($H_2$), sulfur hexafluoride ($SF_6$), ethane ($C_2H_6$), ammonia ($NH_3$), ethylene ($C_2H_4$), argon (Ar), hydrogen sulfide ($H_2S$). In a preferred embodiment, high-purity carbon dioxide ($CO_2$) at about 95%, preferably 97%, preferably 98%, preferably 99%, preferably 99.5, and preferably 99.9% was employed as the supercritical fluid for brine carbonation and interactions with anhydrite. The volume ratio of the brine solution to the supercritical carbon dioxide is in the range of 1:5 to 5:1, preferably 1:4 to 4:1, preferably 1:3 to 3:1, preferably 3:1.

In some embodiments, the subterranean anhydrite-rich formation may have a gas porosity of 0.5 to 5%, 1 to 4%, 1 to 3%, or 1 to 2%. In a preferred embodiment, the subterranean anhydrite-rich formation has a gas porosity of 1.46%.

In some embodiments, the subterranean anhydrite-rich formation may have a gas permeability of 0.015 to 0.1 mD, 0.025 to 0.09 mD, 0.035 to 0.08 mD, 0.045 to 0.08 mD, 0.055 to 0.075 mD. In a preferred embodiment, the subterranean anhydrite-rich formation may have a gas permeability of 0.068 mD.

At step 56, the method 50 includes reacting the carbon dioxide with the subterranean anhydrite-rich formation to form one or more minerals thereby sequestering the carbon dioxide in the subterranean anhydrite-rich formation. Supercritical $CO_2$ plays a role in carbon storage through brine carbonation, particularly in anhydrite-rich subterranean formations. When injected into deep formations under high-pressure and high-temperature conditions, $CO_2$ reaches its supercritical state, combining the density of a liquid with the diffusivity of a gas. This enhances its ability to penetrate porous rock formations and dissolve into the brine present in the reservoir. In anhydrite-rich environments, supercritical $CO_2$ dissolves in the brine, initiating reactions with calcium ions ($Ca^{2+}$) released from the dissolution of anhydrite ($CaSO_4$). This leads to the formation of calcium carbonate ($CaCO_3$) through a process called carbonation. The precipitation of $CaCO_3$ results in the permanent trapping of $CO_2$ in a stable, solid mineral form, which enhances the long-term security of the storage. The interaction of $CO_2$ with anhydrite-rich formations not only promotes carbonation but can also alter the geochemical dynamics of the reservoir. The dissolution of anhydrite in the presence of supercritical $CO_2$ increases the availability of calcium, facilitating more extensive mineral trapping of $CO_2$. This mineralization is a mechanism for reducing the mobility of $CO_2$, preventing it from migrating out of the storage formation. However, the process may also alter the porosity and permeability of the rock, potentially affecting fluid flow and the integrity of the storage reservoir over time. In this context, supercritical $CO_2$-driven brine carbonation in anhydrite-rich formations is a promising method for carbon capture and storage (CCS), offering a secure, long-term solution by converting $CO_2$ into geochemically stable mineral forms.

In some embodiments, the interaction duration of brine solution and carbon dioxide in the subterranean anhydrite-rich formation may be varied from 10-20 days, 10-30 days, 20-30 days, 25-30 days and 10-25 days. In preferred embodiments, the interaction duration of brine solution and carbon dioxide in the subterranean anhydrite-rich formation is 15 days. The interaction duration may be longer than this period, but a longer interaction duration may not be useful if carbonation is no longer occurring. The method includes sequestering the carbon dioxide in the subterranean anhydrite-rich formation in the form of one or more minerals. Carbon dioxide ($CO_2$) is sequestered in a subterranean anhydrite-rich formation in the form of one or more stable minerals. The minerals include one or more of calcite, siderite, feldspar and barite. This process leverages the natural geochemical reactions between injected $CO_2$ and the surrounding mineral-rich environment to convert the gas into solid forms, such as carbonates. When $CO_2$ is injected into the deep formation, it often exists in its supercritical state, allowing it to dissolve in the formation brine. In anhydrite-rich formations, the dissolution of anhydrite ($CaSO_4$) releases calcium ions ($Ca^{2+}$) into the brine. These calcium ions react with the dissolved $CO_2$, leading to the precipitation of calcium carbonate ($CaCO_3$) or similar carbonate minerals. This mineral trapping is a main mechanism of the $CO_2$ sequestration, as it locks the gas into a stable, solid form that cannot easily migrate or escape from the reservoir. This sequestration as stable, solid minerals is preferable to storing as other forms of $CO_2$, which are prone to leakage or escape.

In some embodiments, a final calcite concentration of the anhydrite-rich formation increases by at least 1 wt. %, 1.25 wt. %, 1.5 wt. %, 1.75 wt. %, 2 wt. %, 2.25 wt. %, compared to an initial calcite concentration of the anhydrite-rich formation before the reacting. In a preferred embodiment, the final calcite concentration of the anhydrite-rich formation increases from 2.2 wt. % to 4.4 wt. % compared to an initial calcite concentration of the anhydrite-rich formation before the reacting.

In some embodiments, a final dolomite concentration of the anhydrite-rich formation decreases by at least 1 wt. %, 2 wt. %, 3 wt. %, 4 wt. %, 5 wt. % compared to an initial dolomite concentration of the anhydrite-rich formation before the reacting. In a preferred embodiment, the final dolomite concentration of the anhydrite-rich formation decreases from 7.8 wt. % to 6.4 wt. % compared to an initial dolomite concentration of the anhydrite-rich formation before the reacting.

In some embodiments, a final feldspar concentration of the anhydrite-rich formation increases by at least 0.1 wt. %, 0.2 wt. %, 0.3 wt. %, 0.4 wt. %, 0.5 wt. % compared to an initial feldspar concentration of the anhydrite-rich formation before the reacting. In a preferred embodiment, a final feldspar concentration of the anhydrite-rich formation increases from 0.2 to 0.5 wt. % compared to an initial feldspar concentration of the anhydrite-rich formation before the reacting.

In some embodiments, a final barite concentration of the anhydrite-rich formation increases by at least 0.1 wt. %, 0.3 wt. %, 0.5 wt. %, 0.7 wt. %, 0.9 wt. %, 1.1 wt. %, 1.3 wt. %, 1.5 wt. % compared to an initial barite concentration of the anhydrite-rich formation before the reacting. In a preferred embodiment, a final barite concentration of the anhydrite-rich formation increases by at least 0.9 wt. % compared to an initial barite concentration of the anhydrite-rich formation before the reacting.

In some embodiments, after the reacting the subterranean anhydrite-rich formation has a greater than 150%, 160%, 170%, 240%, 250%, 260% increase in total carbon compared to an initial amount of total carbon in the subterranean anhydrite-rich formation before the reacting wherein the reaction time is 15 days. In a preferred embodiment, increase in total carbon (TC) content of up to 177% for the $CO_2$-brine treatment and 266% for the $CO_2$-brine+$BaCl_2$ treatment wherein the reaction time is 15 days.

In some embodiments, after the reacting, brine is recovered from the anhydrite rich formation as brine that is substantially free of dissolved $CO_2$. Also, any recovered brine is substantially free of hydrocarbons.

EXAMPLES

The following examples provide the method 50 of carbon dioxide ($CO_2$) storage. The examples are provided solely for illustration and are not to be construed as limitations of the present disclosure, as many variations thereof are possible without departing from the spirit and scope of the present disclosure.

Example 1: Fluids—Brine and $CO_2$

The brine solution was prepared using five salts sodium chloride (NaCl), calcium chloride ($CaCl_2$), magnesium chloride ($MgCl_2$), sodium bicarbonate ($NaHCO_3$), and sodium sulfate ($Na_2SO_4$). The listed salts were combined in specific proportions to create a synthetic brine solution that closely mimicked the ionic composition of seawater typically found in the Arabian Gulf. High-purity carbon dioxide ($CO_2$) at 99.9% was employed as the gas phase for brine carbonation and interactions with anhydrite. The ionic composition of the seawater is detailed in Table 1.

TABLE 1

| Ionic composition of Arabian gulf seawater | |
|---|---|
| Ions | Concentration (ppm) |
| $Ca^{2+}$ | 650 |
| $Mg^{2+}$ | 2,110 |
| $SO_4^{2-}$ | 4,290 |
| $Cl^-$ | 32,200 |
| $HCO^{3-}$ | 120 |
| Total dissolved solids | 57,670 |

Example 2: Experimental Procedure

The described experimental procedure was carried out using anhydrite-rich rock and a series of experiments were performed to characterize rock. The initial gas porosity and permeability of the rock sample were measured at 1.46% and 0.068 mD, respectively. The rock was then cut into smaller samples with dimensions measuring 8 mm and 15 mm in diameter and each having a thickness of about 7 mm. The (7×8) mm samples were used for micro-computed tomography (micro-CT) and scanning electron microscopy electron dispersive X-ray spectroscopy (SEM-EDS) analysis while the (7×15) mm samples were used for other measurements pre-experiments and post-experiments. To assess the bulk mineral composition of the rock, X-ray diffraction (XRD) analysis was performed. The primary constituent of the sample was identified as calcium sulfate ($CaSO_4$), with amounts of other minerals such as quartz, dolomite, calcite, and the scapolite group. The initial properties of the rock before undergoing $CO_2$-brine treatments measured: Initial evaluations included measurements of the mineralogical and elemental compositions via XRD and X-ray fluorescence (XRF), Fourier transform infrared (FTIR) spectroscopy, micro-CT imaging, and total carbon (TC) content. The FTIR analysis provides information on the changes in functional groups and modifications that occurred during the $CO_2$-brine treatments. Micro-CT scans were conducted to quantify the dissolution/precipitation and evaluate the changes in porosity following the interactions. Additionally, TC analysis was employed to determine the carbon content of the rock corresponding to $CO_2$ mineralization. The subsequent step involved exposing smaller rock samples to a supercritical $CO_2$-saturated brine treatment under high-pressure high-temperature (HPHT) conditions in the presence and absence of $BaCl_2$, respectively. The addition of $BaCl_2$ is to enforce the concurrent precipitation of barium sulfate and carbonate while maintaining a balanced reaction that involves the dissolution of rock and the precipitation of carbonate minerals. This addition of $BaCl_2$ is a controlled step designed to influence the $CO_2$ mineralization processes during the rock-$CO_2$-brine interaction, thus enhancing the dissolution/precipitation and overall dynamics of the reactions. The treatments were conducted in a 300 ml static reactor, in which about 75 percent by volume (vol. %) was filled with brine while 25 vol. % was occupied by supercritical $CO_2$. The interaction duration is fifteen days, with operating conditions set at a temperature of 333 K and a pressure of 104 bar while collecting effluent samples at predetermined intervals.

Figure 1B:
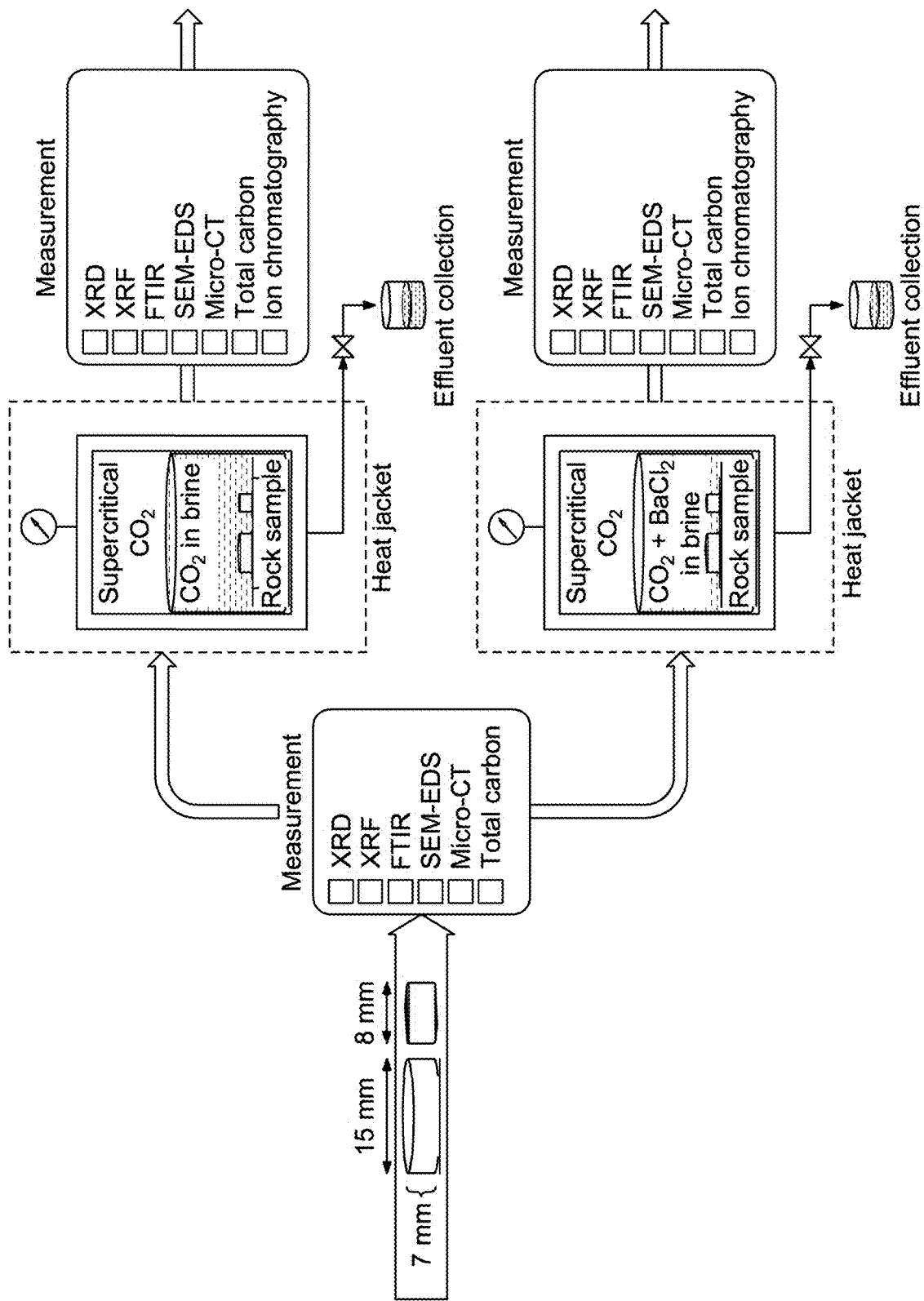
FIG. 1B is a flowchart depicting a sequence of rock-$CO_2$-brine interactions in presence and in absence of barium chloride, according to certain embodiments.

The series of assessments were repeated post $CO_2$-brine treatment. The assessments include the measurement of the mineralogical composition of the rock, micro-CT imaging, XRF, FTIR, SEM-EDS, and carbon content for both rock and effluent fluids. Moreover, the same set of procedures was replicated on the other smaller rock sample, adding 2.08 percent by weight (wt. %), equivalent to 0.1 molar (M) $BaCl_2$ salt, to the brine used in the initial $CO_2$-brine interaction. It may be noted that the solution was filtered before use in the experiments. FIG. 1B depicts a flowchart outlining the sequence of rock-$CO_2$-brine interactions.

Example 3: Geochemical Analysis

To monitor the geochemical changes, 2 ml samples of the effluent were collected approximately three times per week (making a total of 14 ml for seven samples) during the anhydrite-$CO_2$-brine interactions. While the periodic collection of effluent samples may slightly alter the rock-$CO_2$-brine ratio in the reactor and potentially influence the carbonation process, it should be noted that the total sampled volume, approximately 6% of the initial brine volume, has no impact on the reaction temperature. Moreover, the sampling procedure does not lead to a pressure decrease. The final pressure at the end of the experiment remains at 101 bar, indicating only a minor 3-bar drop. A required volume of the collected effluent samples was diluted by a factor of 100 using deionized water with a specific resistance of 18.2 mega ohms centimetres (MΩ-cm) at a temperature of 25° C. This dilution was necessary to allow the samples to fall within the linear range of a Metrohm compact IC flex-compact ion chromatography (IC) system. After completing the IC, a series of peaks corresponding to each ion present in the effluent sample was generated. The area under each peak was considered to be directly proportional to the concentration of the respective ions in the fluid. This proportional relationship was established by comparing the peak areas to known standards with predetermined concentrations. The analysis of total inorganic carbon (TIC) for carbonate and bicarbonate ions was conducted using flow injection TOC analyser. The pH of both the initial brines and the effluent was determined using a pH/conductivity benchtop multi-parameter meter.

Anhydrite, a mineral composed of calcium sulfate ($CaSO_4$), may be favorable for mineral carbonation. Carbonation involves the capture and storage of carbon dioxide ($CO_2$) by reacting it with minerals to form stable carbonate compounds, effectively removing $CO_2$ from the atmosphere and storing it in a solid form within subsurface geological formations.

Assessment of Modification of Minerals

The XRD analysis of the rock samples exposed to various treatments revealed changes in their mineral composition. Anhydrite is chemically reactive and can readily dissolve in water. When $CO_2$ is injected into an underground reservoir such as a depleted oil or gas reservoir or a saline aquifer, or mixed with water and brought into contact with anhydrite-rich rocks or minerals, it can react with the anhydrite to form carbonates including, but not limited to, $CaCO_3$ and $FeCO_3$, sulfates ($SO_4^{2-}$), and other rock minerals depending on the fluids composition and rock mineral impurities. The resulting carbonates are stable solid minerals that do not readily dissolve. These minerals can precipitate within the rock formations, effectively locking away the carbon dioxide in a geological reservoir. These reactions can be represented as follows:

$CaSO_4(s) \rightleftharpoons Ca^{2+}(aq)+SO_4^{2-}(aq)$ [bulk rock dissolution]

$CaSO_4(s)+CO_2+H_2O \rightleftharpoons CaCO_3+2H^++SO_4^{2-}$ [carbonation of anhydrite]

$Ba^{2+}(aq)+SO_4^{2-}(aq) \rightleftharpoons BaSO_4$ [formation of barite]

$Fe^{2+}+CO_3^{2-} \rightleftharpoons FeCO_3(s)$ [formation of siderite]

$CaMg(CO_3)_2(s) \rightleftharpoons Mg^{2+}+Ca^{2+}+2CO_3^{2-}$ [dissolution of dolomite]

Figure 2:
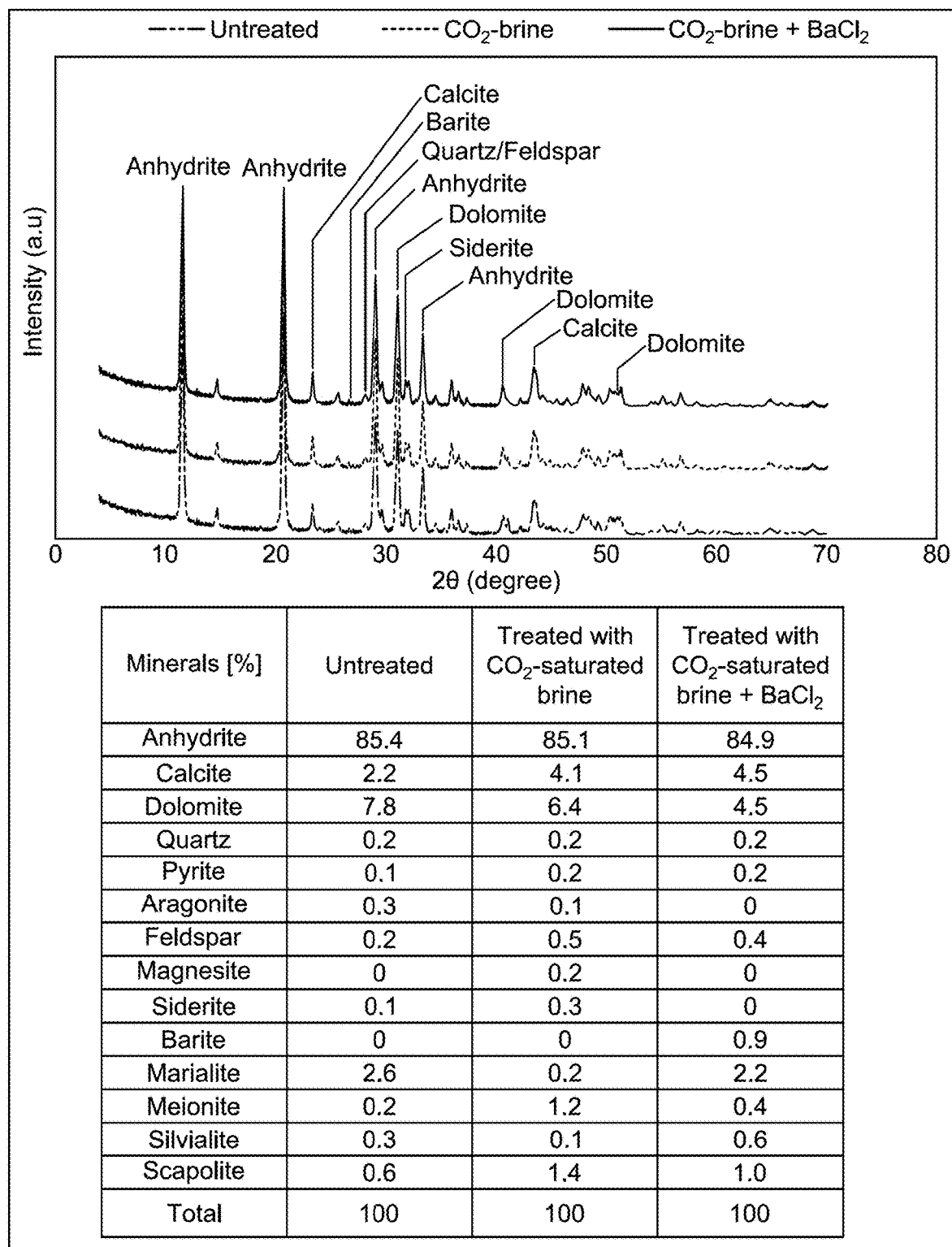
FIG. 2 shows bulk X-ray diffraction (XRD) mineralogy for untreated rock and $CO_2$-brine treated rock, according to certain embodiments.
Figure 3E:
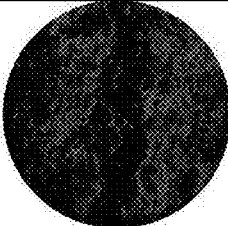
FIG. 3E shows a map of iron (Fe) from XRF spectrograph for the untreated rock, $CO_2$-brine treated rock and $CO_2$-brine plus barium chloride treated rock, according to certain embodiments.
Figure 3E:
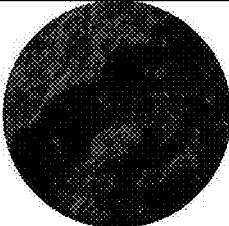
Figure 3E:
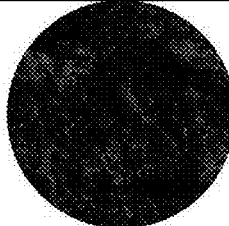
Figure 3F:
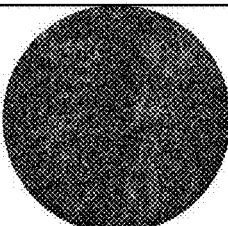
FIG. 3F shows a map of magnesium (Mg) from XRF spectrograph for the untreated rock, $CO_2$-brine treated rock and $CO_2$-brine plus barium chloride treated rock, according to certain embodiments.
Figure 3F:
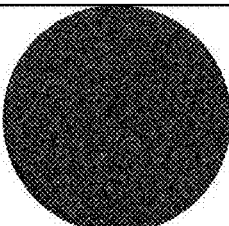
Figure 3F:
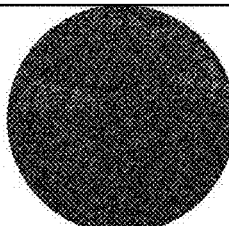
Figure 3G:
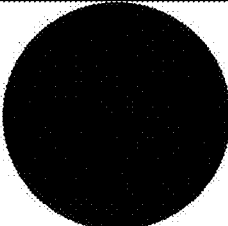
FIG. 3G shows a map of chlorine (Cl) from XRF spectrograph for the untreated rock, $CO_2$-brine treated rock and $CO_2$-brine plus barium chloride treated rock, according to certain embodiments.
Figure 3G:
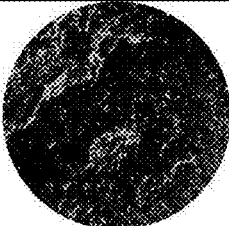
Figure 3G:
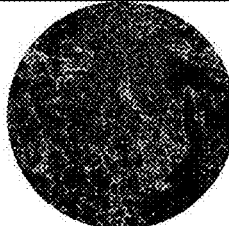

As shown in FIG. 2, the primary mineral content of the unaltered sample included 85.4 wt. % anhydrite, 2.2 wt. % calcite, 7.8 wt. % dolomite, 3.7 wt. % scapolite, with traces of quartz, aragonite, feldspar, and siderite. In general, scapolite represents a group of silicate minerals found in rocks, composed of aluminum, calcium, and sodium silicate, with chlorine, carbonate, and sulfate. Scapolite mineral group encompasses various aluminosilicates, including meionite, marialite, and silvialite [See: B. W. Evans, D. M Shaw, and D. R. Haughton, "*Scapolite stoichiometry,*" Contrib. to Mineral. Petrol., vol. 24, no. 4, pp. 293-305, December 1969. See: K. M. F. Almeida and D. M. Jenkins, "*Stability field of the Cl-rich scapolite marialite,*" Am. Mineral., vol. 102, no. 12, pp. 2484-2493, December 2017, incorporated herein by reference in its entirety.] The scapolite occurs in sedimentary, metasedimentary, and igneous rocks depending on the depositional environment. Scapolite may be calcic (where calcium is predominant over sodium). Different forms of scapolite may include carbonate; meionite component ($Ca_4Al_6Si_6O_{24}(CO_3)$), sulfate; silvialite component, ($Ca_4Al_6Si_6O_{24}(SO_4)$), or predominant over chlorine; marialite component ($Na_4Al_3Si_9O_{24}Cl$) [See: D. K. Teertstra and B. L. Sherriff "*Scapolite cell-parameter trends along the solid-solution series,*" Am. Mineral., vol. 81, no. 1-2, pp. 169-180, February 1996. See: L. Torró et al., "*The incipient flash melting of scapolite and plagioclase megacrysts in alkali basalts of the Olot suite, Catalunya, Spain, and at Chuquet Genestoux, Puy-de-Dôme, France,*" Eur. J. Mineral., vol. 30, no. 1, pp. 45-59, January 2018, incorporated herein by reference in its entirety.]

Upon $CO_2$-brine interaction, a pronounced shift in mineral composition became evident. The most notable transformation occurred in calcite, which increased from 2.2 wt. % to 4.1 wt. %, and dolomite, which decreased from 7.8 wt. % to 6.4 wt. %. Notably, the NaCl-scapolite (marialite) decreased from 2.6 wt. % to 0.2 wt. %, while $CaCO_3$-scapolite (meionite) increases from 0.2 wt. % to 1.2 wt. %. Moreover, the scapolite group increased from 0.6 wt. % to 1.4 wt. %. This shows a shift in the composition of minerals after $CO_2$-brine interaction. In addition, there were increases in the proportions of feldspar and siderite, shifting from 0.2 wt. % to 0.5 wt. % and 0.1 wt. % to 0.3 wt. %, respectively. This altered mineral composition in the $CO_2$-brine treated sample strongly suggests the formation of carbonate minerals, with an increase in the presence of $CO_2$. Further, it indicates a slight decrease in aragonite and a decline in the weight percentage of dolomite, which implies its dissolution from the rock under these conditions. In the case of the $CO_2$-brine plus $BaCl_2$ treated sample, the prominent alteration occurred in calcite as it increased from 2.2 wt. % to 4.5 wt. %. In contrast, the composition of dolomite showed a marked reduction from 7.8 wt. % to 4.5 wt. %. The transformation in the scapolite endmembers is not as prominent as in the case of $CO_2$-brine treatment. The meionite increases from 0.2 wt. % to 0.4 wt. %, while the $CaSO_4$ endmember slightly increased from 0.3 wt. % to 0.6 wt. %. Furthermore, there was a slight increase in feldspar from 0.2 wt. % to 0.4 wt. %, and the emergence of barite (0.9 wt. %). These observations suggest mineralization and the formation of calcite, barite, and transformation of scapolite endmembers in response to $CO_2$-brine plus $BaCl_2$ treatment. Meanwhile, the decrease in the weight percentage of dolomite implies its dissolution during exposure to this fluid and conditions. The formation of carbonates favors carbonation, while the dissolution of dolomite promotes de-carbonation. The net consumption of $CO_2$ in the process is further discussed in the subsequent sections. These changes in mineral composition provide valuable insights into how different treatments affect the mineralogical makeup of the rock, which can have implications for various geological and engineering applications related to $CO_2$ storage. This minerals transformation process helps to store the captured $CO_2$ securely over geological timescales. Once $CO_2$ is mineralized into carbonates, it is no longer in a gaseous form and is thus stable and immobile. This provides a long-term $CO_2$ storage solution, as the carbonate minerals may persist for thousands or even millions of years without releasing the stored $CO_2$ back into the atmosphere.

XRF Analysis for Elemental Composition

The principal elements including the analyzed rock are calcium and sulfur, with smaller quantities of silicon, aluminum, iron, and magnesium. The XRF analysis of the sample following exposure to supercritical $CO_2$-saturated brine indicate that the elemental composition remained relatively consistent with the original composition, except for the observable higher intensity of silicon and chlorine, as shown in FIGS. 3A-3G. However, a notable variation was observed for the $CO_2$-brine and $BaCl_2$ treatment. Specifically, there is a distinct presence of barium on the XRF spectrographic map, indicating that barium was introduced into the rock due to this particular treatment. This contrast suggests that the introduction of barium chloride ($BaCl_2$) into the $CO_2$-brine fluid led to an alteration in the elemental composition of the rock, manifesting as a noticeable spread of barium on the elemental spectrographic map, presumably due to the complexation of barium and sulfate to form barite as observed in the XRD.

SEM Morphology

Figure 4A:
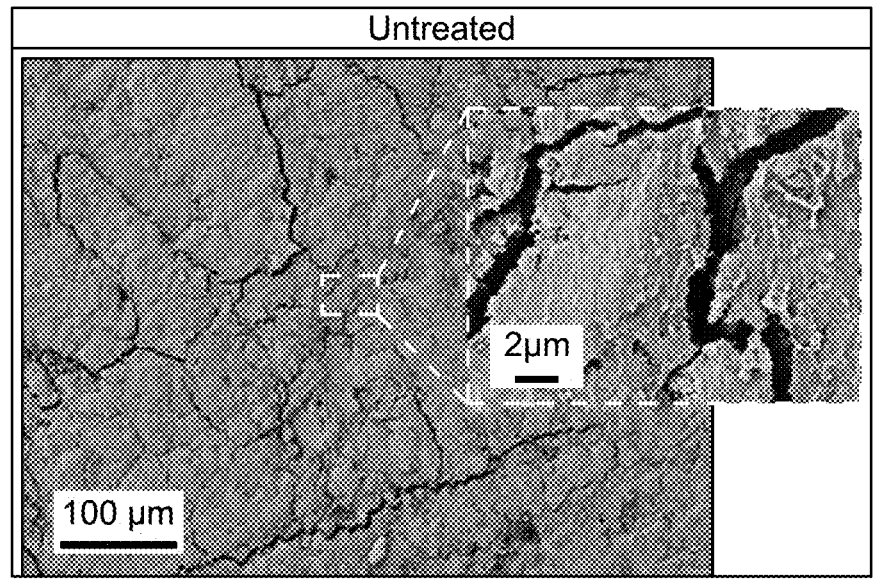
FIG. 4A is an optical image depicting scanning electron microscopy (SEM) morphology of untreated rock sample, according to certain embodiments.
Figure 4B:
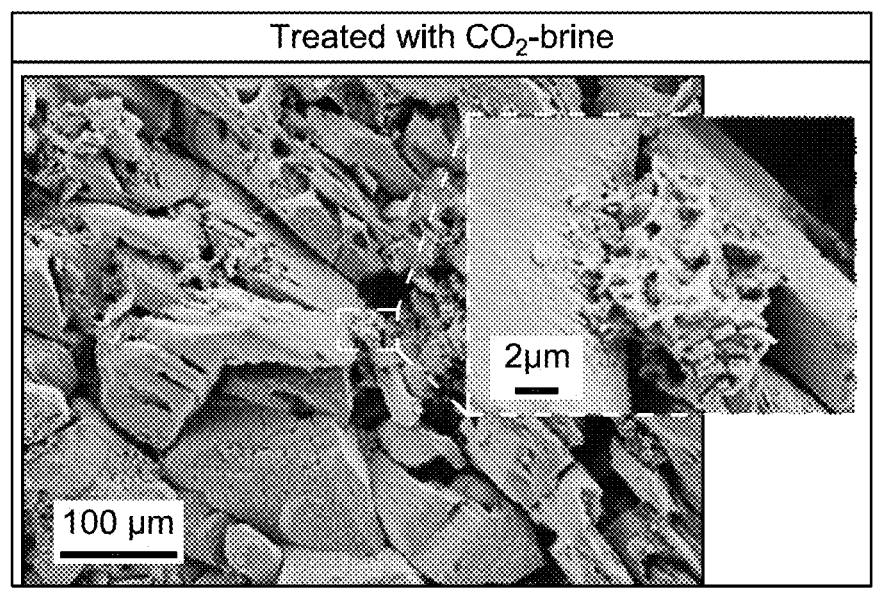
FIG. 4B is an optical image depicting SEM morphology of $CO_2$-brine treated rock sample, according to certain embodiments.
Figure 4C:
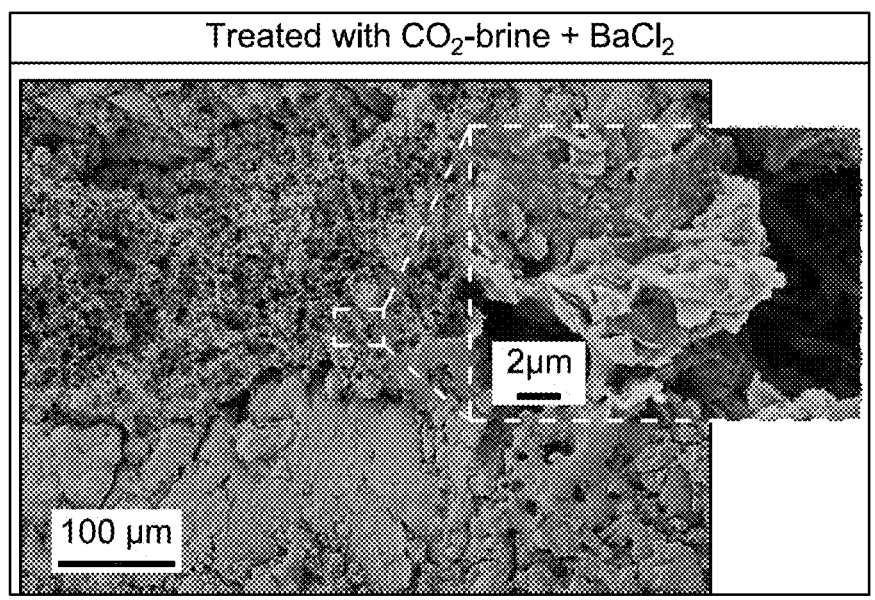
FIG. 4C is an optical image depicting SEM morphology of $CO_2$-brine plus barium chloride treated rock sample, according to certain embodiments.

The SEM images provide insights into the structural changes within the three different rock samples including the untreated rock, the rock exposed to supercritical $CO_2$-saturated brine, and the rock interacted with supercritical $CO_2$-saturated brine in the presence of $BaCl_2$. The SEM images shown in FIGS. 4A-4C, offer a visual distinction among these samples. In the case of the $CO_2$-brine-rock treatment, the SEM images reveal a notable dissolution and precipitation on the rock surface. This observation aligns well with the results of the geochemical analysis, which suggested that the primary process occurring during $CO_2$-brine interaction was dissolution and precipitation. The dissolution of the rock surface, as evidenced by the SEM images, corroborates this finding, and underscores how rock-fluid interactions alter the physical structure of the rock. In contrast, for the rock treated with $CO_2$-brine in the presence of $BaCl_2$, a different surface morphology emerges. The SEM images show the presence of mineral precipitates on the surface of the rock. This indicates that the introduction of $BaCl_2$ to the $CO_2$-brine-rock system led to predominantly mineral precipitation. The visual observations in the SEM images provide direct evidence of minerals transformation on the surface of the rock as a result of the interaction between the fluid and the anhydrite-rich rocks.

SEM-EDS Analysis

Figure 5A:
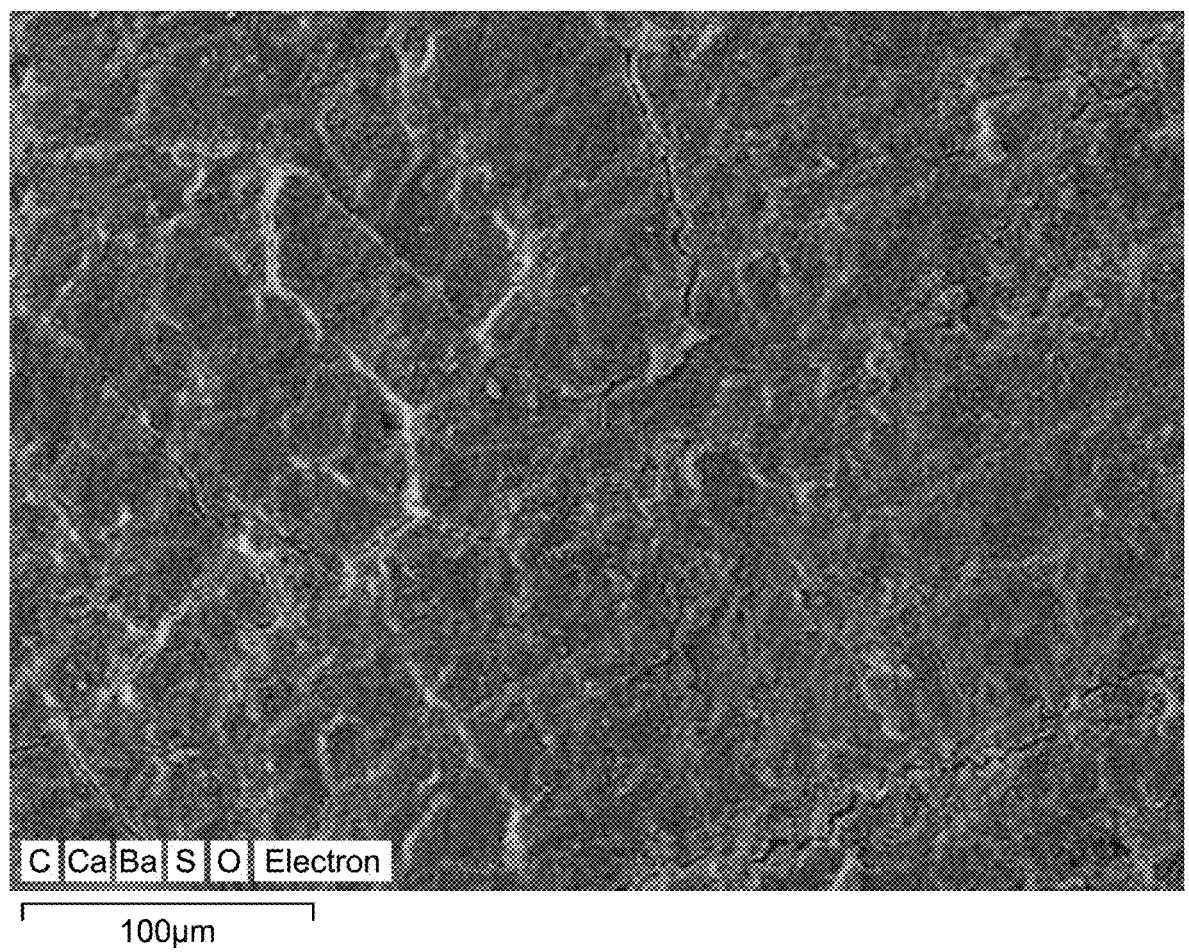
FIG. 5A is an energy dispersive spectroscopy (EDS) layered image depicting SEM-energy dispersive X-ray (SEM-EDX) elemental composition of the untreated rock sample, according to certain embodiments.
Figure 5B:
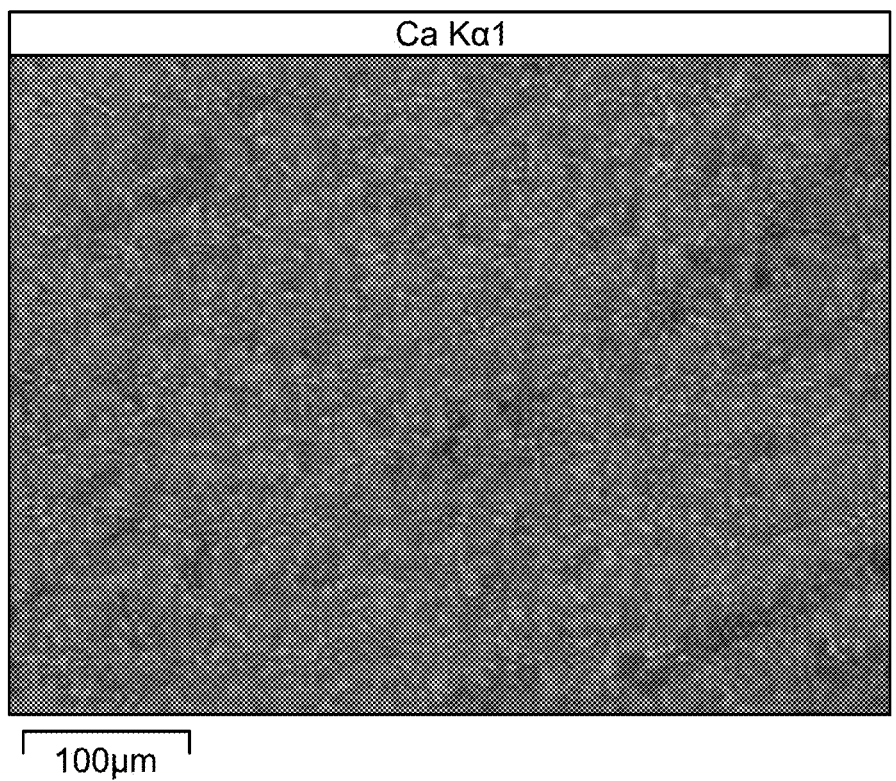
FIG. 5B is a SEM-EDX spectroscopic map of calcium (Ca) for the untreated rock sample, according to certain embodiments.
Figure 5C:
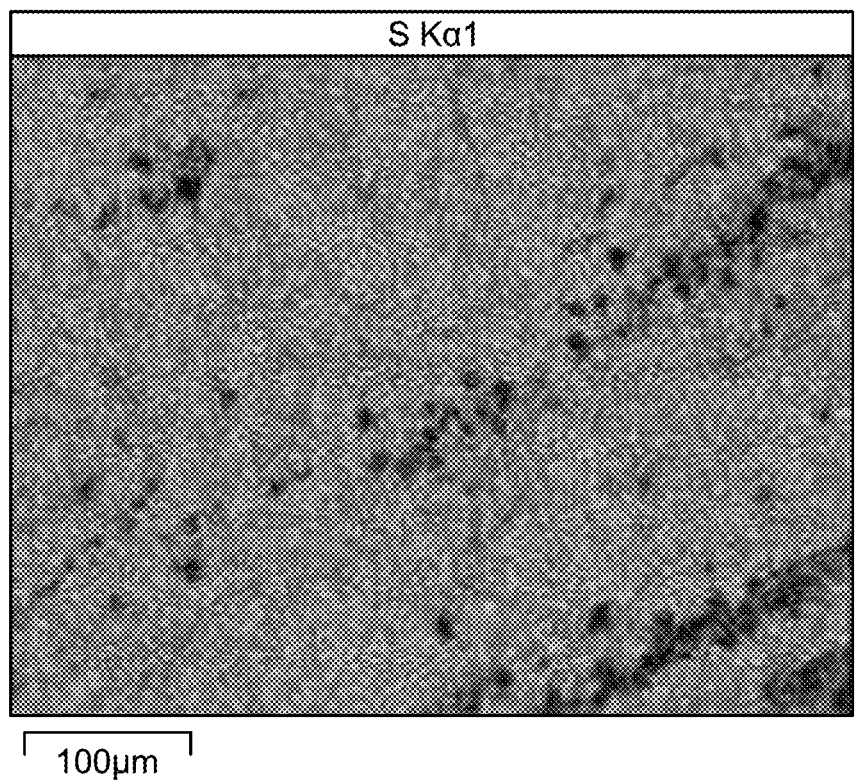
FIG. 5C is a SEM-EDX spectroscopic map of sulfur (S) for the untreated rock sample, according to certain embodiments.
Figure 5D:
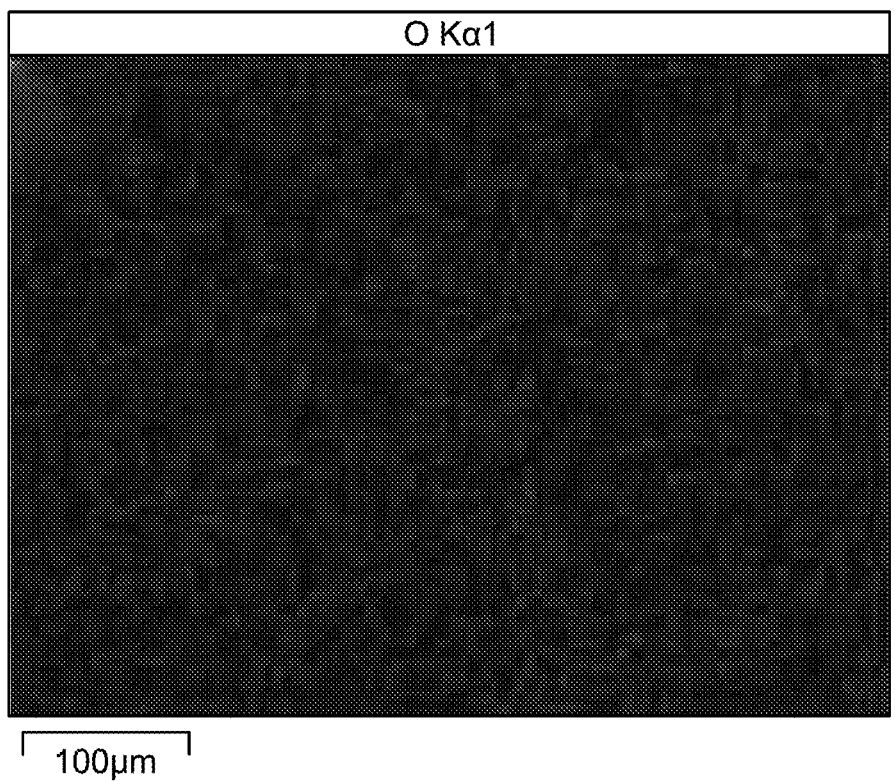
FIG. 5D is a SEM-EDX spectroscopic map of oxygen (O) for the untreated rock sample, according to certain embodiments.
Figure 5E:
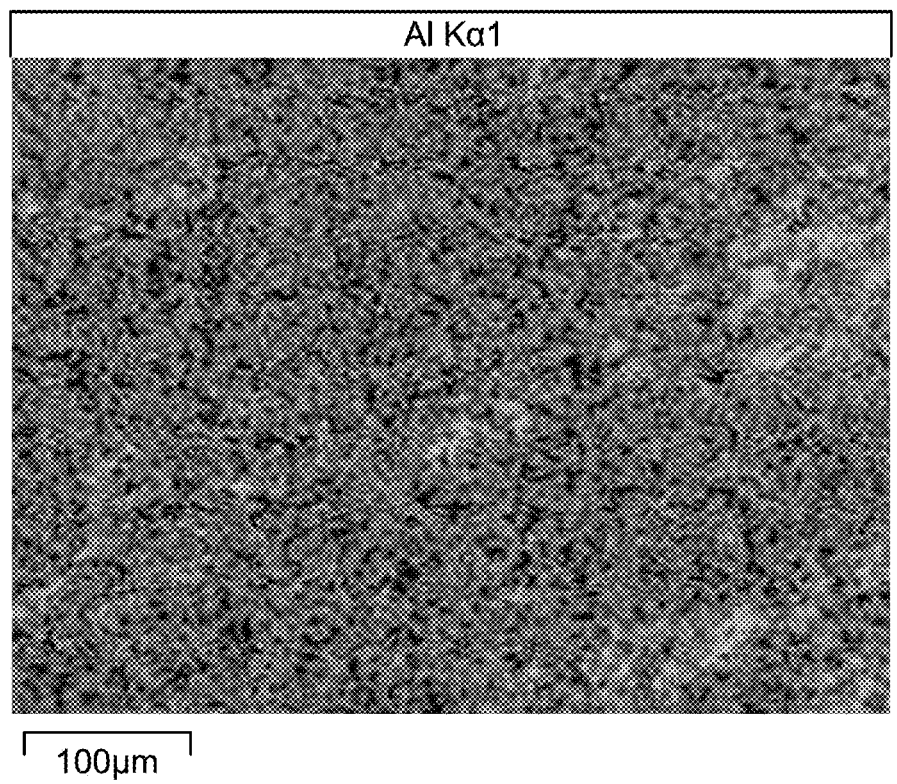
FIG. 5E is a SEM-EDX spectroscopic map of aluminium (Al) for the untreated rock sample, according to certain embodiments.
Figure 5F:
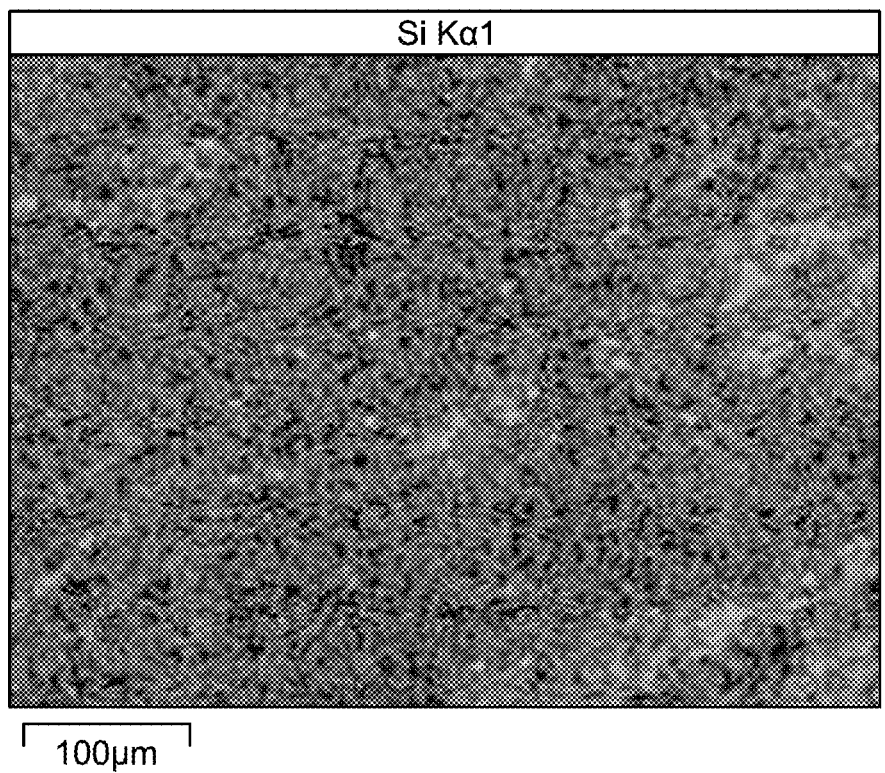
FIG. 5F is a SEM-EDX spectroscopic map of silicon (Si) for the untreated rock sample, according to certain embodiments.
Figure 5G:
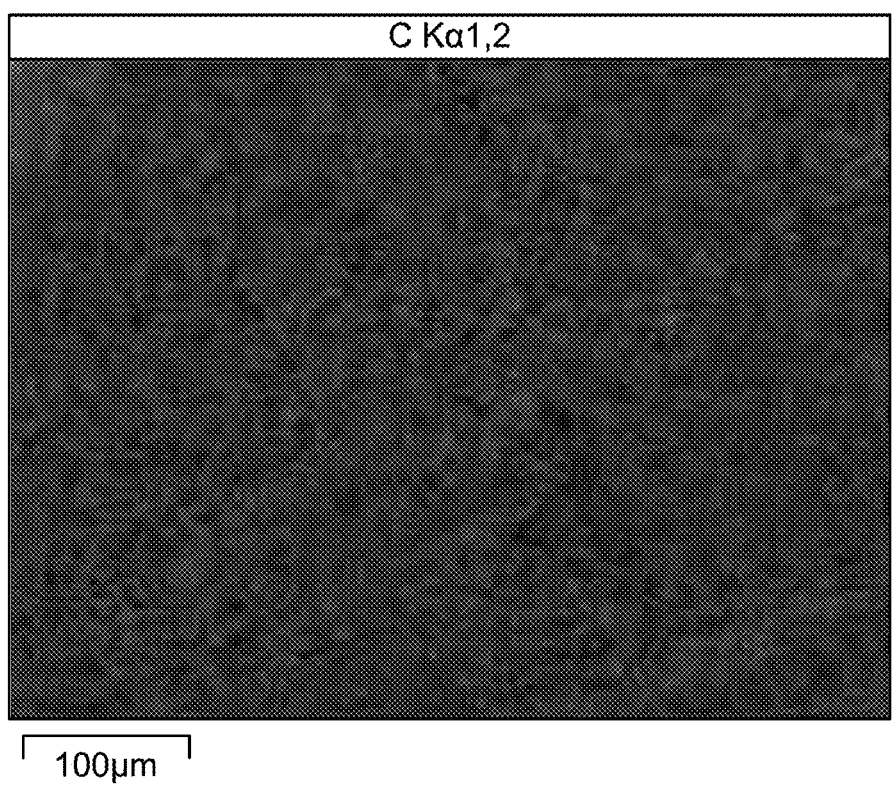
FIG. 5G is a SEM-EDX spectroscopic map of carbon (C) for the untreated rock sample, according to certain embodiments.
Figure 5H:
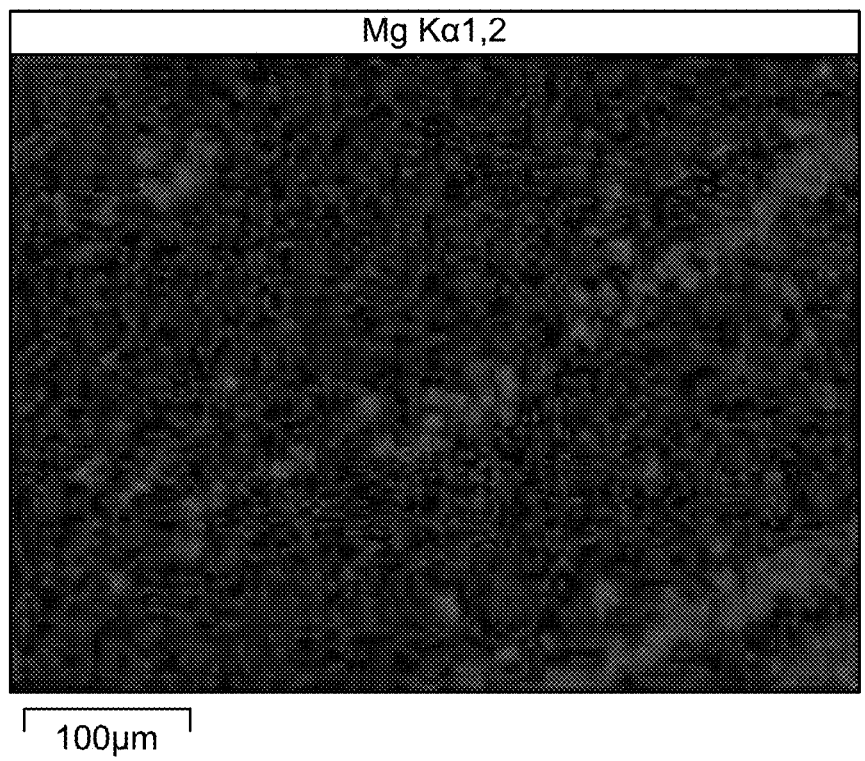
FIG. 5H is a SEM-EDX spectroscopic map of magnesium (Mg) for the untreated rock sample, according to certain embodiments.
Figure 5I:
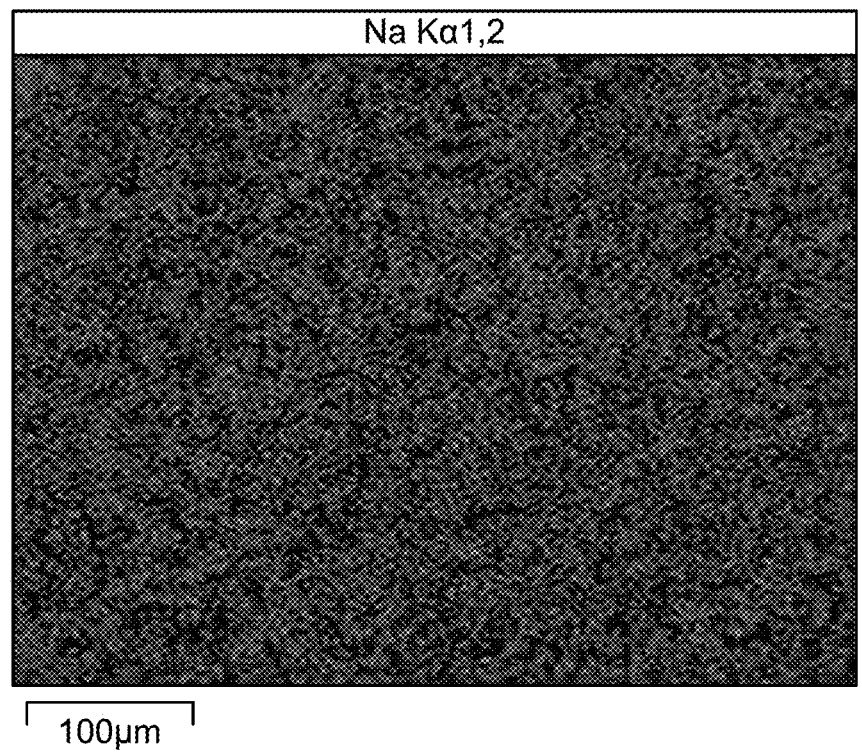
FIG. 5I is a SEM-EDX spectroscopic map of sodium (Na) for the untreated rock sample, according to certain embodiments.
Figure 5J:
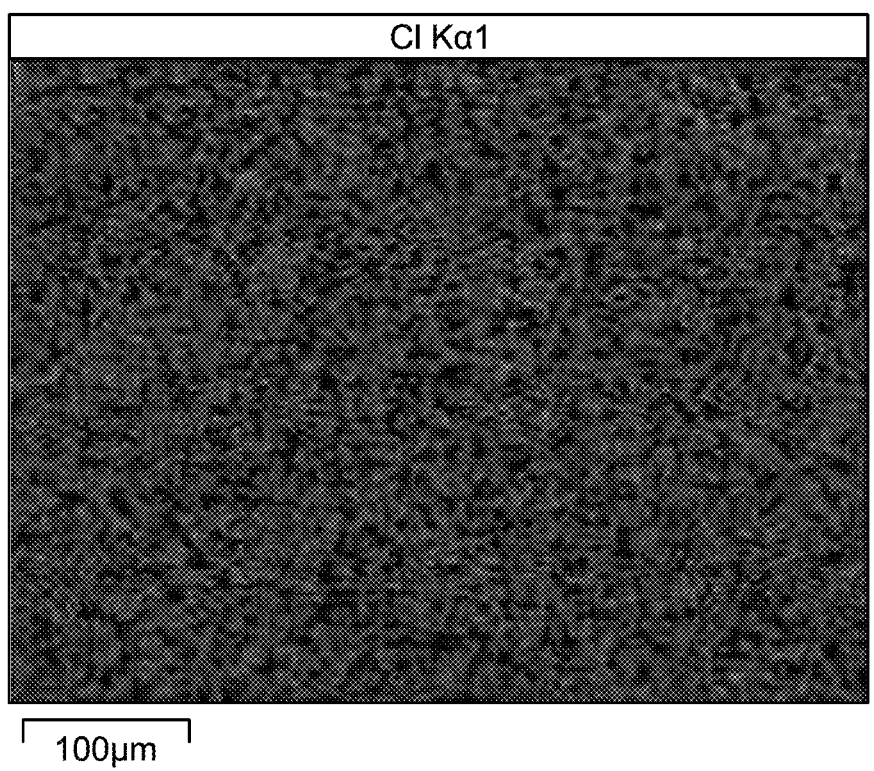
FIG. 5J is a SEM-EDX spectroscopic map of chlorine (Cl) for the untreated rock sample, according to certain embodiments.
Figure 5K:
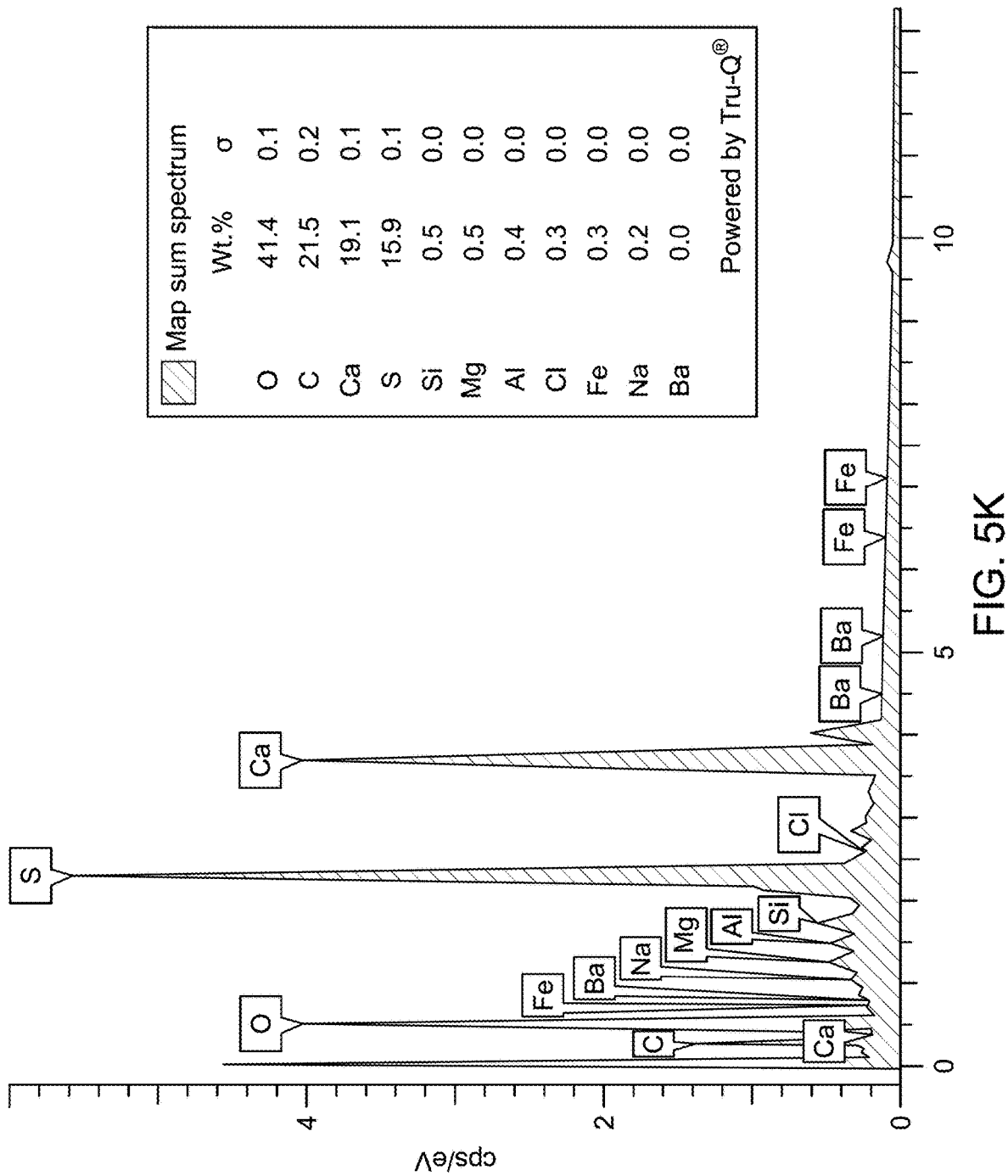
FIG. 5K is a layered map depicting elemental composition of the untreated rock sample, according to certain embodiments.
Figure 5L:
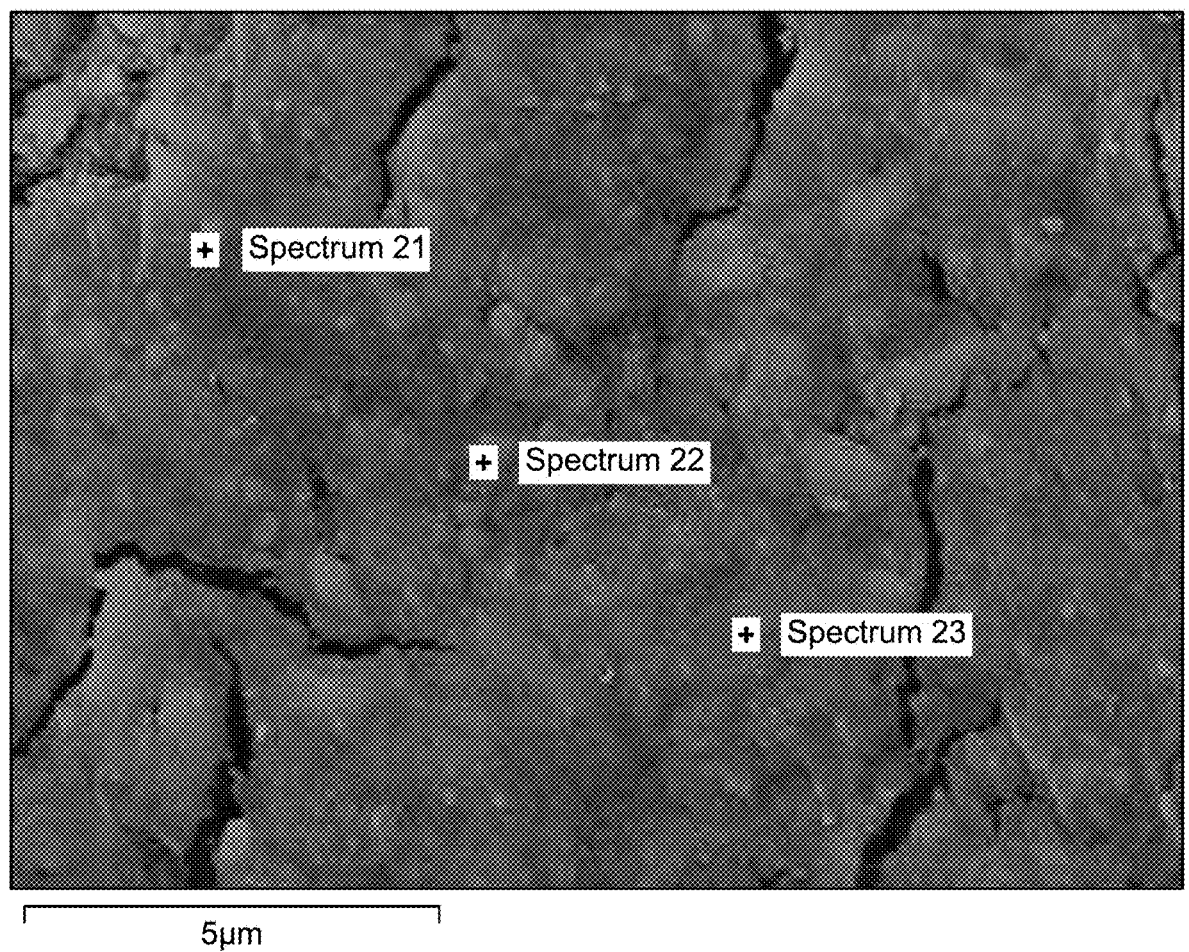
FIG. 5L is a point-based SEM-EDS, showing the spectrum points for the untreated rock sample, according to certain embodiments.
Figure 5M:
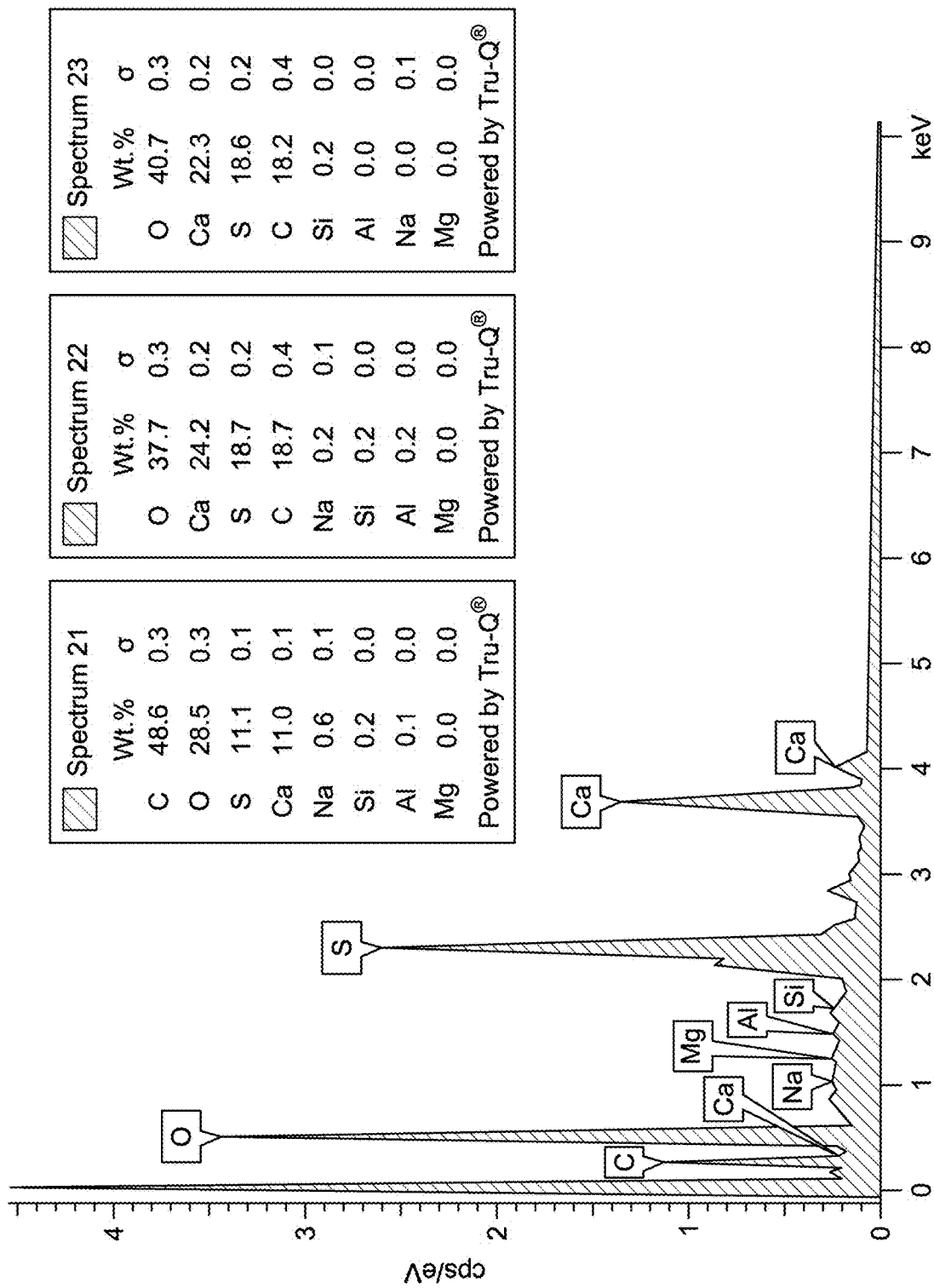
FIG. 5M is a graph depicting elemental composition of the spectra for the untreated rock samples, according to certain embodiments.

The EDX spectroscopy elemental mapping focuses on the elements present. The results of the EDX spectroscopy reveal that the untreated rock primarily consists of $CaSO_4$ with scattered areas of carbonates, as shown in FIG. 5A. In general, presence of the combination of carbon and oxygen indicates the presence of carbonates. The presence of carbonates is further corroborated by the elemental mapping analysis, as shown in FIGS. 5B-5J. Further, FIG. 5H shows an abundance of magnesium in these regions, suggesting that the regions contain some carbonates of magnesium, however since no magnesite was observed in the XRD analysis as described above, the findings may represent dolomite. Furthermore, minerals containing aluminum (Al) and silicon (Si), as shown in FIG. 5E and FIG. 5F, are presumed to be aluminosilicate-based exhibited a similar distribution in the carbonate regions, suggesting the presence of carbonate of aluminosilicate by the scapolite group observed in the XRD. The percentage composition of the elements within the EDX-mapped area is presented in FIG. 5K. In addition, the point-based SEM-EDX analysis of the untreated samples is depicted in FIG. 5L and the spectrum of elemental composition of the untreated sample is depicted in FIG. 5M. As can be seen from FIGS. 5L-5M, the untreated sample primarily includes $CaSO_4$.

Figure 6A:
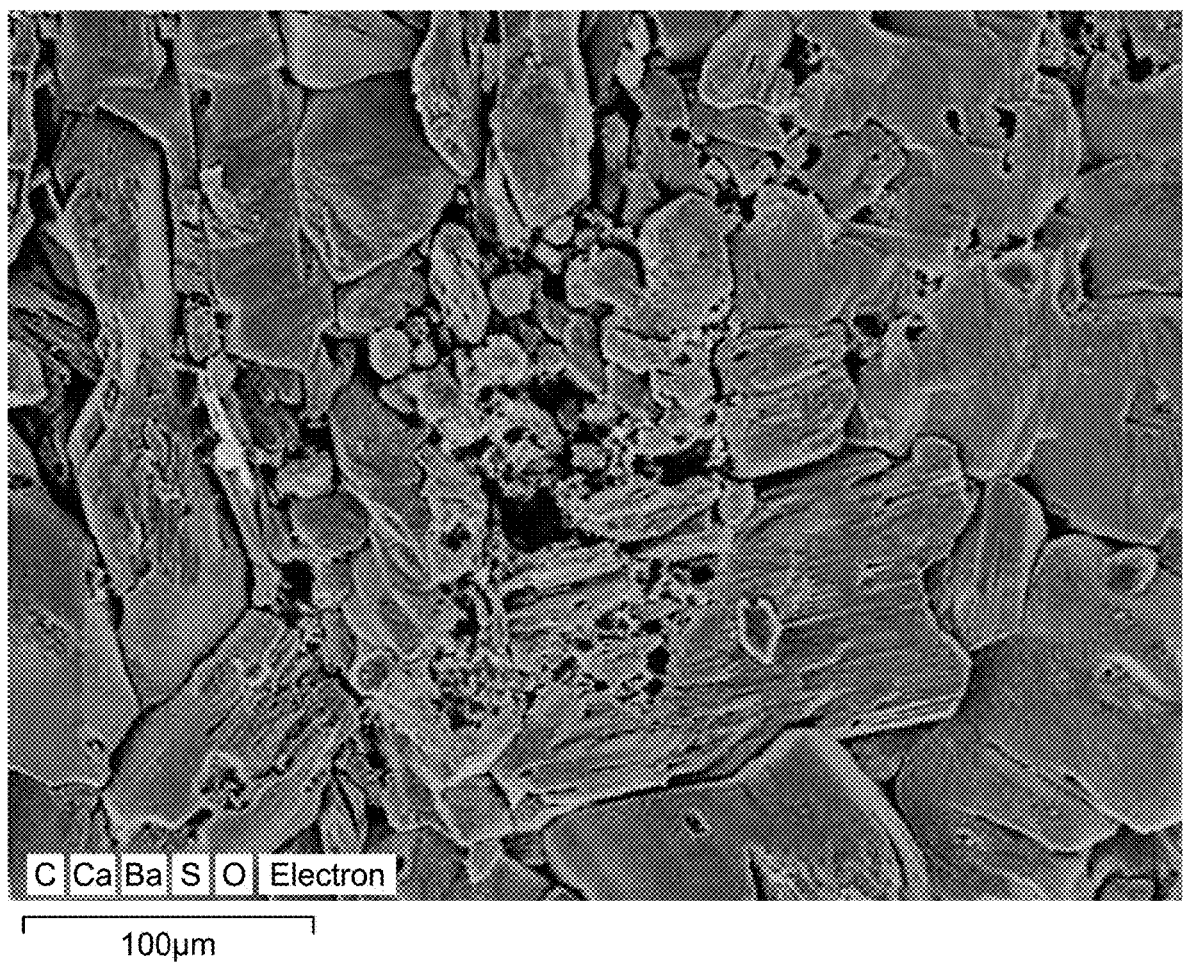
FIG. 6A is an EDS layered image showing SEM-EDX spectroscopic elemental composition of the $CO_2$-brine treated rock sample, according to certain embodiments.
Figure 6B:
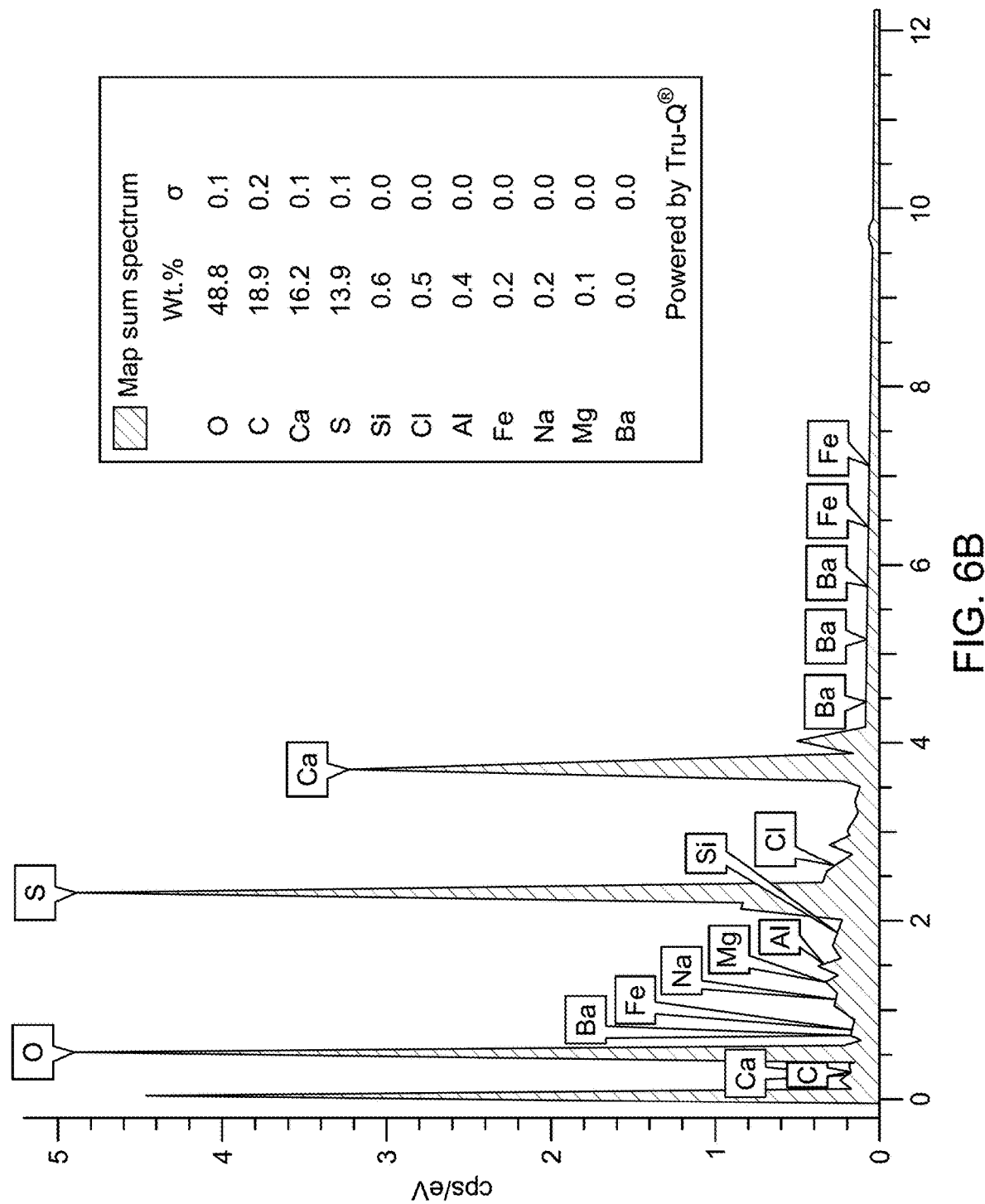
FIG. 6B is a layered map depicting elemental composition of the $CO_2$-brine treated rock sample, according to certain embodiments.
Figure 6C:
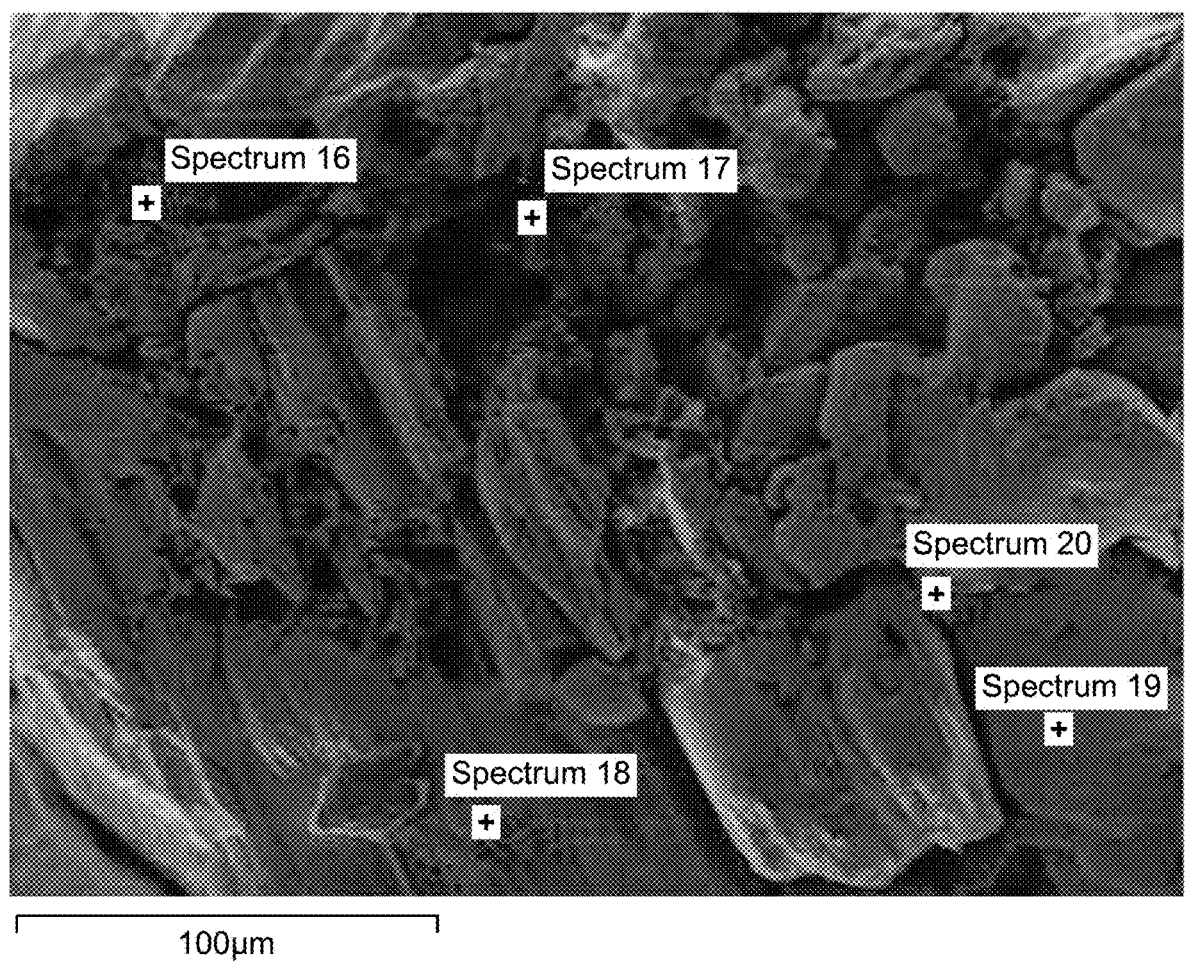
FIG. 6C is a point-based SEM-EDS, showing the spectrum points for the $CO_2$-brine treated rock sample, according to certain embodiments.
Figure 6D:
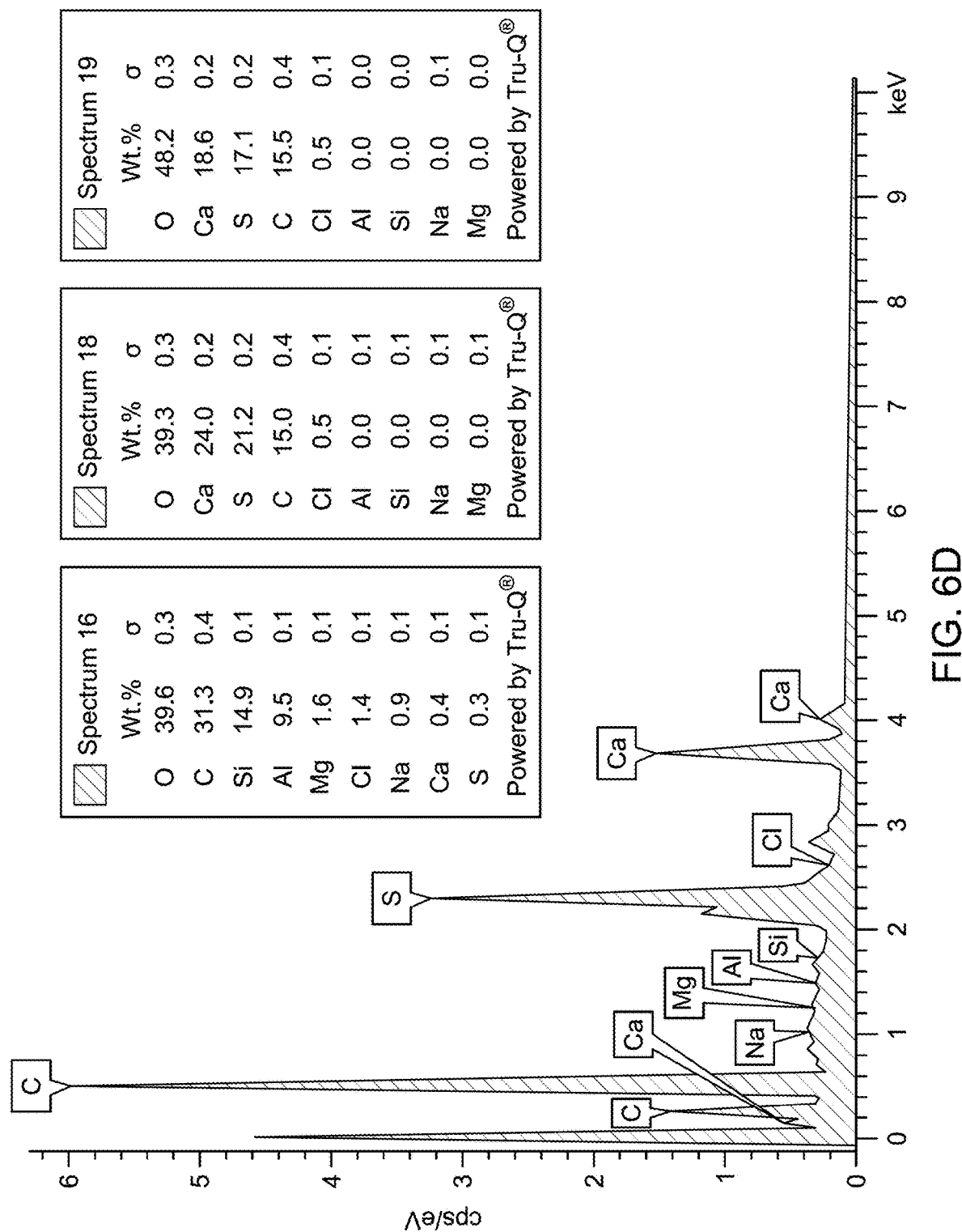
FIG. 6D is a graph depicting elemental composition of the spectra for the $CO_2$-brine treated rock sample, according to certain embodiments.
Figure 6E:
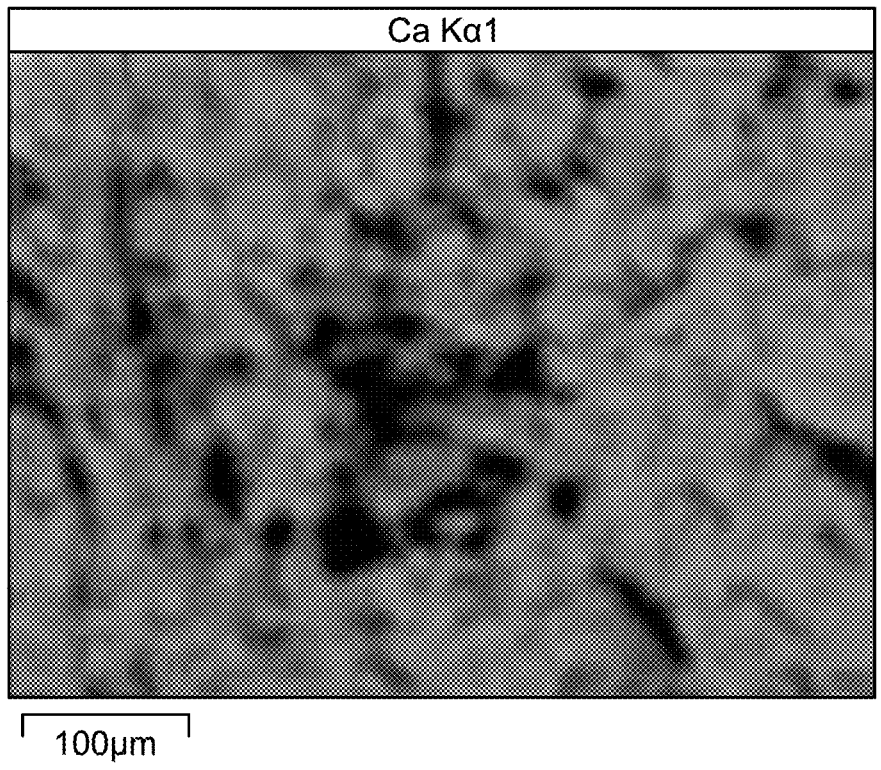
FIG. 6E is a SEM-EDX spectroscopic map of calcium for the $CO_2$-brine treated rock sample, according to certain embodiments.
Figure 6F:
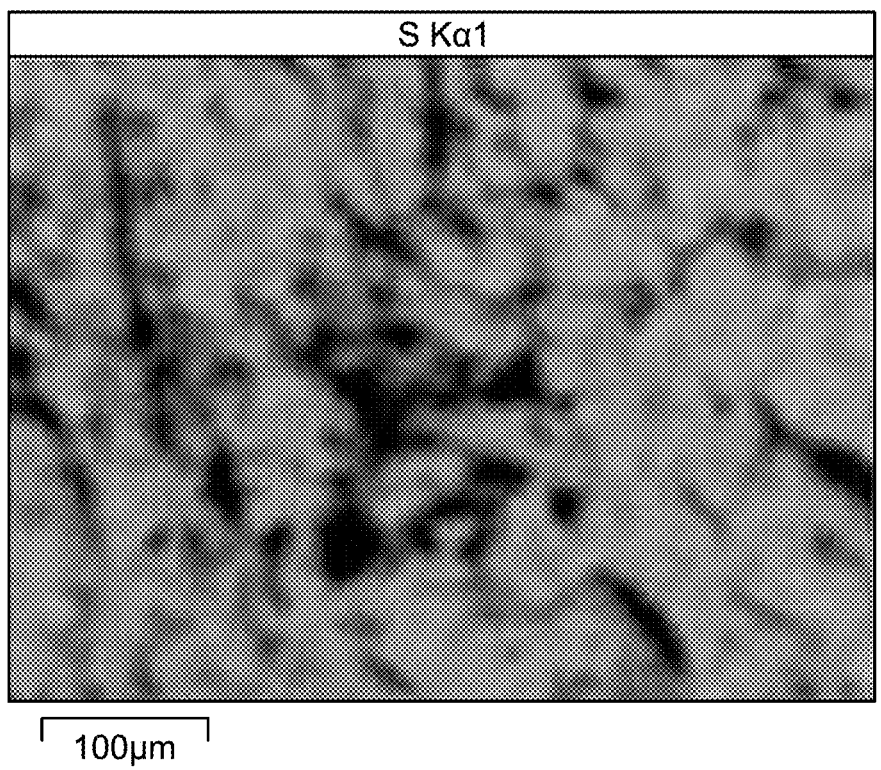
FIG. 6F is an sulfur in the SEM-EDX spectroscopic map of sulfur for the $CO_2$-brine treated rock sample, according to certain embodiments.
Figure 6G:
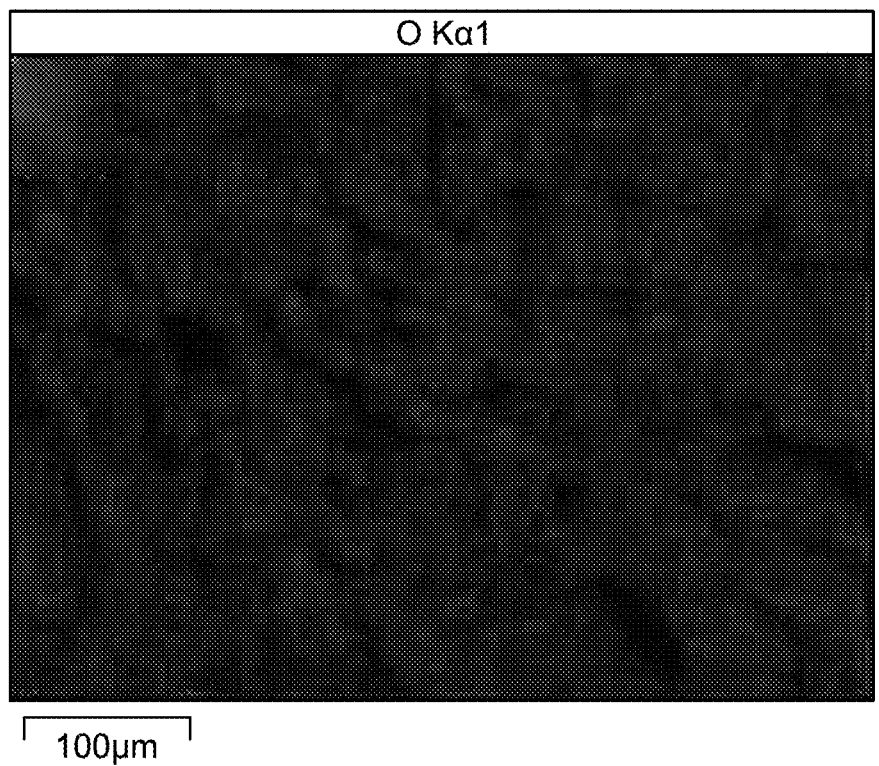
FIG. 6G is a SEM-EDX spectroscopic map of oxygen for the $CO_2$-brine treated rock sample, according to certain embodiments.
Figure 6H:
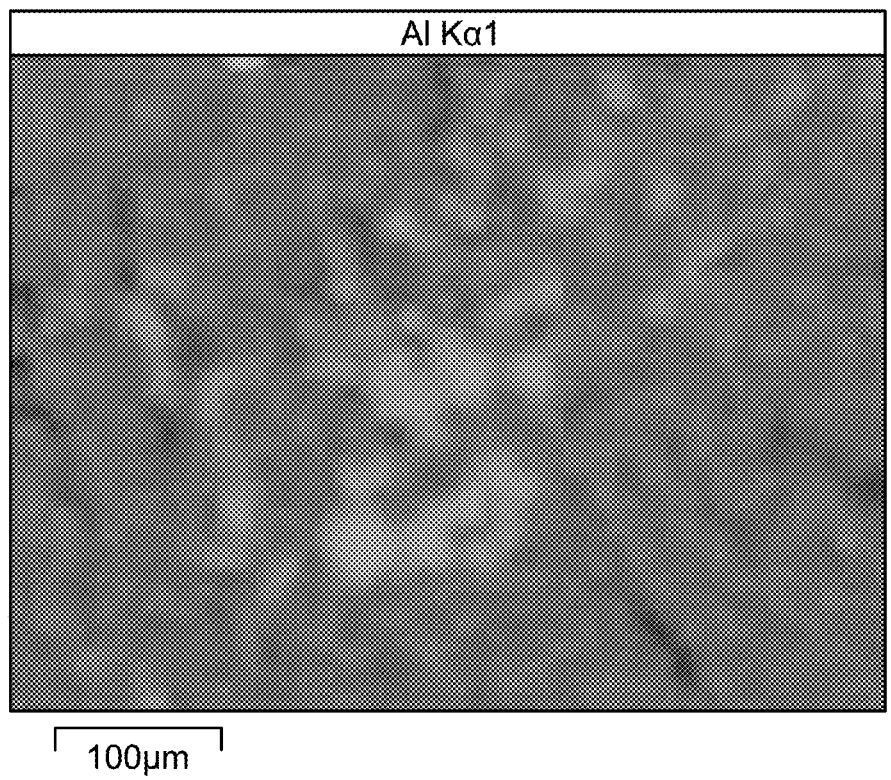
FIG. 6H is a SEM-EDX spectroscopic map of aluminium for the $CO_2$-brine treated rock sample, according to certain embodiments.
Figure 6I:
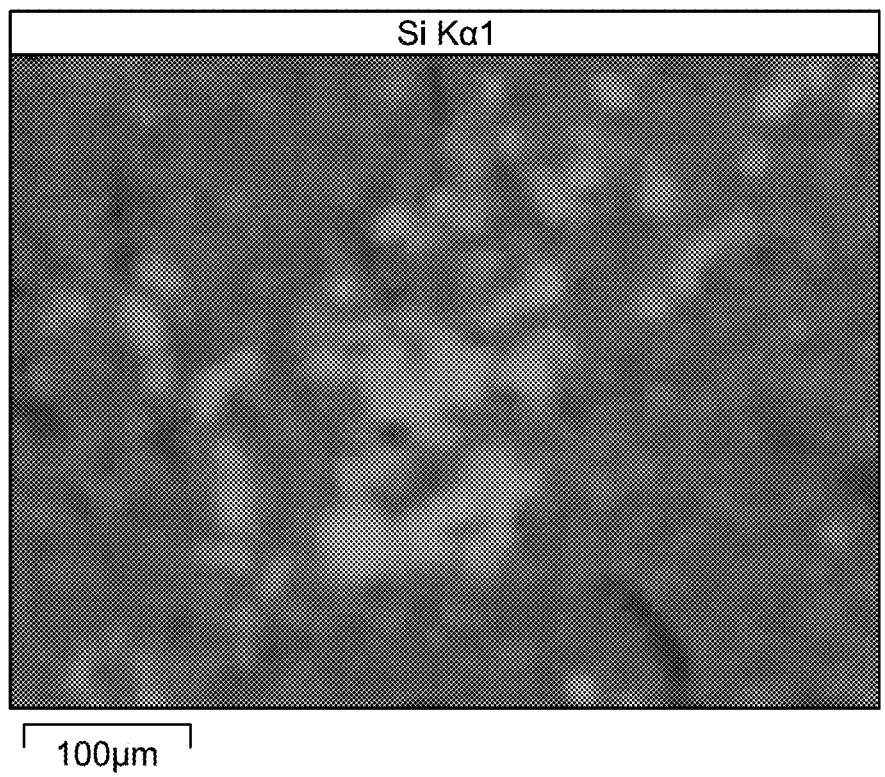
FIG. 6I is a SEM-EDX spectroscopic map of silicon for the $CO_2$-brine treated rock sample, according to certain embodiments.
Figure 6J:
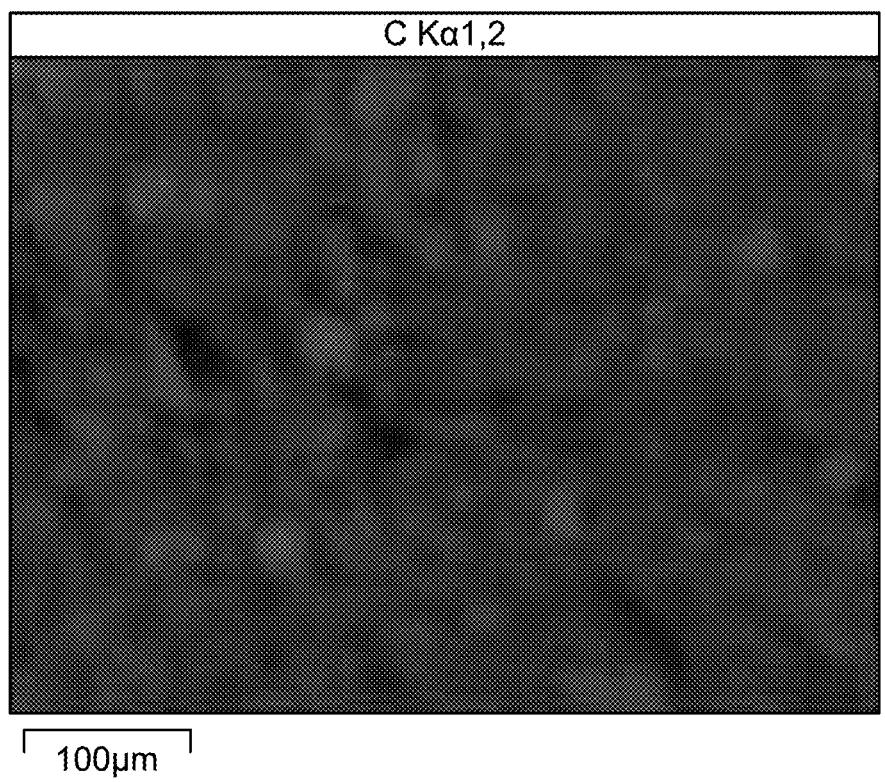
FIG. 6J is a SEM-EDX spectroscopic map of carbon for the $CO_2$-brine treated rock sample, according to certain embodiments.
Figure 6K:
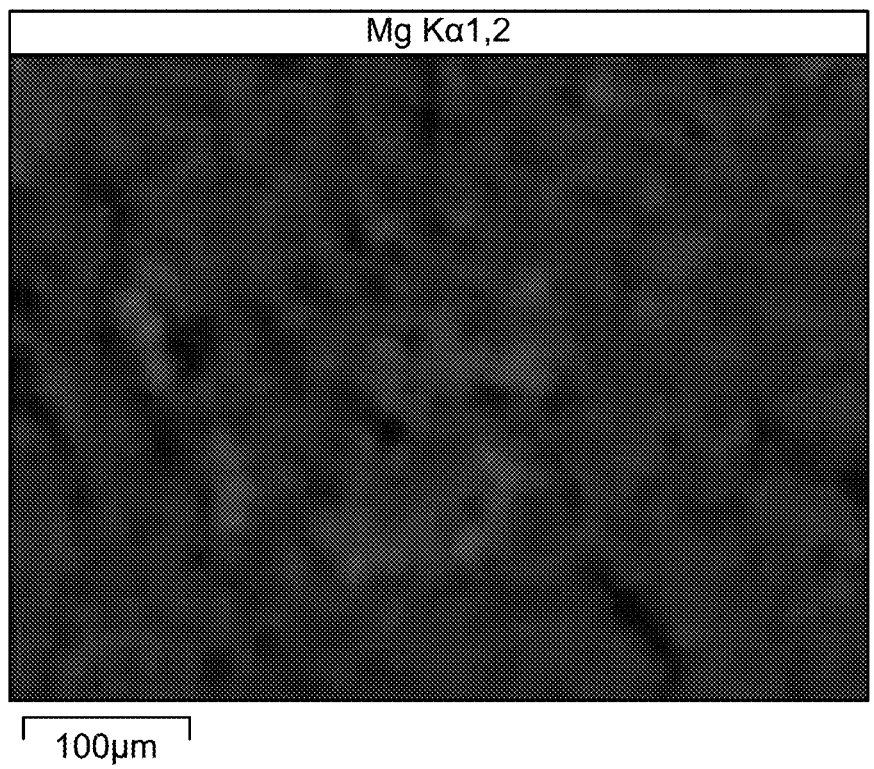
FIG. 6K is a SEM-EDX spectroscopic map of magnesium for the $CO_2$-brine treated rock sample, according to certain embodiments.
Figure 6L:
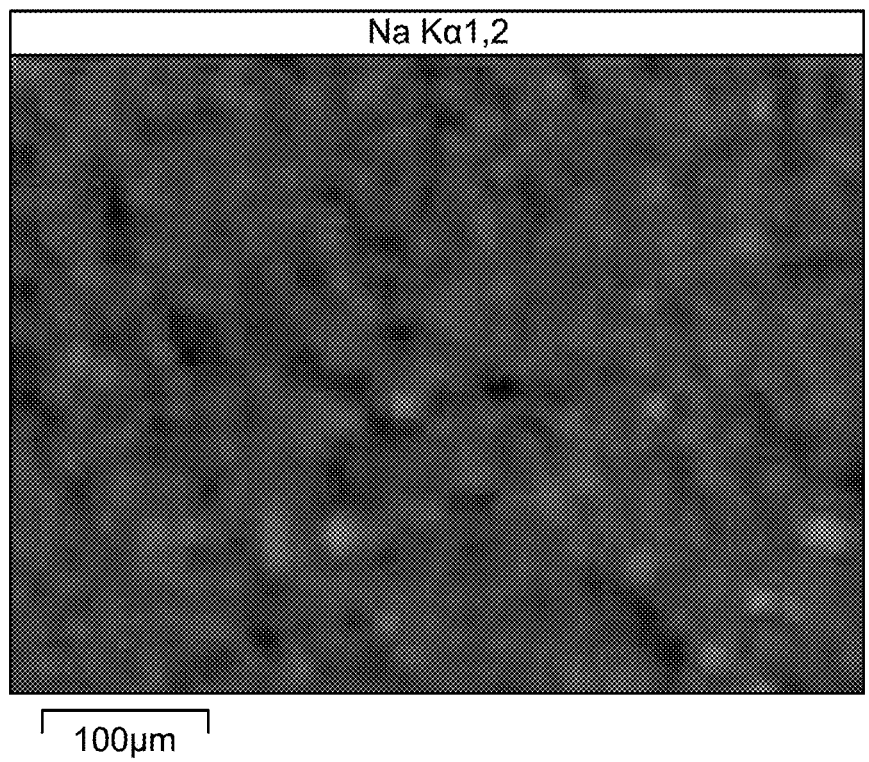
FIG. 6L is a SEM-EDX spectroscopic map of sodium for the $CO_2$-brine treated rock sample, according to certain embodiments.
Figure 6M:
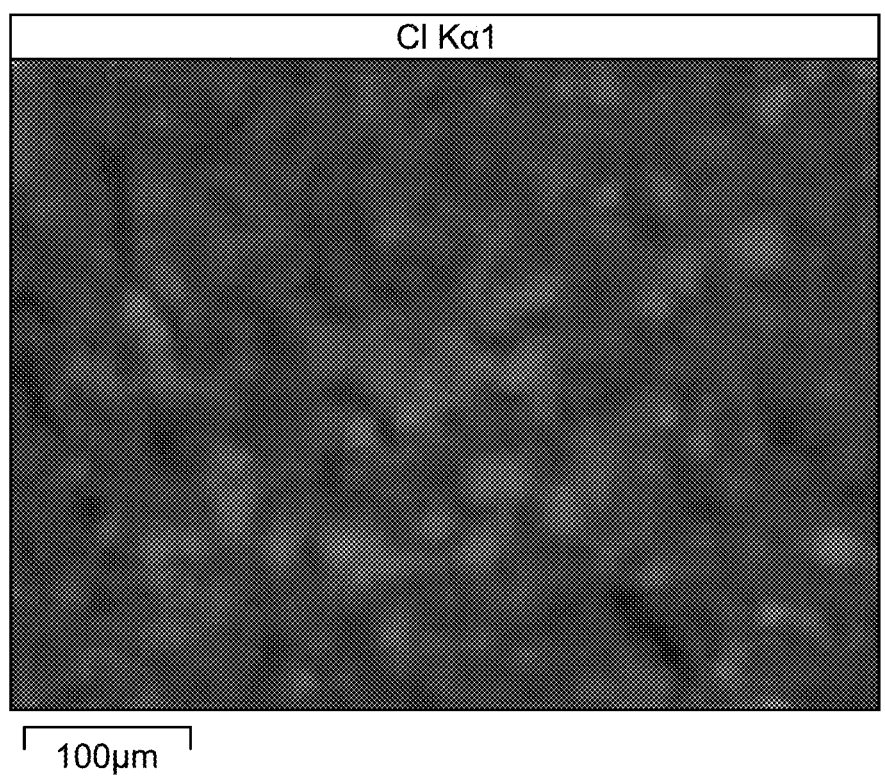
FIG. 6M is a SEM-EDX spectroscopic map of chlorine for the $CO_2$-brine treated rock sample, according to certain embodiments.

The analysis of the $CO_2$-brine treated rock revealed notable alteration in minerals. FIG. 6A shows a layered image from the EDS that highlights a presence of carbon and carbonates, following the interaction. In FIG. 6B, an elemental map spectrum primarily depicted a dominance of calcium sulfate. Further, the point-based SEM-EDS analysis, as shown in FIG. 6C, depicted that the formed carbonate includes aluminum, silicon, chlorine, and sodium, as observed in spectrum 16. In contrast, spectra 18 and 19, as shown in FIG. 6D depicts the host rock including calcium sulfate. Furthermore, FIGS. 6E-6M shows the dissolution of $CaSO_4$. Additionally, a notable presence of Al and Si was detected, with traces of Mg, which were evident due to the high intensity of the assigned coloration for the elements, shown in FIG. 6H, FIG. 6I, and FIG. 6M, respectively, suggesting the presence of carbonates of aluminosilicate.

Figure 7A:
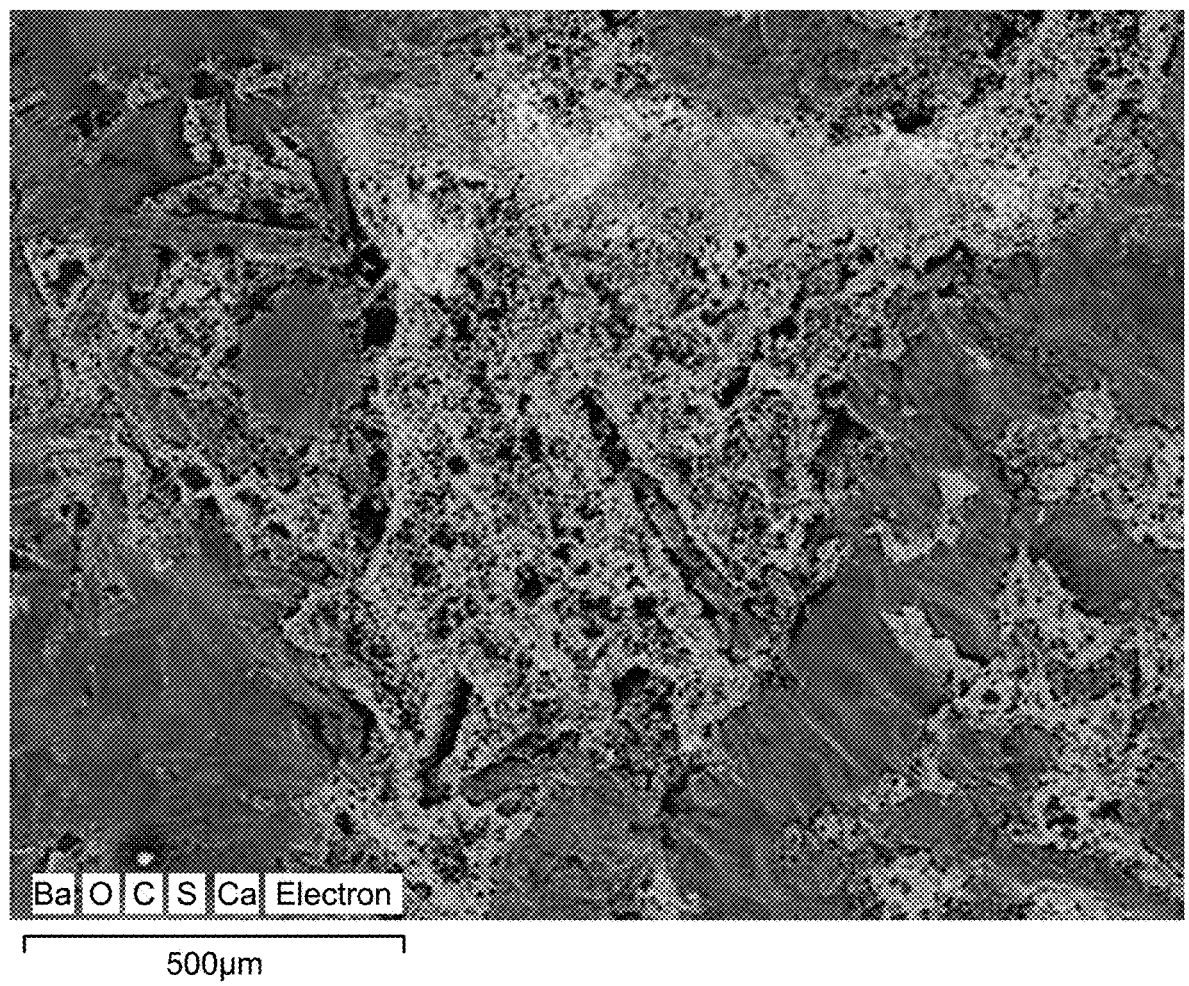
FIG. 7A is an EDS layered image showing SEM-EDX spectroscopic elemental composition of the $CO_2$-brine plus barium chloride treated rock sample, according to certain embodiments.
Figure 7B:
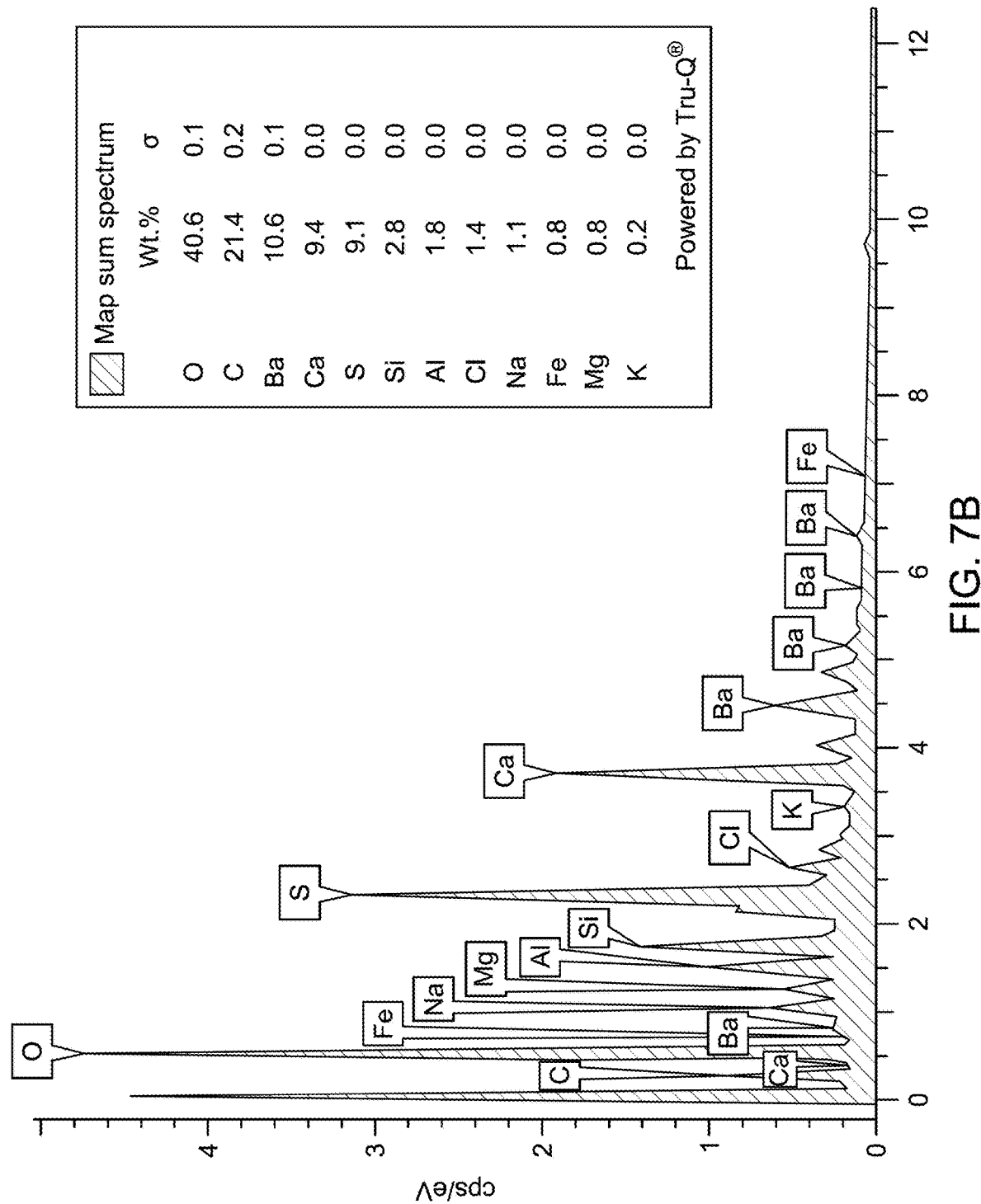
FIG. 7B is a layered map depicting elemental composition of the $CO_2$-brine plus barium chloride treated rock sample, according to certain embodiments.
Figure 7C:
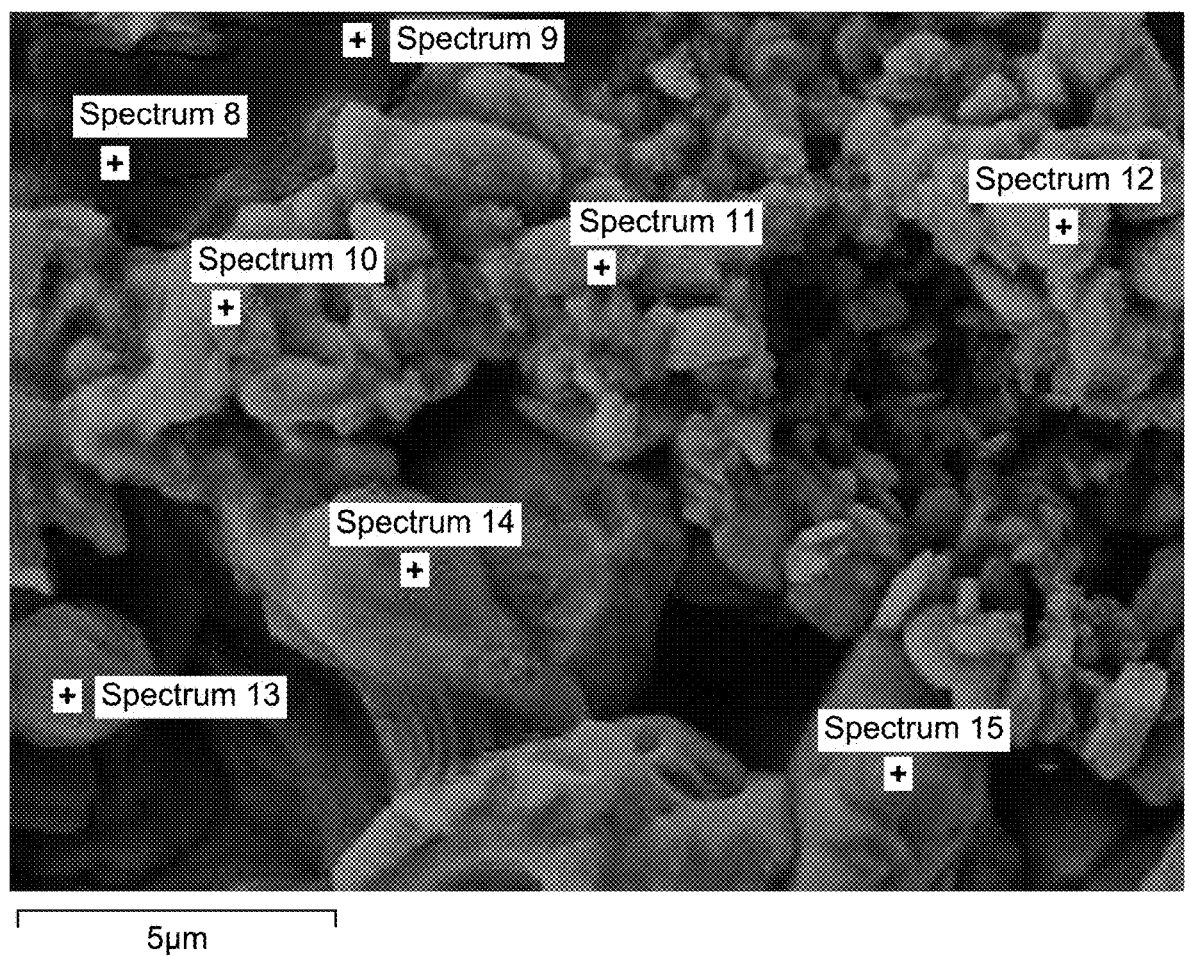
FIG. 7C is a point-based SEM-EDX, showing the spectrum points for the $CO_2$-brine plus barium chloride treated rock sample, according to certain embodiments.
Figure 7D:
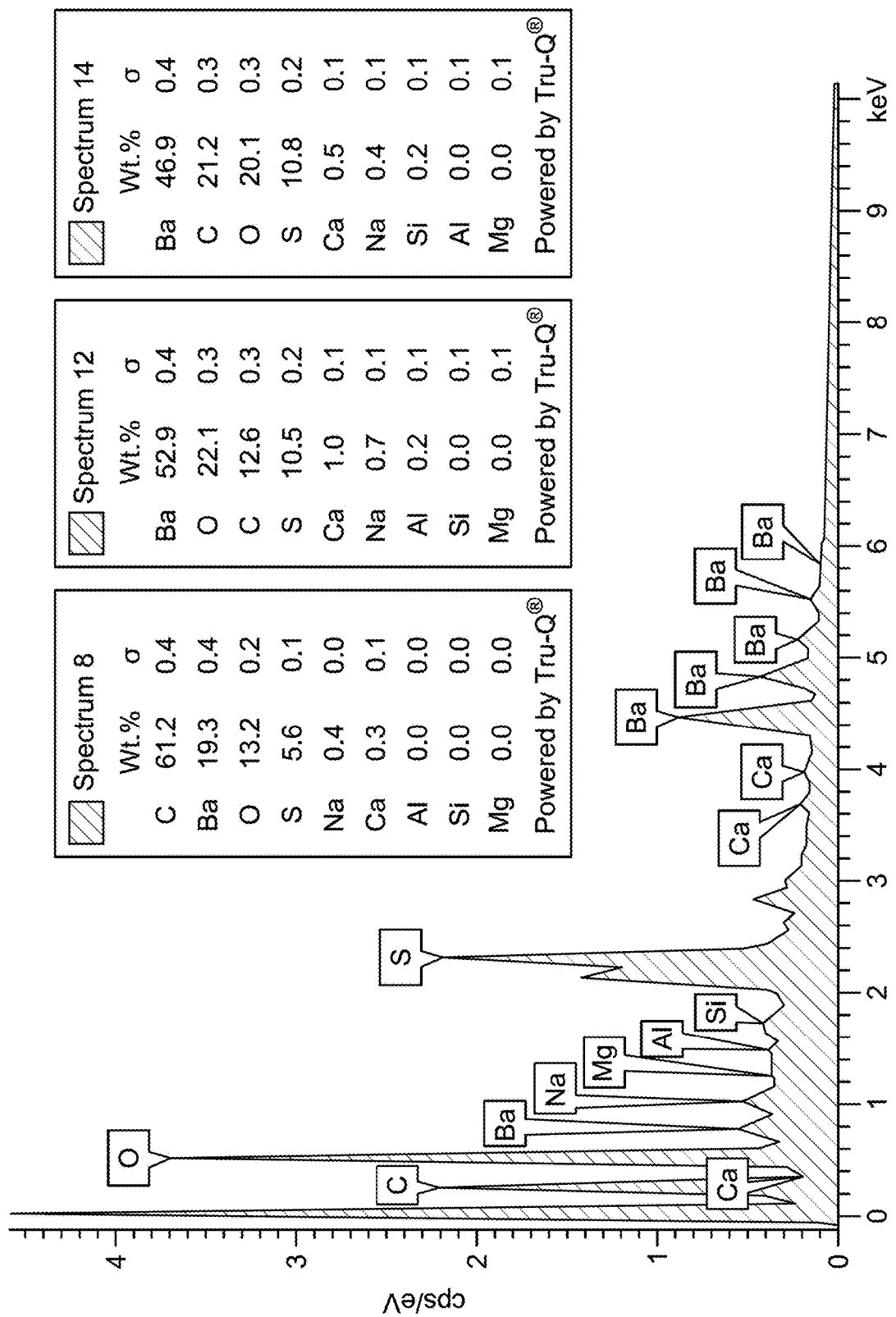
FIG. 7D is a graph depicting elemental composition of the spectra for the $CO_2$-brine plus barium chloride treated rock sample, according to certain embodiments.
Figure 7E:
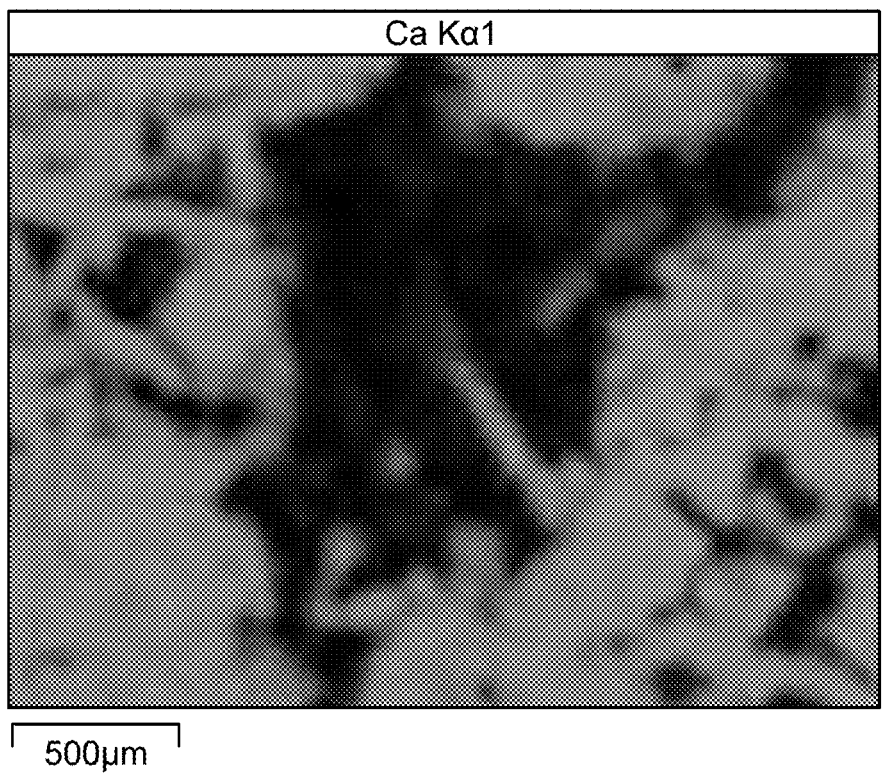
FIG. 7E is a SEM-EDX spectroscopic map of calcium for the $CO_2$-brine plus barium chloride treated rock sample, according to certain embodiments.
Figure 7F:
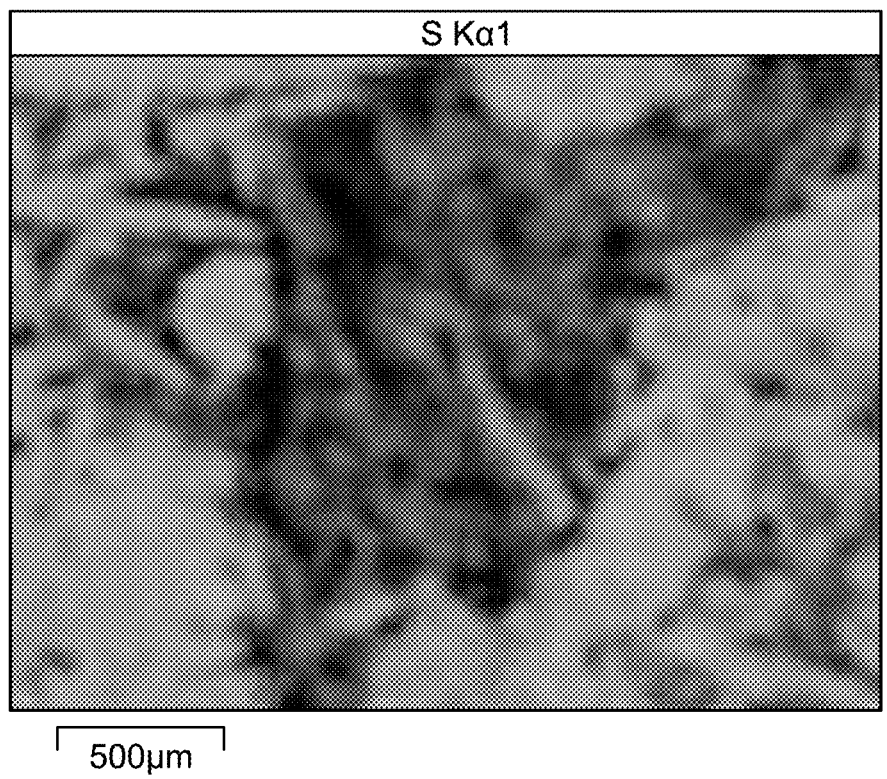
FIG. 7F is a SEM-EDX spectroscopic map of sulfur for the $CO_2$-brine plus barium chloride treated rock sample, according to certain embodiments.
Figure 7G:
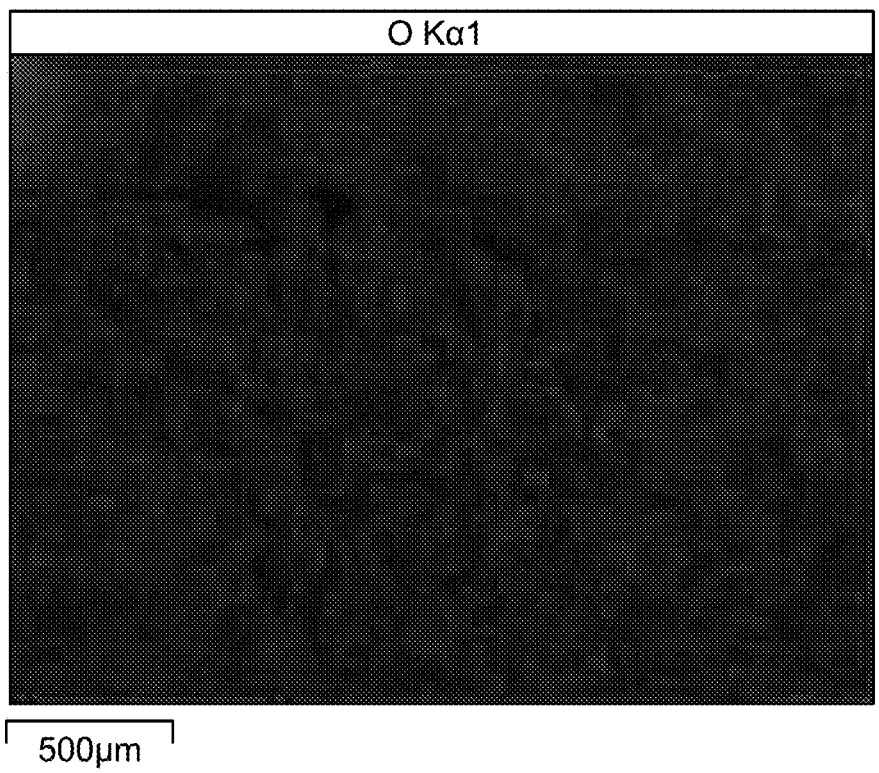
FIG. 7G is a SEM-EDX spectroscopic map of oxygen for the $CO_2$-brine plus barium chloride treated rock sample, according to certain embodiments.
Figure 7H:
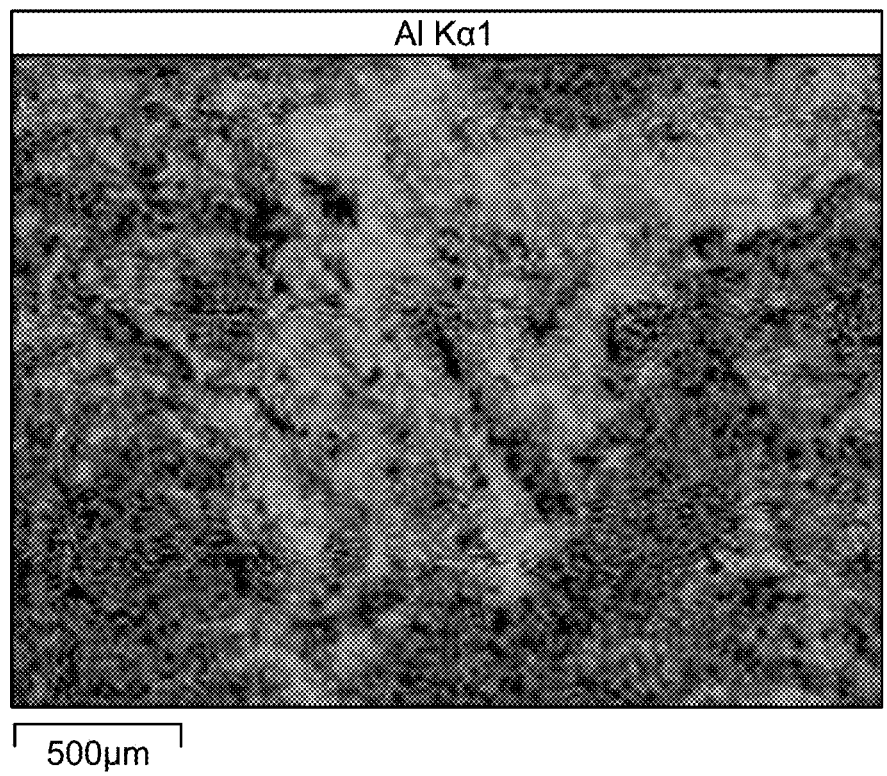
FIG. 7H is a SEM-EDX spectroscopic map of aluminium for the $CO_2$-brine plus barium chloride treated rock sample, according to certain embodiments.
Figure 7I:
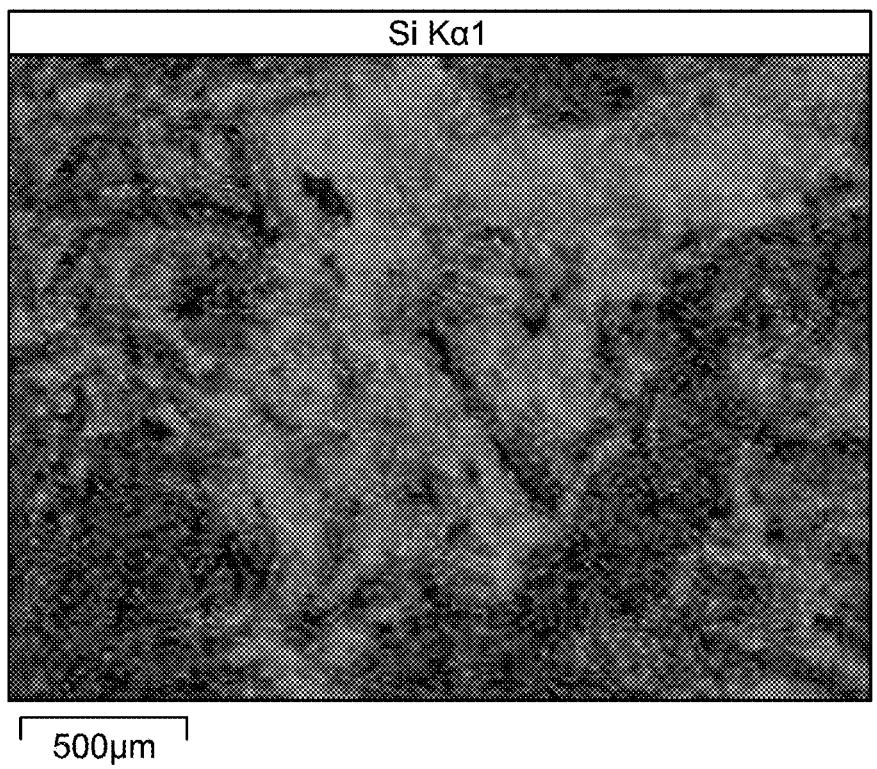
FIG. 7I is a SEM-EDX spectroscopic map of silicon for the $CO_2$-brine plus barium chloride treated rock sample.
Figure 7J:
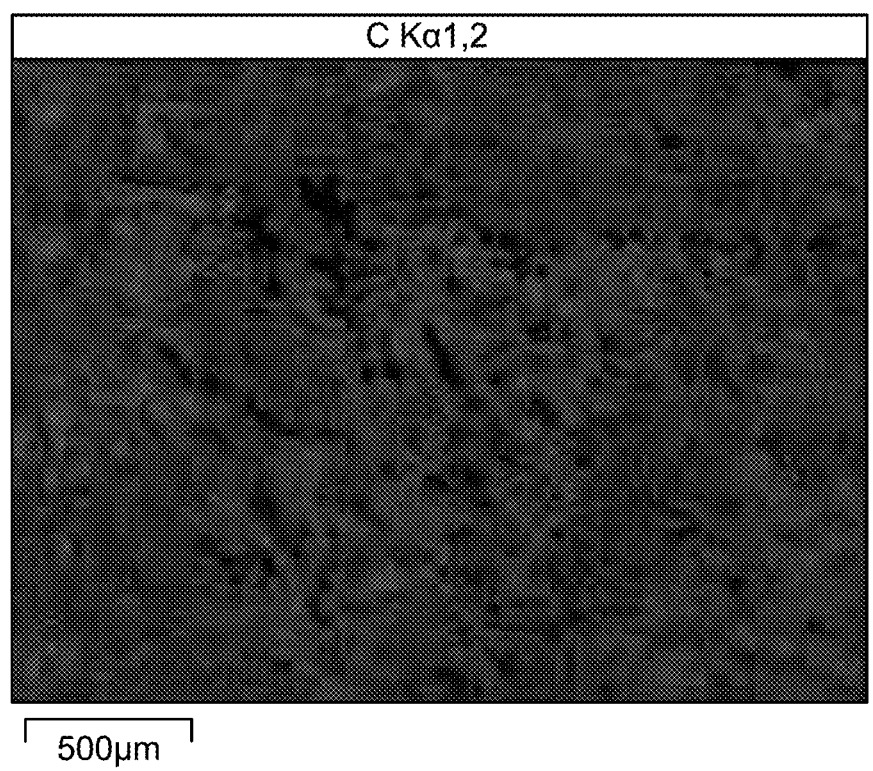
FIG. 7J is a SEM-EDX spectroscopic map of carbon for the $CO_2$-brine plus barium chloride treated rock sample, according to certain embodiments.
Figure 7K:
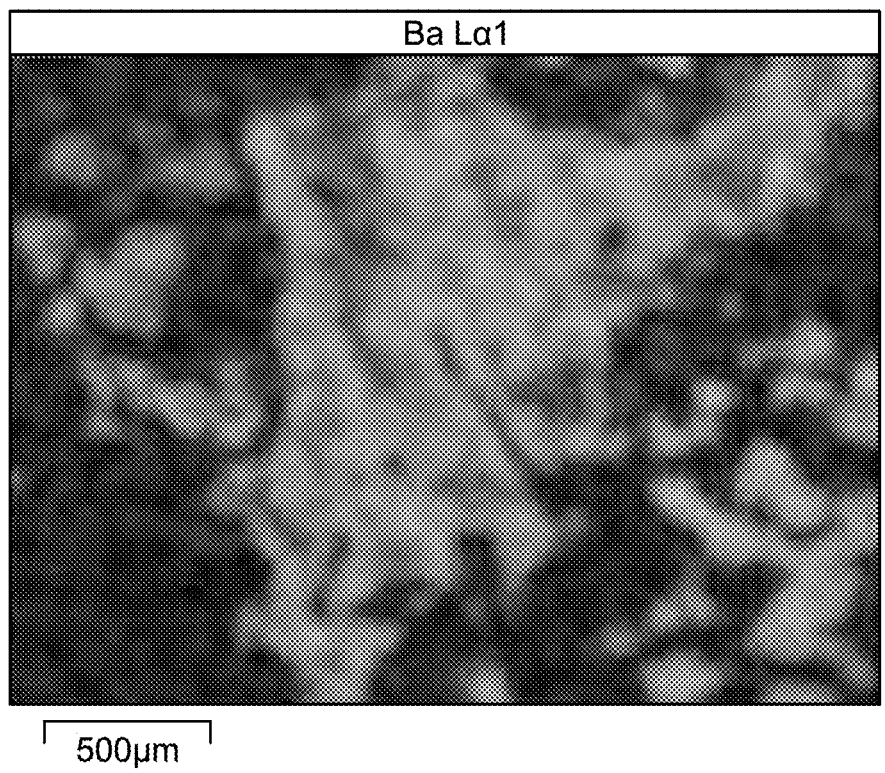
FIG. 7K is a SEM-EDX spectroscopic map of magnesium for the $CO_2$-brine plus barium chloride treated rock sample, according to certain embodiments.
Figure 7L:
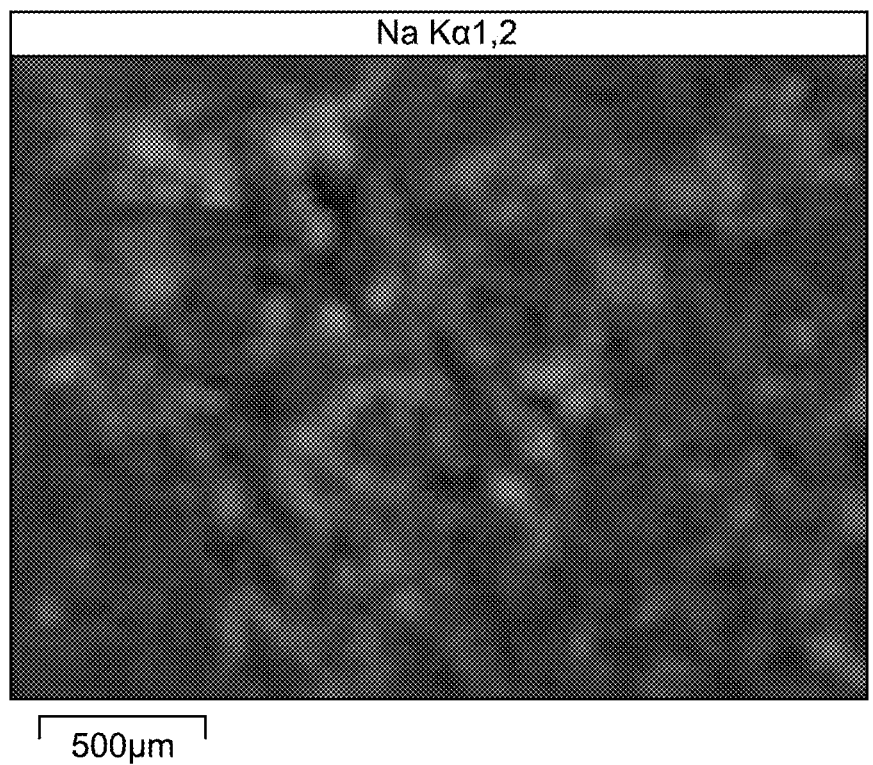
FIG. 7L is a SEM-EDX spectroscopic map of sodium for the $CO_2$-brine plus barium chloride treated rock sample, according to certain embodiments.
Figure 7M:
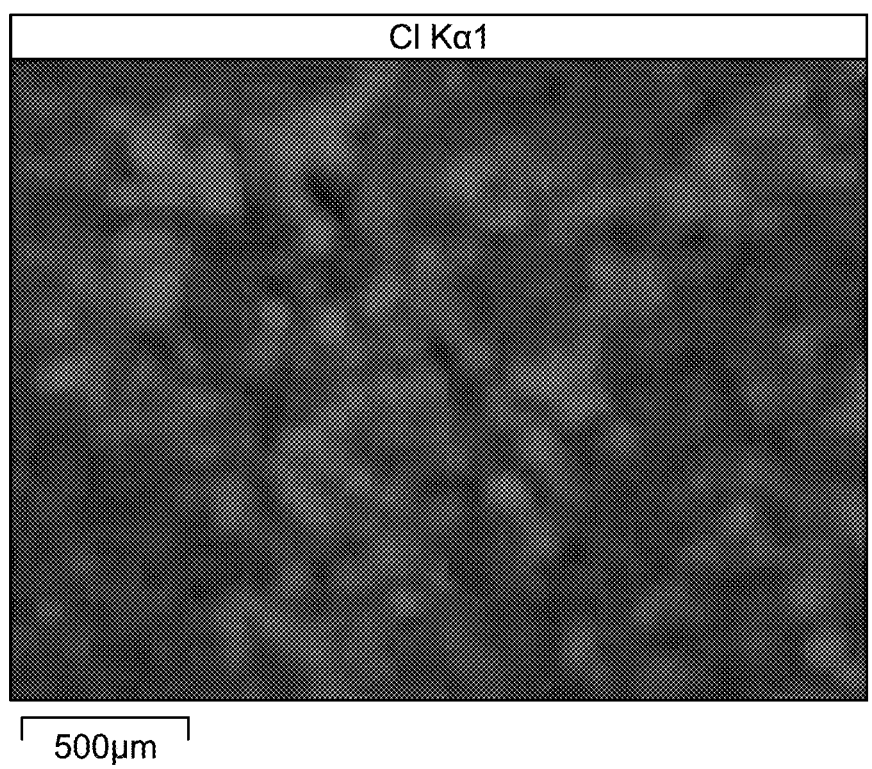
FIG. 7M is a SEM-EDX spectroscopic map of chlorine for the $CO_2$-brine plus barium chloride treated rock sample, according to certain embodiments.

FIGS. 7A-7D provide a detailed analysis of the elemental composition of the $CO_2$-brine treated sample in the presence of $BaCl_2$ using SEM-EDX spectroscopy. Notably, there is a presence of carbonates, while other regions indicated the presence of barium, as shown in FIG. 7A. This observation is further confirmed in FIG. 7B, where the map spectrum displays the elements O, C, Ba, Ca, S, Si, Al, and Cl. This indicates a substantial alteration in the elemental composition of the rock compared to the untreated sample. Analyzing the point-based SEM-EDS spectra, including point 8, reveals the precipitation of new minerals primarily composed of C, Ba, O, and S. The new mineral may be barium sulfate or carbonate, consistent with the findings in the XRD analysis discussed earlier. Furthermore, the surface morphology and structure of the surface minerals, as shown in FIG. 7C, align with the presence of these new minerals. This correlation is further substantiated by the characteristics of spectrum 12 and 14, as shown in FIG. 7D, which provides additional evidence of the mineral transformation. Moreover, FIGS. 7E-7M depicts an alteration in the composition of the sample subjected to $CO_2$-brine treatment in the presence of $BaCl_2$. There is a replacement of Ca and S, as shown in FIGS. 7E-7F, with Al, Si, Ba, and Cl, as depicted in FIG. 7H, FIG. I, FIG. 7K, and FIG. 7M, respectively. It may be noted that the elemental EDS analysis may inconclusively determine whether the presence of Al, Si, and Cl is due to precipitation resulting from the $CO_2$-brine interaction or if it is due to the differing dissolution rates that left these elements undissolved, hence displaying higher concentrations. For further validation of the specific functional groups present or formed, an FTIR and the ions analyses is described in subsequent paragraph(s).

FTIR Analysis

Figure 8:
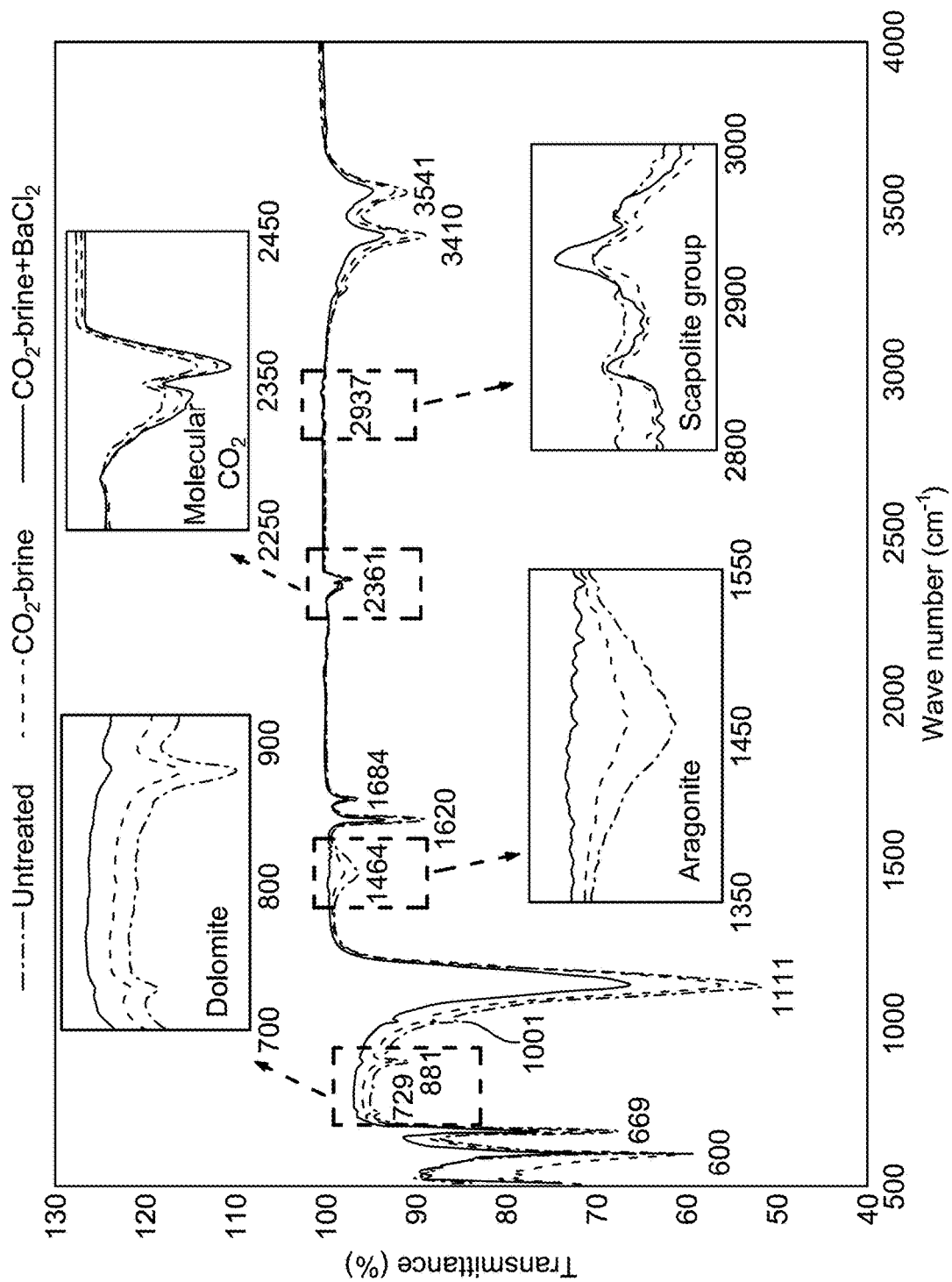
FIG. 8 shows fourier transform infrared (FTIR) spectroscopy composition of the untreated rock samples and $CO_2$-brine treated rock samples, according to certain embodiments.

The spectral domain within the range of 4000 $cm^{-1}$ to 500 $cm^{-1}$ was analyzed in order to identify one or more species formed after $CO_2$-brine interactions. The analysis of FTIR spectra is shown in FIG. 8. The analysis revealed a set of distinct peaks at various wavenumbers, namely 600 $cm^{-1}$, 669 $cm^{-1}$, 729 $cm^{-1}$, 881 $cm^{-1}$, 1001 $cm^{-1}$, 1111 $cm^{-1}$, 1464 $cm^{-1}$, 1620 $cm^{-1}$, 1684 $cm^{-1}$, 2340 $cm^{-1}$ to 2360 $cm^{-1}$, 2850 $cm^{-1}$ to 2930 $cm^{-1}$, 3410 $cm^{-1}$, and 3541 $cm^{-1}$. Notably, the presence and intensity of these peaks provide insights into the mineral composition and structural changes within the rock after $CO_2$-brine interactions. For instance, the anhydrite is characterized by strong bending peaks at 600 $cm^{-1}$, 669 $cm^{-1}$, and 1111 $cm^{-1}$ is detected in the FTIR spectra. The spectra at 600 $cm^{-1}$ and 669 $cm^{-1}$ are attributed to the $SO_4$ bending in anhydrite. Additionally, the stretching peaks at 729 $cm^{-1}$ and 881 $cm^{-1}$ corresponds to the presence of dolomite within the sample. The bands at 729 $cm^{-1}$ and 881 $cm^{-1}$ are the characteristic absorption peaks of $CO_3^{2-}$, which are caused by the bending vibration of $CO_3^{2-}$ in the dolomite structure. The band at 729 $cm^{-1}$ is attributed to the in-plane bending mode of $CO_3^{2-}$ in the dolomite structure. These FTIR bands illustrate the changes in the amount of dolomite with decreasing trend (peak intensity) from the intact, $CO_2$-brine to the $CO_2$-brine in presence of $BaCl_2$ treated rock as observed in the XRD section. The bending peak at 1464 $cm^{-1}$ is indicative of aragonite, and this peak is most prominent in the untreated rock. In addition, this peak disappears entirely in the $CO_2$-brine in presence of $BaCl_2$ treated sample implying no aragonite, aligning with the findings from the XRD analysis discussed the preceding section.

The FTIR results provide insights on the mineralogical transformations that occurred during the $CO_2$-brine treatments and their subsequent impact on the composition of the samples. The presence of absorption bands within the range of 2800 $cm^{-1}$ to 3000 $cm^{-1}$ is useful for indicating the presence of the scapolite group. The absorption peaks at 2885 $cm^{-1}$ and 2962 $cm^{-1}$ are attributed to the frequency doubling peak of $CO_3^{2-}$ antisymmetric stretching vibration which is related to the content of scapolite. Meanwhile, the band near 2850 $cm^{-1}$ is linked to calcite, presumably a $CaCO_3$-scapolite end-member as shown in the XRD section. The absorption peak at 1001 $cm^{-1}$ is caused by an aluminosilicate, while the band near 1004 $cm^{-1}$ corresponds to silica vibration.

Geochemical Analysis $CO_2$ is an active gas that can initiate the dissolution and precipitation of minerals. In addition, $CO_2$ may dissolve in water to generate carbonic acid ($H_2CO_3$), which may further dissociate to bicarbonate and carbonate ions according to the following equilibrium reactions:

$$CO_2 + H_2O \rightleftharpoons H_2CO_3 \quad\quad \text{[Brine carbonation]}$$

$$H_2CO_3 \rightleftharpoons H^+ + HCO_3^- \quad\quad \text{[Bicarbonate]}$$

$$H^+ + HCO_3^- \rightleftharpoons 2H^+ + CO_3 \quad\quad \text{[Carbonate ion formation]}$$

The carbonates and bicarbonates are collectively categorized as total inorganic carbon (TIC) content in the interacting fluids.

$CO_2$-Brine Rock Interactions

Figure 9A:
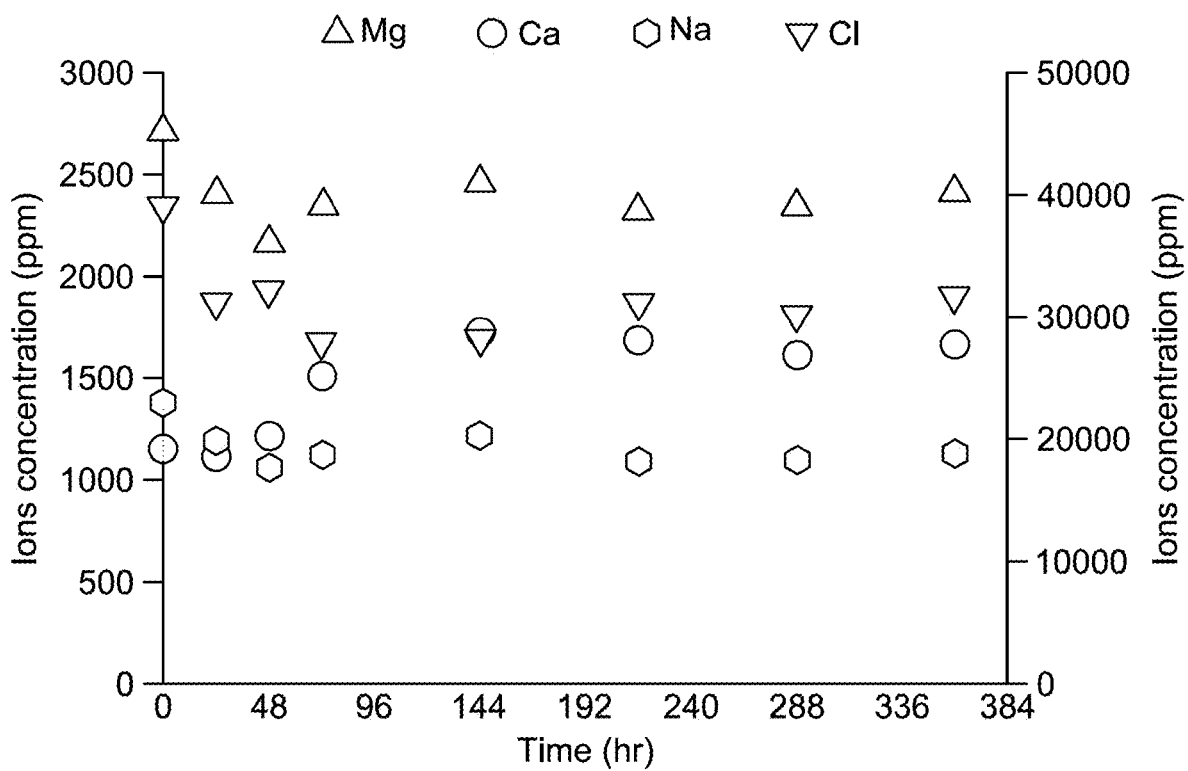
FIG. 9A shows ionic composition of calcium ions, sodium ions, magnesium ions, and chlorine ions, in the effluent of the rock-$CO_2$-brine interactions, according to certain embodiments.
Figure 9B:
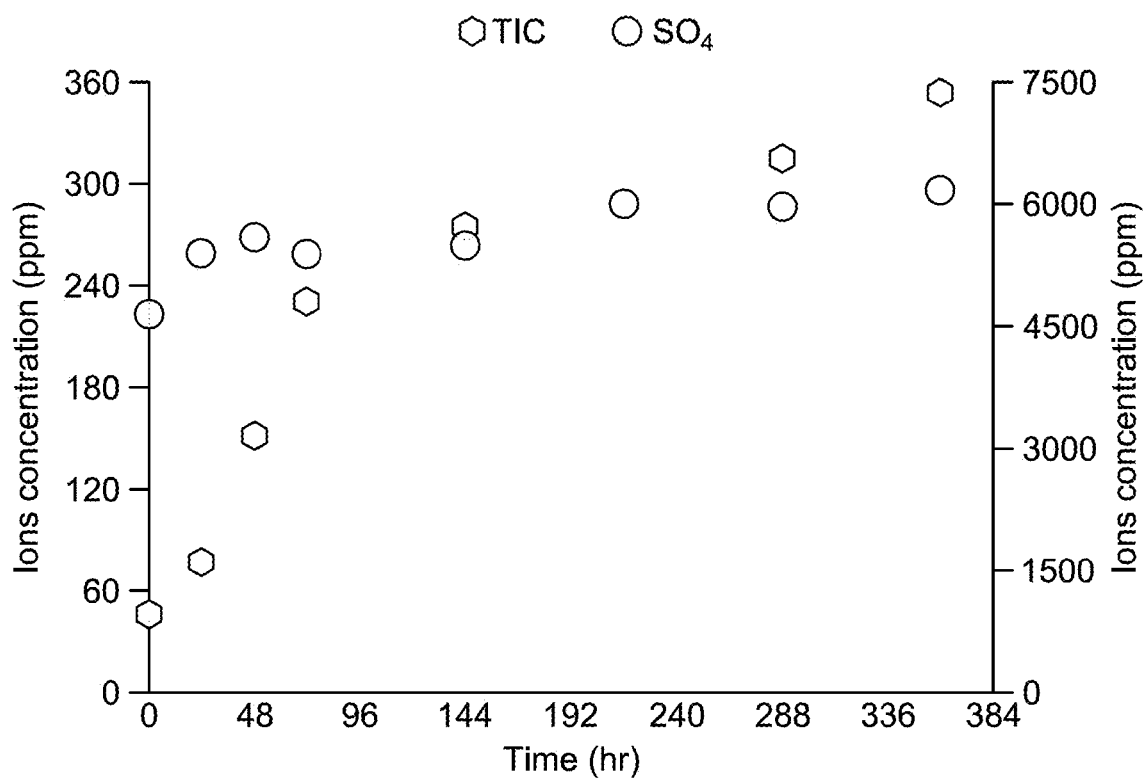
FIG. 9B illustrates sulfate ion and total inorganic carbon (TIC) concentrations in the effluent of the rock-$CO_2$-brine interactions, according to certain embodiments.

Rock-fluid interactions have an impact on the ion concentration of the effluent brine. FIG. 9A depicts the variations in ion concentrations of cations such as calcium, and sodium for the anhydrite-$CO_2$-brine interaction process. The decrease in sodium concentrations implies that the sodium ions were taken onto the mineral surfaces of the rock. A similar pattern of
decreasing concentration of Cl ion is also noticeable, confirming that both Na and Cl were adsorbed by the rock or precipitated on the rock. Further, a dissolution of calcium sulfate of the rock released calcium ions into the solution, this is evident from the observed increase in Ca and $SO_4$ ions concentration of the effluent fluid, as shown in FIGS. 9A-9B. In addition, the Ca and S distribution shows lower concentrations of Ca and S in some regions on the rock surface, confirming calcium sulfate dissolution. As a result, other calcium-bearing minerals such as calcite precipitate, driving up the calcium concentration. FIG. 9B illustrates the sulfate and TIC concentrations in the effluent brine for the anhydrite-$CO_2$-brine interaction. The sulfate concentration exhibits a slow and gradual increase over time, while TIC concentrations experience a more rapid surge. The changes may be attributed to the dissolution of calcium sulfate and the precipitation of sulfate-bearing minerals, such as barite, as confirmed by the X-ray diffraction (XRD) analysis. The rapid increase in TIC concentration is linked to the $CO_2$ dissolution and carbonation of the brine. It may be noted that the increase in sulfate concentration occurs at a relatively slower rate compared to the rapid increase in TIC concentration. Moreover, TIC and sulfate ions are introduced into the fluid, as well as being removed by precipitation and mineralization for carbonate. It should be noted that the increase in TIC of the effluent could suggest a net release of $CO_3^{2-}$ from the rock, as the dissolution of dolomite may release carbonate ions into the brine. However, if the observed TIC rise resulted from the dissolution of dolomite, there may typically be a concurrent increase in Mg ion concentration in the effluent. In contrast, the results showed a decrease in Mg ion concentration instead, as depicted in FIG. 9A. This variation and change in ions concentration highlights the intricacies of the chemical reactions occurring during the anhydrite-$CO_2$-brine interactions, emphasizing that the dissolution and precipitation processes are not uniform and proceed at different rates.

$CO_2$-Brine and $BaCl_2$ Rock Interactions

Figure 10A:
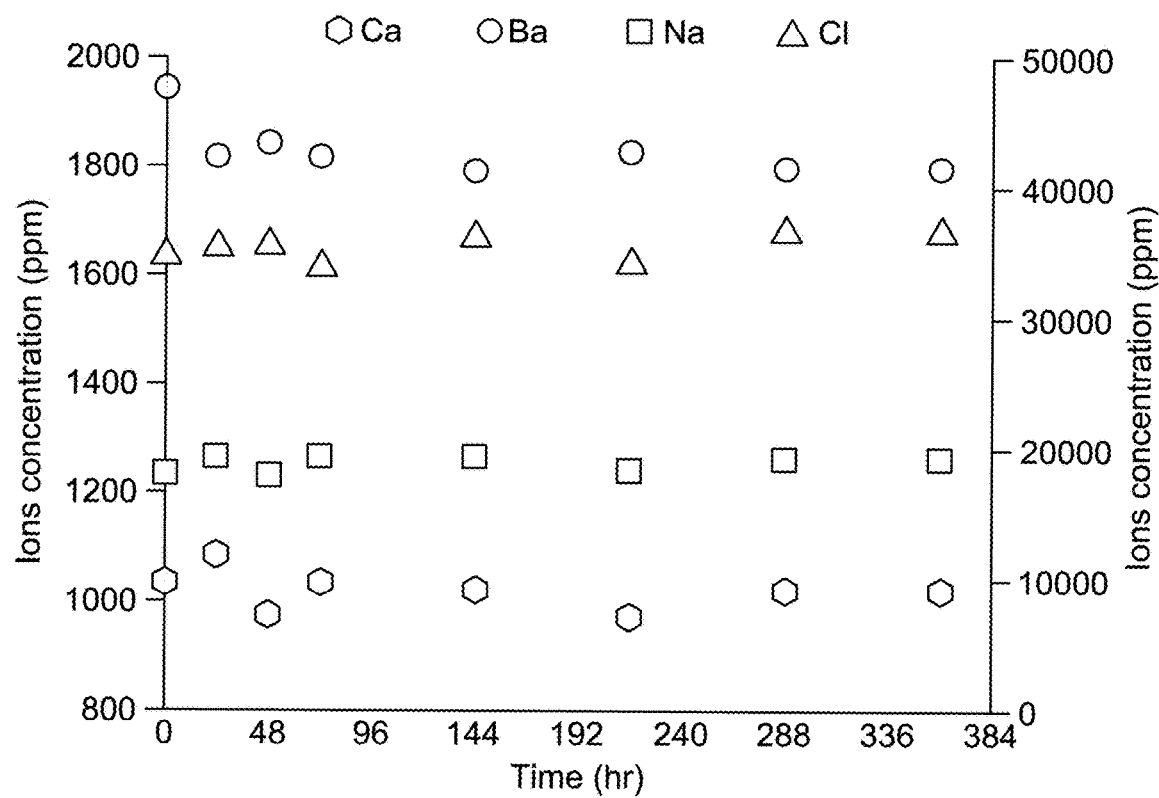
FIG. 10A shows ionic composition of calcium ions, sodium ions, barium ions, and chlorine ions, in the effluent of the rock-$CO_2$-brine interactions, in the presence of barium chloride, according to certain embodiments.
Figure 10B:
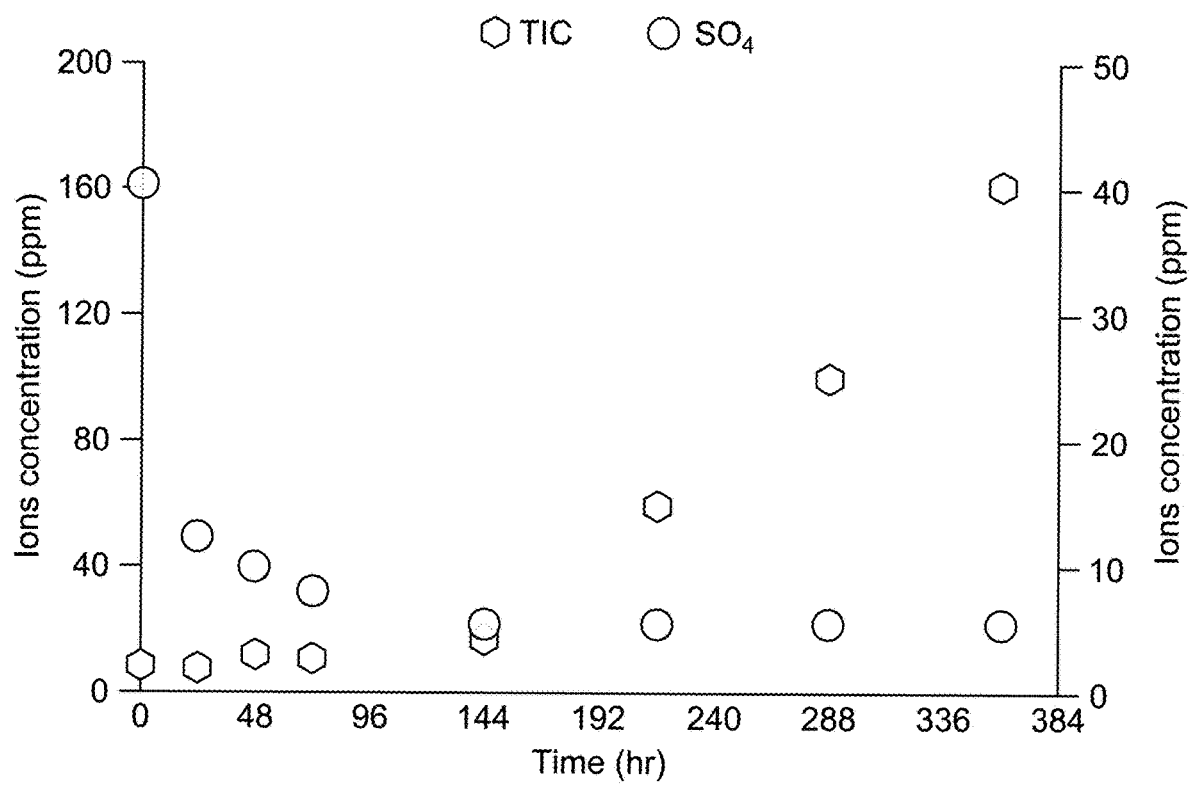
FIG. 10B illustrates sulfate ion and total inorganic carbon (TIC) concentrations in the effluent of the rock-$CO_2$-brine interactions, in the presence of barium chloride, according to certain embodiments.

The ion concentrations of the effluent including Ca, Na, and Ba ions, along with their initial concentrations, are presented in FIG. 10A for the rock-$CO_2$-brine in presence of $BaCl_2$ interactions. The presence of $BaCl_2$ introduces distinctive behavior in these ion concentrations compared to the anhydrite-$CO_2$-brine interactions without $BaCl_2$. First, there is no change observed in the ion concentrations of Na and Ca compared to their initial values. Notwithstanding, an initial increase in Ca ions concentration suggests dissolution of calcium sulfate. The presence of $BaCl_2$ causes slight alteration of the effluent concentrations of these ions. There is no precipitation of sodium or chlorine containing components such as halite. Conversely, the concentration of barium ions in the effluent shows a decrease over time. The decrease is attributed to specific chemical processes occurring in the system, primarily linked to the complexation of barium and sulfate ions, culminating in the precipitation of barium sulfate within the rock. As barium sulfate forms and settles within on the rock surface, it reduces the concentration of barium ions in the effluent. Further, FIG. 10B shows the concentrations of sulfate ion and TIC in the effluent during rock-$CO_2$-brine interactions when $BaCl_2$ was introduced into the system. The concentration of sulfate ions sharply decreases initially and then remains relatively constant over time. This trend may be explained by a combination of precipitation/dissolution and equilibrium processes. The sharp decrease in sulfate ion concentration is a result of sulfate precipitation that predominates anhydrite dissolution. The observed stabilization, beginning after 144 hours of interaction, is thought to result from the concurrent dissolution and precipitation of minerals containing sulfate. This process counteracts the declining trend caused by sulfate precipitation. When $BaCl_2$ is introduced, it promotes the formation of barium sulfate through precipitation. Barium ions from $BaCl_2$ react with sulfate ions present in the system, leading to the
precipitation of barium sulfate as seen in the XRD as discussed earlier.

Figure 11:
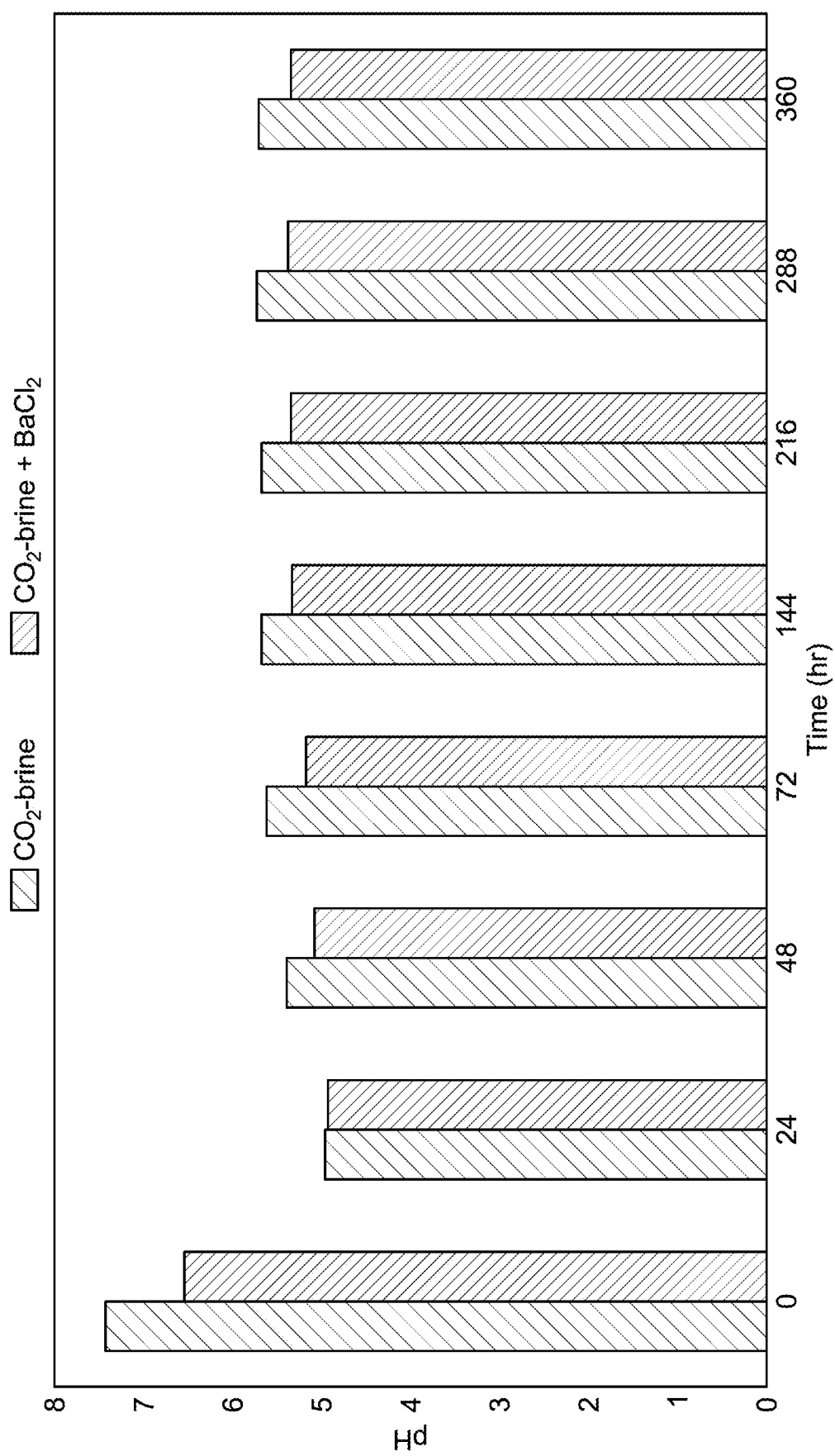
FIG. 11 is graph depicting pH of the effluent of the rock-$CO_2$-brine interactions over 360 hours of interaction time, according to certain embodiments.

Unlike sulfate ions, TIC concentration shows a consistent increase over time. This behavior is due to the carbonation of $CO_2$ in brine. When $CO_2$ dissolves in water, it forms carbonic acid. As described above, carbonic acid, in turn, may dissociate into bicarbonate ions and carbonate ions. As $CO_2$ continuously dissolves in the brine during the interactions, it leads to the gradual accumulation of the carbonate and bicarbonate species. This increase leads to a decrease in the pH level of the brine. The acidity is a result of the formation of hydrogen ions during CO2 carbonation. The pH measurement was conducted on the effluent samples immediately after collection, before degassing and cooling. FIG. 11 shows that for the $CO_2$-brine system, the pH of the brine was 7.41 before the introduction of $CO_2$ and contact with the rock. However, this value decreased to 4.95 upon encountering $CO_2$ and the rock. The pH gradually increased to 5.69 after 360 hours of interaction. In the case of the $CO_2$-brine plus $BaCl_2$ system, the initial pH of the same brine, with the addition of $BaCl_2$, was slightly acidic at 6.53. Upon the introduction of $CO_2$ and interaction with the rock, the pH dropped to 4.93. Subsequently, as reaction progressed, the pH increased to 5.33 at 360 hours. The sudden reduction in pH from 0 to 24 hours interaction time in both cases was due to carbonation of brine as discussed earlier. However, the pH gradually increases as the reaction advances, a result of rock dissolution and precipitation, which contributes to a diluting effect on the pH level.

Micro-CT (μ-CT) Analysis

μ-CT scans of two similar anhydrite-rich mini-plugs were performed pre and post exposure to $CO_2$-brine and $CO_2$-brine plus $BaCl_2$ using the Zeiss Versa 500 μ-CT equipment. The measured dimensions and mass for the two samples before and after $CO_2$-brine interactions are listed in Table 2. Comparing the masses before and after interaction, the $CO_2$-brine treatment showed a more substantial change with a decrease of up to 7.37%, whereas exposure to $CO_2$-brine with added $BaCl_2$ exhibited a smaller decrease of 2.45%. However, relying solely on mass changes for a precise conclusion is limited. This implies the potential for either higher dissolution in $CO_2$-brine treatment than $CO_2$-brine plus $BaCl_2$ or lower precipitation in $CO_2$-brine compared to $CO_2$-brine plus $BaCl_2$ treatment. This observation aligns with the findings in the SEM and geochemical analysis signifying higher dissolution in the $CO_2$-brine treatment.

TABLE 2

Dimensions and mass of the samples before and after $CO_2$-brine interactions

| Treatment | Length (mm) | Average diameters (mm) | Initial dry mass (g) | Dry mass after interaction (g) | Change in mass (g) |
|---|---|---|---|---|---|
| $CO_2$-brine | 7.12 | 8.4 | 0.6815 | 0.6313 | 0.0502 |
| $CO_2$-brine + $BaCl_2$ | 7.25 | 8.5 | 0.6762 | 0.6581 | 0.0166 |

An explanation of these changes may be described through μ-CT analysis. In order to quantify the change that resulted from dissolution and precipitation, the μ-CT scans of the rocks pre and post $CO_2$-brine exposure were analyzed. The voxel resolution was set to 4.5 micrometers (μm) for all the scans while the entire sample is included in the field of view. An X-ray tube voltage of 140 kilovolts (kV) and target current of 64 microampere (μA) was used, and 2401 projections were obtained with an exposure time of 3.4 sec. A filtered back projection (FBP) reconstruction algorithm was used to generate the 3D tomogram from the X-ray projections while also performing center shift, beam hardening and sample drift corrections. These images were computationally assessed using PerGeos software (FEI-ThermoFisher) to evaluate the changes in the mineral matrix before and after treatment.

Figure 12A:
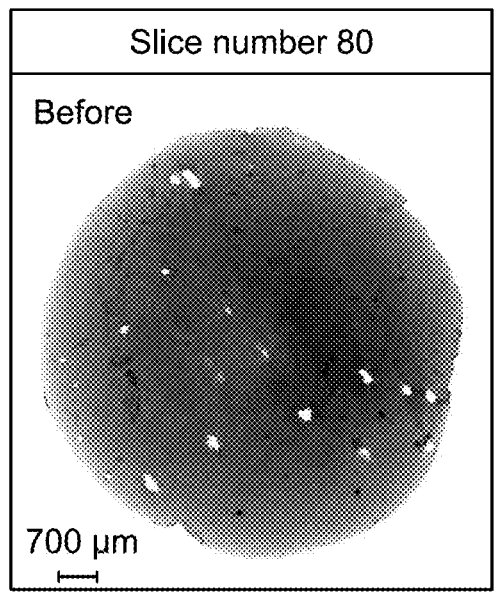
FIG. 12A is a micro-computed tomography (μ-CT) image of a two dimensional (2D) slice number 80 of the untreated rock sample, according to certain embodiments.
Figure 12B:
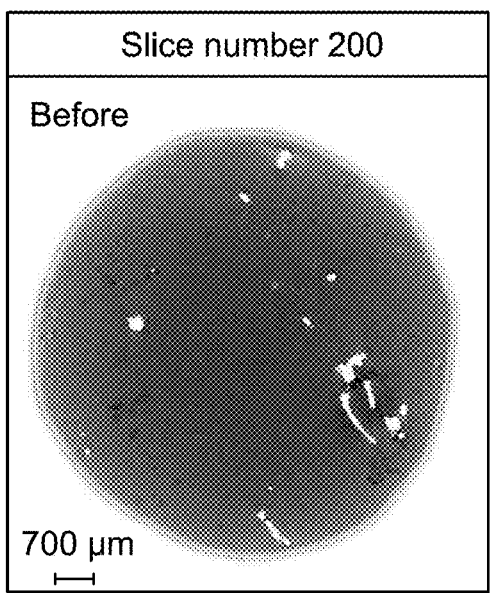
FIG. 12B is a μ-CT image of a 2D slice number 200 of the untreated rock sample, according to certain embodiments.
Figure 12C:
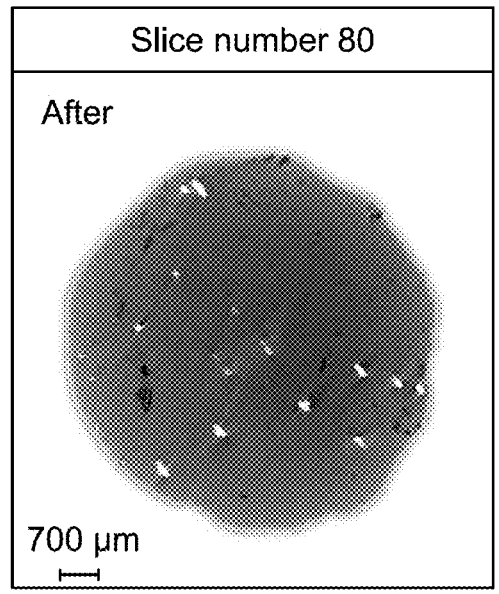
FIG. 12C is a μ-CT image of a 2D slice number 80 of the $CO_2$-brine treated rock sample, according to certain embodiments.
Figure 12D:
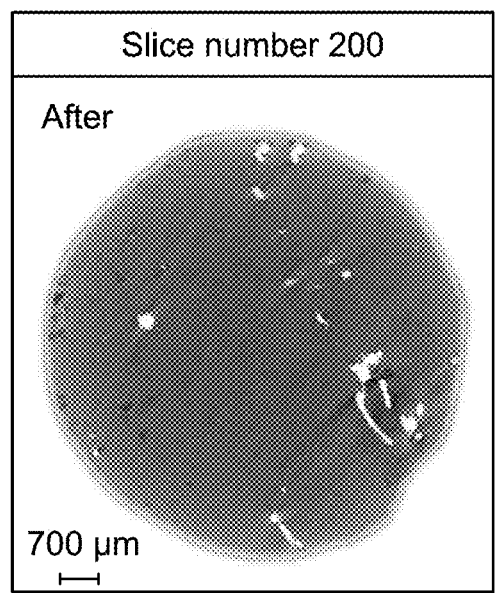
FIG. 12D is a μ-CT image of a 2D slice number 200 of the $CO_2$-brine treated rock sample, according to certain embodiments.
Figure 12E:
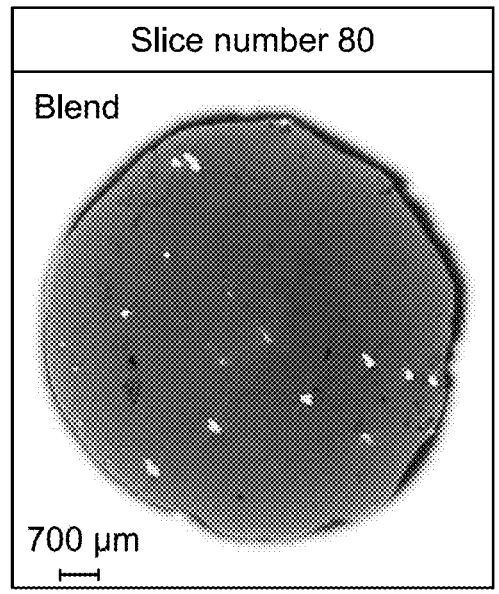
FIG. 12E is a blended μ-CT image of a 2D slice number 80 of the $CO_2$-brine treated rock sample superimposed on the untreated rock sample image, according to certain embodiments.
Figure 12F:
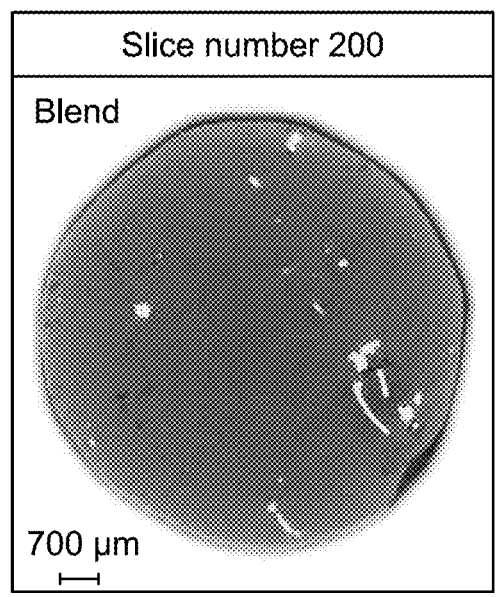
FIG. 12F is a blended μ-CT image of a 2D slice number 200 of the $CO_2$-brine treated rock sample superimposed on the untreated rock sample image, according to certain embodiments.
Figure 13A:
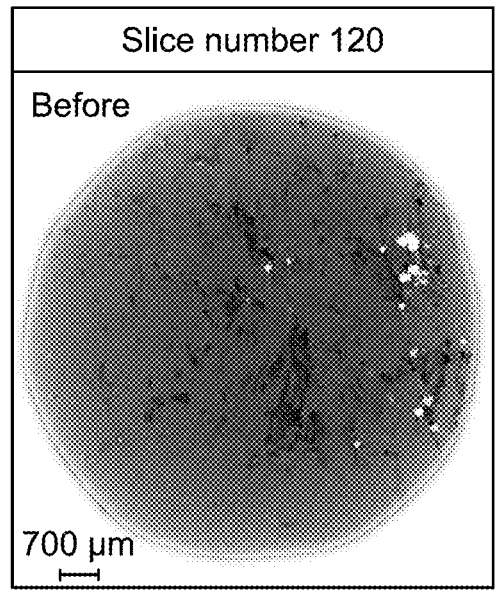
FIG. 13A is a μ-CT image of a 2D slice number 120 of the untreated rock sample, according to certain embodiments.
Figure 13B:
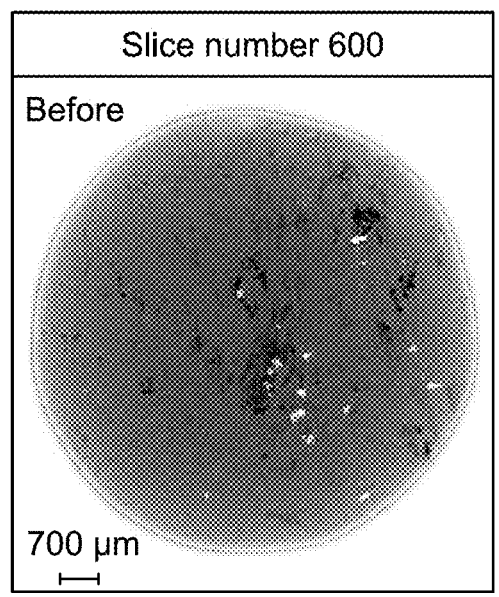
FIG. 13B is a μ-CT image of a 2D slice number 600 of the untreated rock sample, according to certain embodiments.
Figure 13C:
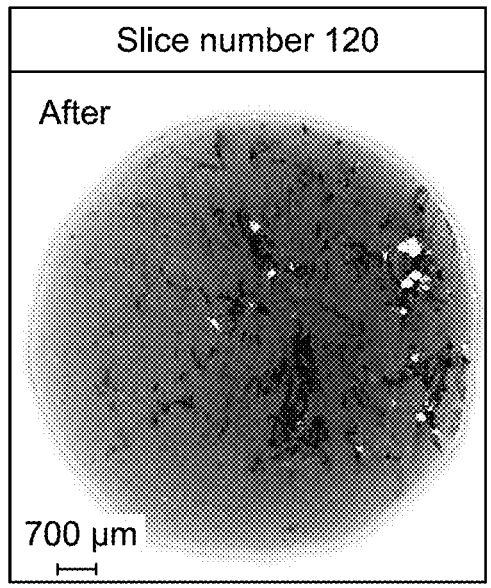
FIG. 13C is a μ-CT image of a 2D slice number 120 of the $CO_2$-brine plus barium chloride treated rock sample, according to certain embodiments.
Figure 13D:
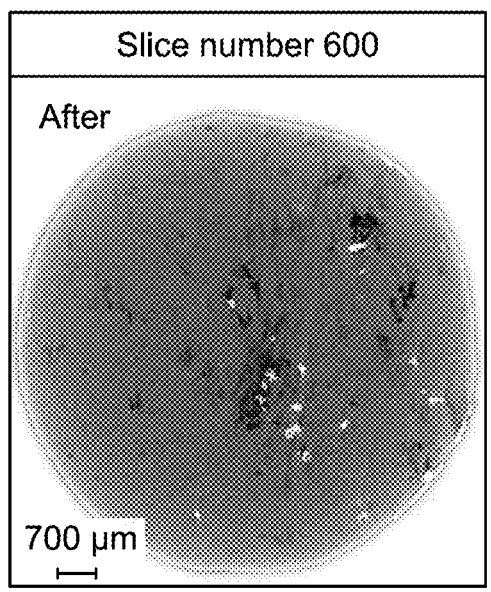
FIG. 13D is a μ-CT image of a 2D slice number 600 of the $CO_2$-brine plus barium chloride treated rock sample, according to certain embodiments.
Figure 13E:
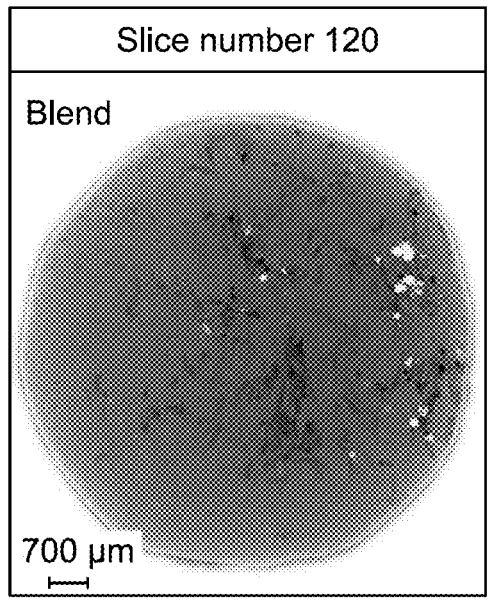
FIG. 13E is a blended μ-CT image of a 2D slice number 120 of the $CO_2$-brine plus barium chloride treated rock sample superimposed on the untreated rock sample image, according to certain embodiments.
Figure 13F:
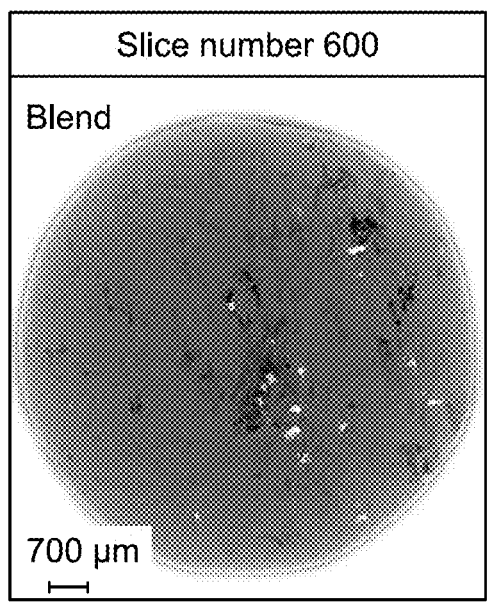
FIG. 13F is a blended μ-CT image of a 2D slice number 600 of the $CO_2$-brine plus barium chloride treated rock sample superimposed on the untreated rock sample image, according to certain embodiments.
Figure 14A:
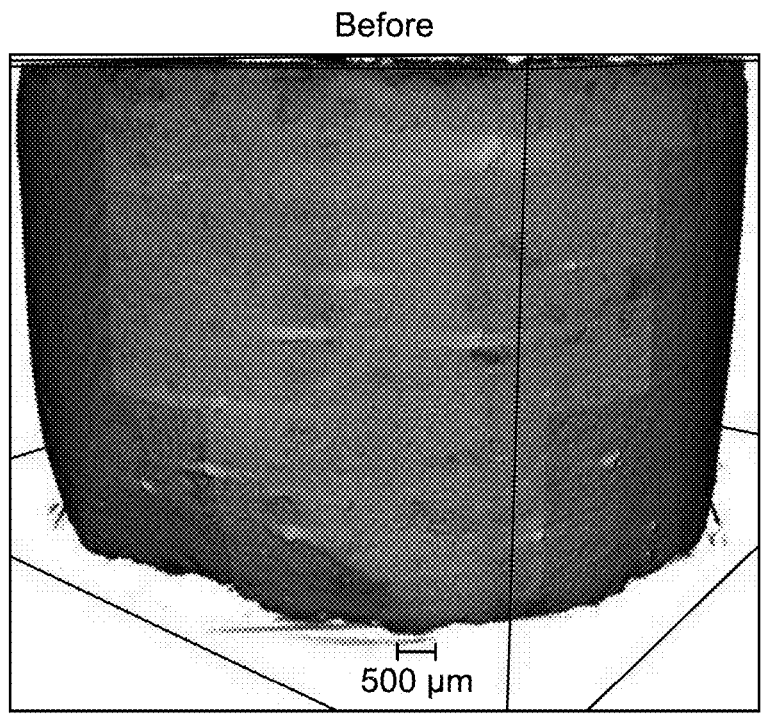
FIG. 14A is a perspective three-dimensional (3D) image of the untreated rock sample, obtained through μ-CT, according to certain embodiments.
Figure 14B:
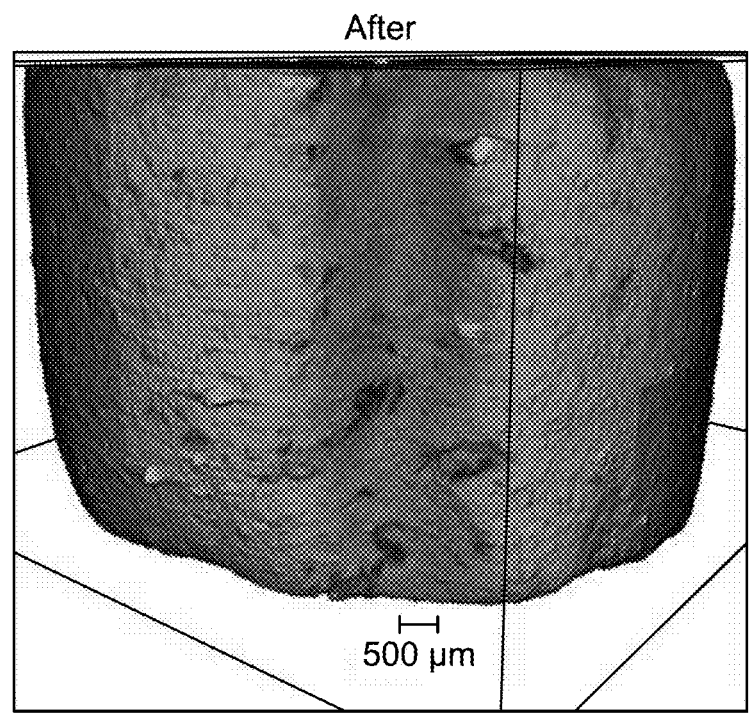
FIG. 14B is a perspective 3D image of the $CO_2$-brine treated rock sample, obtained through μ-CT, according to certain embodiments.
Figure 14C:
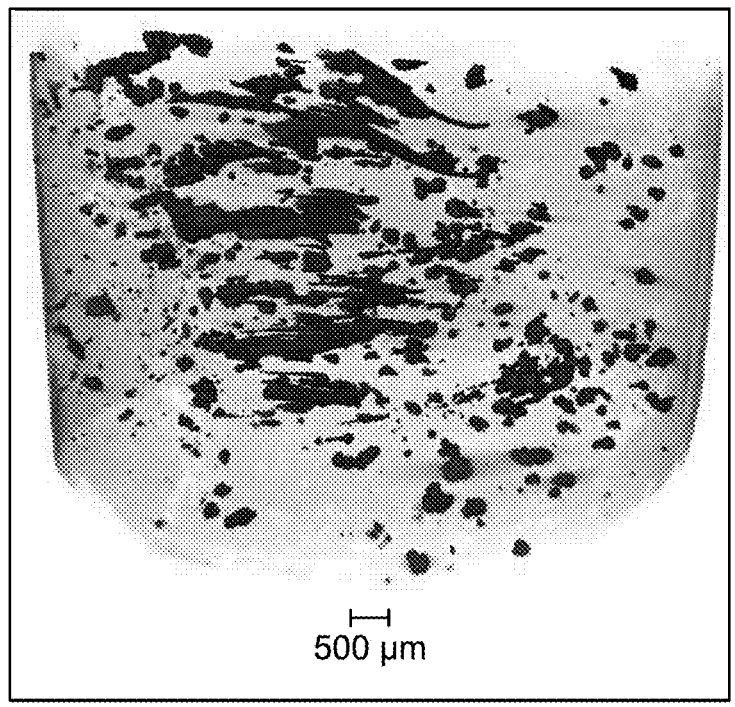
FIG. 14C is an image depicting high-density material present in the untreated rock sample, according to certain embodiments.
Figure 14D:
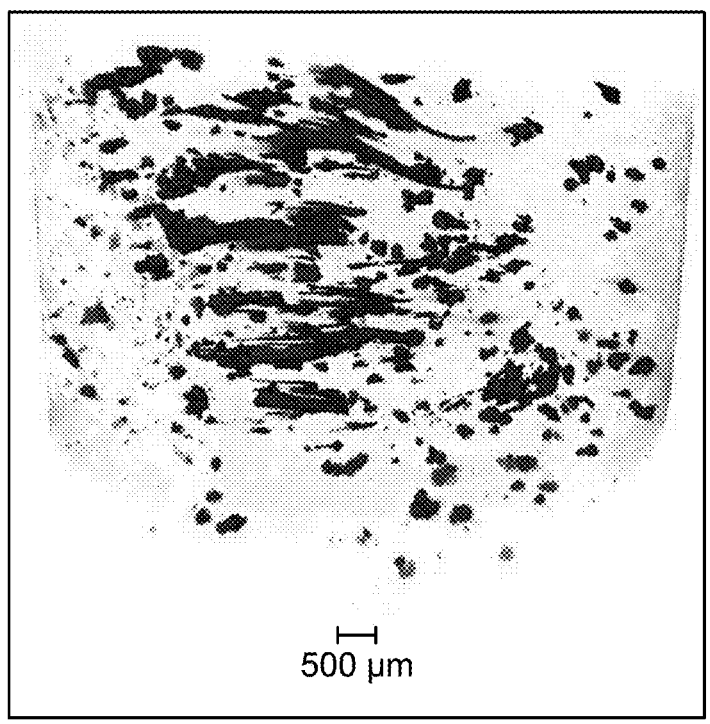
FIG. 14D is an image depicting high-density material present in the $CO_2$-brine treated rock sample, according to certain embodiments.
Figure 15A:
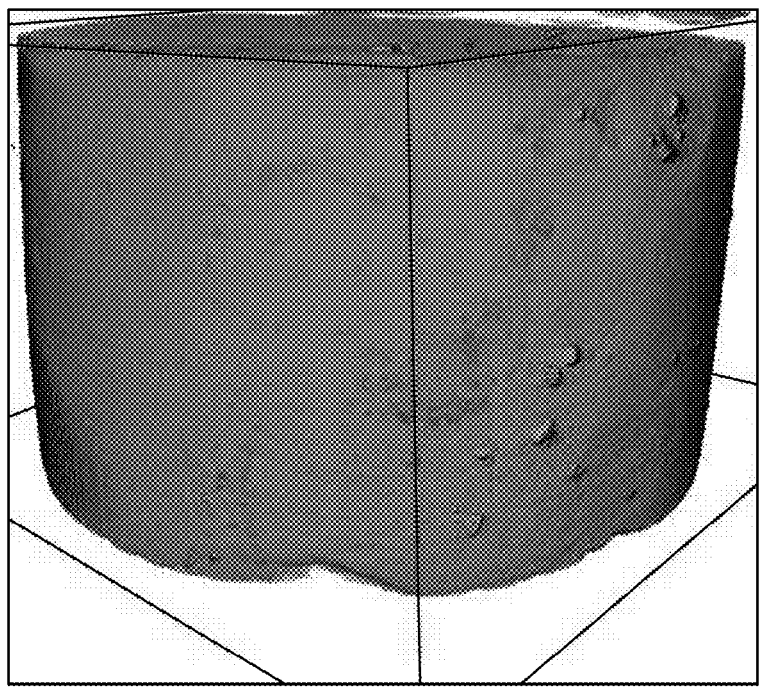
FIG. 15A is a perspective 3D image of a surface of the untreated rock sample, obtained through μ-CT, according to certain embodiments.
Figure 15B:
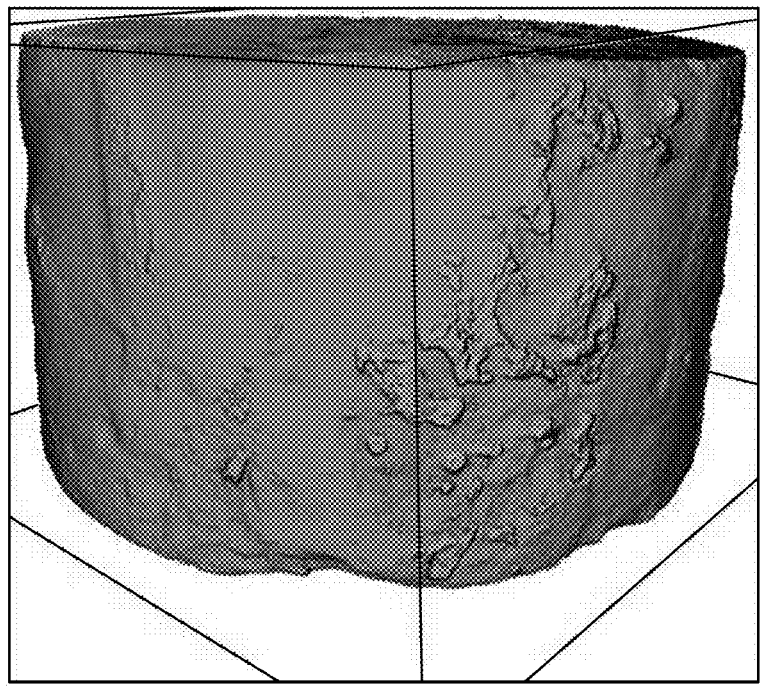
FIG. 15B is a perspective 3D image of a surface of the $CO_2$-brine plus barium chloride treated rock sample, obtained through μ-CT, according to certain embodiments.
Figure 15C:
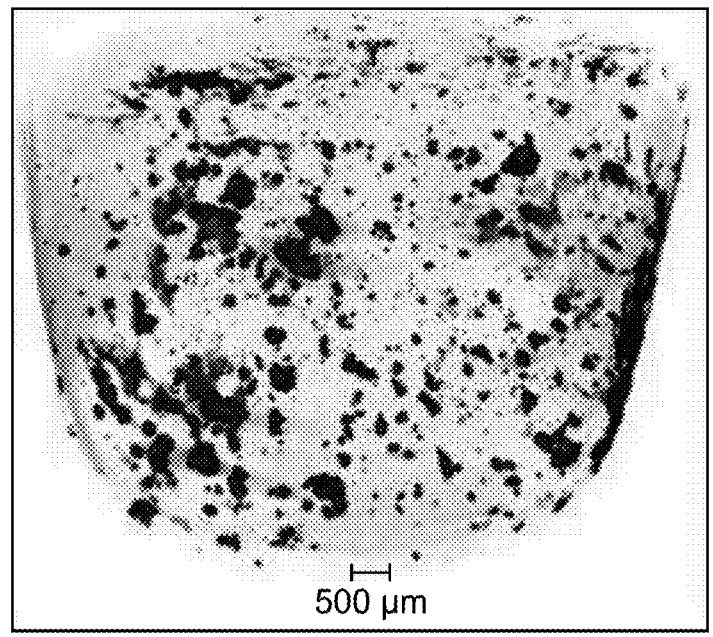
FIG. 15C is an image depicting high-density material present in the untreated rock sample, according to certain embodiments.
Figure 15D:
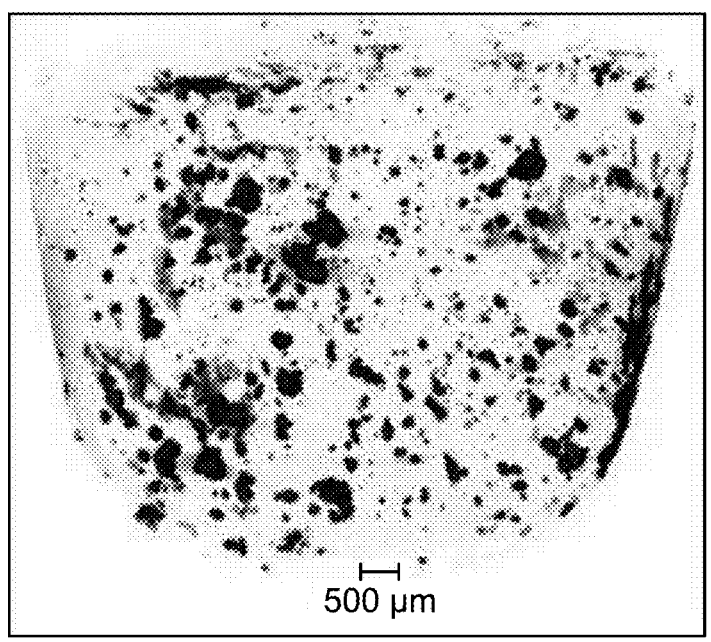
FIG. 15D is an image depicting high-density material present in the $CO_2$-brine plus barium chloride treated rock sample, according to certain embodiments.

The image processing involved first aligning the orientations of the set of scans for each sample pre and post treatment. This was followed by registering the two images using normalized mutual information as the metric while keeping the image of the untreated sample as a reference. The transformed image was resampled using Lanczos interpolation. The registered images were compared to visually identify the dissolved and precipitated regions. FIGS. 12A-12F show the registered 2D μ-CT slices (slice number 80 and 200) for the sample before and after exposure to $CO_2$-brine. A blended image of the pre and post treatment of the same 2D slice shows clearly the change occurring in the sample, as shown in FIGS. 12E-12F. Dissolution is observed mainly along the periphery of the treated sample. FIGS. 13A-13F shows the 2D μ-CT slices, compared for sample before and after exposure to $CO_2$-brine plus $BaCl_2$. In this case, precipitation of high-density mineral (white regions in grayscale image) was seen on the surface of the treated sample, whereas dissolution was quite less. These observations are also validated from FIGS. 14A-14D and FIGS. 15A-15D for samples treated with CO2-brine and $CO_2$-brine plus $BaCl_2$, respectively, where the 3D surface of the samples is compared. The white regions in grayscale images representing high-density material were separately analyzed. As shown in FIGS. 14A-14D, for supercritical $CO_2$-brine treatment, an overall decrease was observed in the white regions mainly due to dissolution, depicted in FIGS. 14A-14B. FIGS. 14C-14D, at different levels of opacity, indicate clearly that the change is mostly due to dissolution. However, FIGS. 15A-15B, for $CO_2$-brine plus $BaCl_2$ treatment, shows the inverse effect where precipitation is dominant. An interactive overlay threshold segmentation was performed on the images that were generated from the difference between pre and post treatment images, as shown in FIGS. 15C-15D. The difference of the untreated sample with that of the same sample post treatment indicates the amount of grain dissolution. The volume fractions of the segmented labels were obtained to compute the amount of grain precipitation and dissolution. Table 3 lists the computed values. The rock treated with $CO_2$-brine revealed that the dissolved portion constitutes up to 9.85% of the total volume of the untreated sample, with only 0.91% volume precipitated. In contrast, the rock treated with $CO_2$-brine plus $BaCl_2$ showed that the dissolved portion accounts for only 2.35% of the total volume of the untreated sample, while a 6.04% volume was precipitated.

TABLE 3

Volume fractions of the segmented labels with computed amount of grain precipitation and dissolution

| Treatment | Dissolved region as percentage of total volume of untreated rock sample | Precipitated region as percentage of total volume of untreated rock sample |
|---|---|---|
| $CO_2$-brine | 9.85% | 0.91% |
| $CO_2$-brine + $BaCl_2$ | 2.35% | 6.04% |

Analysis of Total Carbon (TC) Content

Figure 16:
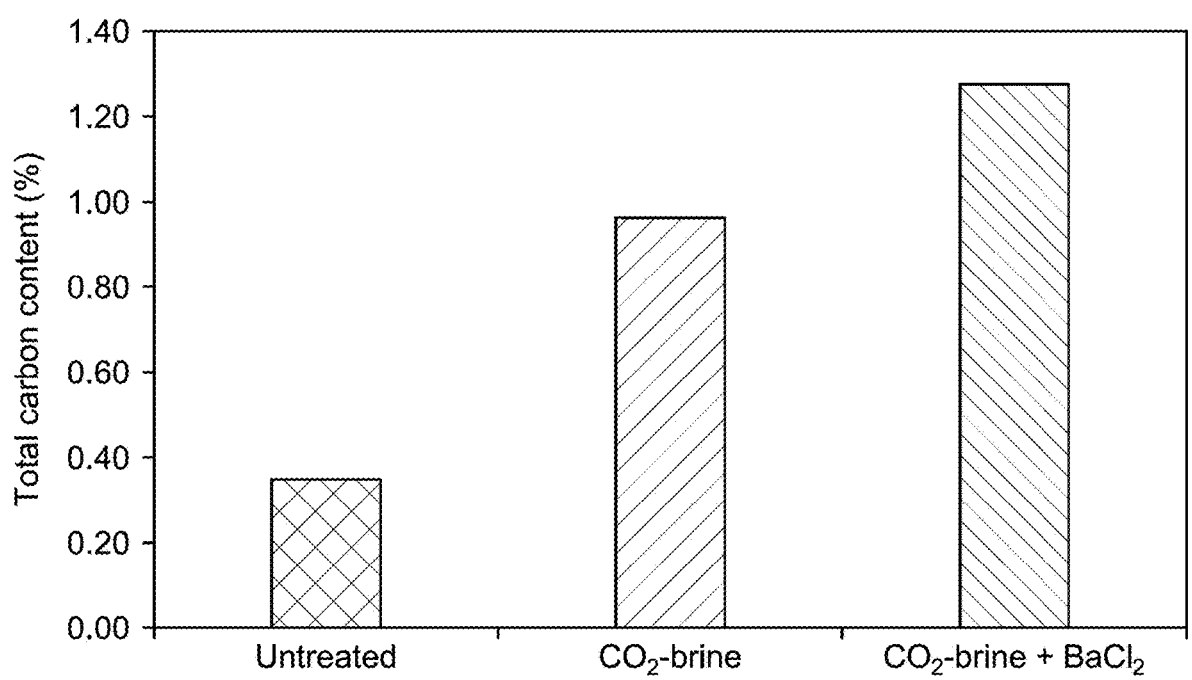
FIG. 16 is a graph depicting total carbon content of the untreated rock sample, the $CO_2$-brine treated rock sample, and the $CO_2$-brine plus barium chloride treated rock sample, according to certain embodiments.

The TC content (combining both organic and inorganic) of the rock power was assessed using TOC equipment and the results obtained are shown in FIG. 16. The analysis revealed that the untreated rock sample contained approximately 0.348 wt. % TC. When exposed to $CO_2$-brine treatment, the TC content increased to 0.963 wt. % (176.7% increase in TC). The observed increase is attributed to the mineralization of $CO_2$ that occurred because of the interaction with supercritical $CO_2$-saturated brine.

Upon treating the sample with supercritical $CO_2$-brine with added $BaCl_2$, a higher TC content of 1.275 wt. % (266.4% increase in TC) was recorded. The increase demonstrates enhanced $CO_2$ mineralization in comparison to the sample treated solely with $CO_2$-brine. While the addition of $BaCl_2$ enhances $CO_2$ mineralization, it may reduce the porosity in comparison to cases without $BaCl_2$. The formation of barite, facilitated by the addition of $BaCl_2$, may occupy some pore spaces that might otherwise be available for storing other minerals and may impact the available pore space for storing minerals formed during the treatment.

The present disclosure describes the method 50 for $CO_2$ storage. As described, carbon mineralization may be a geologically stable and environmentally-friendly method. By converting gaseous $CO_2$ into solid minerals within subsurface rock formations, the present disclosure may offer an effective means of safely storing $CO_2$. Further, method 50, as described herein, delves into the mechanisms and potential of anhydrite-$CO_2$-brine interactions for carbon storage in anhydrite-bearing reservoirs. The results presented herein were obtained through experiments conducted over fifteen days, including mineral transformation within a static reactor under high-temperature and high-pressure conditions. The results revealed that anhydrite, when exposed to supercritical $CO_2$-saturated brine, undergoes a mineral transformation, leading to the formation of stable minerals like calcite, siderite, feldspar, and in the presence of barium chloride and barite. Analytical results showed that the untreated rock had about 0.348 wt. % total TC, and exposure to $CO_2$-brine treatment resulted in a 176.7% increase in TC. Furthermore, treating the sample with supercritical $CO_2$-saturated brine with added $BaCl_2$ led to a higher TC content of 1.275 wt. %.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of carbon dioxide storage, comprising:
    injecting a brine solution into a subterranean anhydrite-rich formation, wherein the subterranean anhydrite-rich formation is anhydrous and free of hydrocarbons;
    injecting carbon dioxide into the subterranean anhydrite-rich formation;
    reacting the carbon dioxide with the subterranean anhydrite-rich formation in the presence of the brine solution to form one or more minerals thereby sequestering the carbon dioxide in the subterranean anhydrite-rich formation,
    wherein a temperature in the subterranean anhydrite-rich formation is from 300 to 365 K,
    wherein a pressure in the subterranean anhydrite-rich formation is from 90 to 120 bar,
    wherein the brine solution comprises sodium chloride, calcium chloride, magnesium chloride, sodium bicarbonate, and sodium sulfate,
    wherein the brine solution comprises ionic concentrations of $Na^+$ in a range from 5,000 to 50,000 parts per million (ppm), $Ca^{2+}$ in a range from 100 to 1,500 ppm, $Mg^{2+}$ in a range from 500 to 5,000 ppm, $SO_4^{2-}$ in a range from 1,000-9,000 ppm, $Cl^-$ in a range from 10,000-70,000 ppm, and $HCO_3^-$ in a range from 10-500 ppm, and
    wherein a mineral content of the subterranean anhydrite-rich formation after the reacting comprises 80 to 90 weight percent (wt. %) anhydrite, 1 to 5 wt. % calcite, 5 to 10 wt. % dolomite, 1 to 5 wt. % scapolite, 0.1 to 1 wt. % quartz; 0.1 to 1 wt. % feldspar, and 0.1 to 1 wt. % siderite.

2. The method of claim 1, wherein after the reacting the subterranean anhydrite-rich formation has a greater than 150 wt. % increase in total carbon compared to an initial amount of total carbon in the subterranean anhydrite-rich formation before the reacting wherein the reaction time is 15 days;
    wherein the subterranean anhydrite-rich formation has a gas porosity of 0.5 to 5% and a gas permeability of 0.05 to 0.1 mD;
    wherein the carbon dioxide is injected into the subterranean anhydrite-rich formation as a supercritical fluid; and
    wherein the brine solution and carbon dioxide are injected into the subterranean anhydrite-rich formation through tubing present in one or more boreholes that extend from the surface into the subterranean anhydrite-rich formation.

3. The method of claim 2, wherein after the reacting the subterranean anhydrite-rich formation has a greater than 160% increase in total carbon compared to an initial amount of total carbon in the subterranean anhydrite-rich formation before the reacting wherein the reaction time is 15 days.

4. The method of claim 3, wherein after the reacting the subterranean anhydrite-rich formation has a greater than 170% increase in total carbon compared to an initial amount of total carbon in the subterranean anhydrite-rich formation before the reacting wherein the reaction time is 15 days.

5. The method of claim 1, wherein the temperature is from 315 to 350 K.

6. The method of claim 5, wherein the temperature is from 325 to 340 K.

7. The method of claim 1, wherein the pressure is from 95 to 115 bar.

8. The method of claim 7, wherein the pressure is from 100 to 110 bar.

9. The method of claim 1, wherein the one or more minerals formed by reacting the carbon dioxide with the anhydrite-rich formation are selected from the group consisting of calcite, siderite, and feldspar.

10. The method of claim 1, wherein reacting the carbon dioxide with the anhydrite-rich formation forms calcite and a final calcite concentration of the anhydrite-rich formation is at least 1 wt. % greater than an initial calcite concentration of the anhydrite-rich formation before the reacting.

11. The method of claim 1, wherein reacting the carbon dioxide with the anhydrite-rich formation forms dolomite and a final dolomite concentration of the anhydrite-rich formation is at least 1 wt. % less than an initial dolomite concentration of the anhydrite-rich formation before the reacting.

12. The method of claim 1, wherein a dissolution of anhydrite in the presence of supercritical $CO_2$ increases an availability of calcium, facilitating mineral trapping of $CO_2$.

13. The method of claim 1, further comprising:
    injecting a barium chloride solution into the subterranean anhydrite-rich formation after the injecting the brine solution,
    wherein the barium chloride reacts with the subterranean anhydrite-rich formation to precipitate barium sulfate and barium carbonate, and
    wherein the concentration of barium chloride in the subterranean anhydrite-rich formation after the injecting the barium chloride solution is in a range from 0.01 to 0.1 M.

14. The method of claim 13, wherein after reacting the carbon dioxide with the anhydrite-rich formation, the subterranean anhydrite-rich formation has a greater than 240 wt. % increase in total carbon compared to an initial amount of total carbon in the subterranean anhydrite-rich formation before the reacting wherein the reaction time is 15 days.

15. The method of claim 14, wherein after reacting the carbon dioxide with the anhydrite-rich formation, the subterranean anhydrite-rich formation has a greater than 250 wt. % increase in total carbon compared to an initial amount of total carbon in the subterranean anhydrite-rich formation before the reacting wherein the reaction time is 15 days.

16. The method of claim 15, wherein after reacting the carbon dioxide with the anhydrite-rich formation, the subterranean anhydrite-rich formation has a greater than 260% increase in total carbon compared to an initial amount of total carbon in the subterranean anhydrite-rich formation before the reacting wherein the reaction time is 15 days.

17. The method of claim 13, wherein reacting the carbon dioxide with the anhydrite-rich formation forms one or more minerals selected from the group consisting of calcite, siderite, feldspar, and barite.

18. The method of claim 17, wherein a final calcite concentration of the anhydrite-rich formation is at least 1.5 wt. % greater than an initial calcite concentration of the anhydrite-rich formation before the reacting.

19. The method of claim 17, wherein a final dolomite concentration of the anhydrite-rich formation is at least 2 wt. % less than to an initial dolomite concentration of the anhydrite-rich formation before the reacting.

20. The method of claim 17, wherein a final barite concentration of the anhydrite-rich formation is at least 0.5 wt. % greater than an initial barite concentration of the anhydrite-rich formation before the reacting.

* * * * *